(12) United States Patent
Gotou

(10) Patent No.: US 6,172,474 B1
(45) Date of Patent: Jan. 9, 2001

(54) MOTOR WITH ELECTRONIC DISTRIBUTING CONFIGURATION

(75) Inventor: Makoto Gotou, Nishinomiya (JP)

(73) Assignee: Matsushita Electric Industrial Co., Ltd., Osaka-fu (JP)

( * ) Notice: Under 35 U.S.C. 154(b), the term of this patent shall be extended for 0 days.

(21) Appl. No.: 09/080,641

(22) Filed: May 18, 1998

(30) Foreign Application Priority Data

May 21, 1997 (JP) .................................................. 9-130750
Jun. 27, 1997 (JP) .................................................. 9-171421

(51) Int. Cl.[7] .................................................. H02K 23/00
(52) U.S. Cl. ........................ 318/254; 318/138; 318/439
(58) Field of Search .................................. 318/254, 138, 318/439; 388/800–841

(56) References Cited

U.S. PATENT DOCUMENTS

| | | |
|---|---|---|
| 4,359,674 | 11/1982 | Gotou . |
| 4,494,053 | 1/1985 | Gotou . |
| 4,535,275 | 8/1985 | Müller . |
| 4,535,276 | 8/1985 | Yokobori . |
| 4,622,499 | 11/1986 | Squires et al. . |
| 4,855,652 | 8/1989 | Yamashita et al. . |
| 5,117,167 | 5/1992 | Kazmirski . |
| 5,126,642 | 6/1992 | Shahrodi . |
| 5,309,076 | 5/1994 | Madsen et al. . |
| 5,309,078 | 5/1994 | Cameron . |
| 5,661,382 | 8/1997 | Enami et al. . |

FOREIGN PATENT DOCUMENTS

| | | |
|---|---|---|
| 0 482 913 | 4/1992 | (EP) . |
| 0 663 718 | 7/1995 | (EP) . |
| 56123791 | 9/1981 | (JP) . |
| 59122395 | 7/1984 | (JP) . |
| 3074193 | 3/1991 | (JP) . |
| 07046877 | 2/1995 | (JP) . |
| 9168295 | 6/1997 | (JP) . |

OTHER PUBLICATIONS

"A Fully Integrated HDD Power IC With Novel Head Retract Feature" by Richard K. Williams, et al., *Proceedings of the International Symposium on Power Semiconductor Devices (ISPSD), Davos, Switzerland May 31–Jun. 2,1994*, dated May 31, 1994 (pp. 391–396).

*Primary Examiner*—David Martin
(74) *Attorney, Agent, or Firm*—Akin, Gump, Strauss, Hauer & Feld, L.L.P.

(57) ABSTRACT

A conversion control part controls a converted DC voltage of a voltage converting part. The converted DC voltage is supplied to first and second amplifying parts each including a FET power transistor. At least one of first power transistors of first power amplifying parts and at least one of second power transistors of second power amplifying parts perform a full ON operation, thereby analoguely altering a current path from the converted DC voltage of the voltage converting part to plural-phase windings. This configuration reduces powerless and vibration of a motor.

44 Claims, 27 Drawing Sheets

F I G. 14
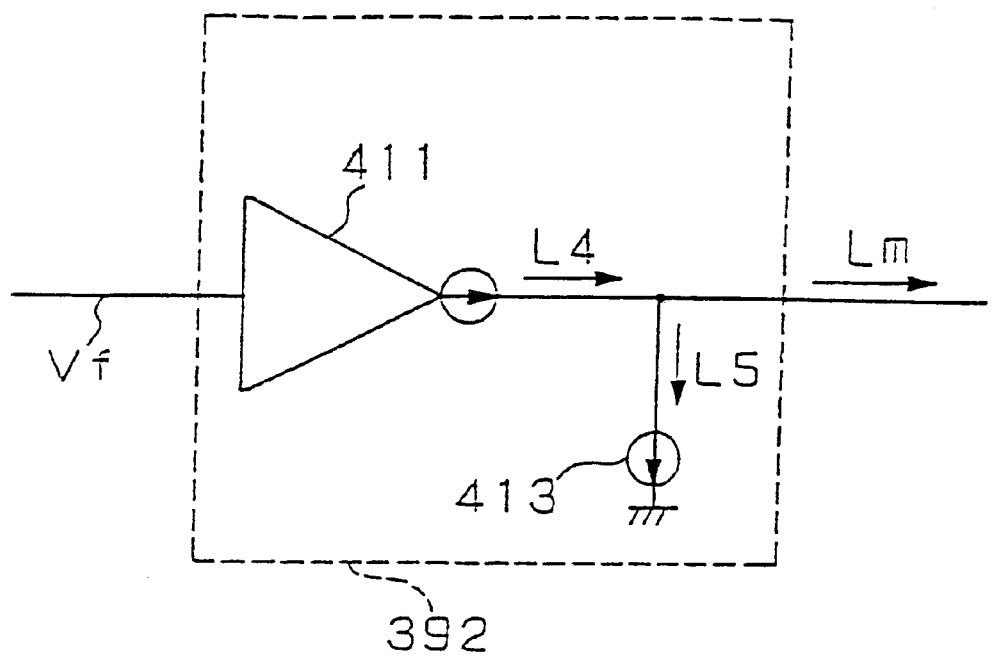

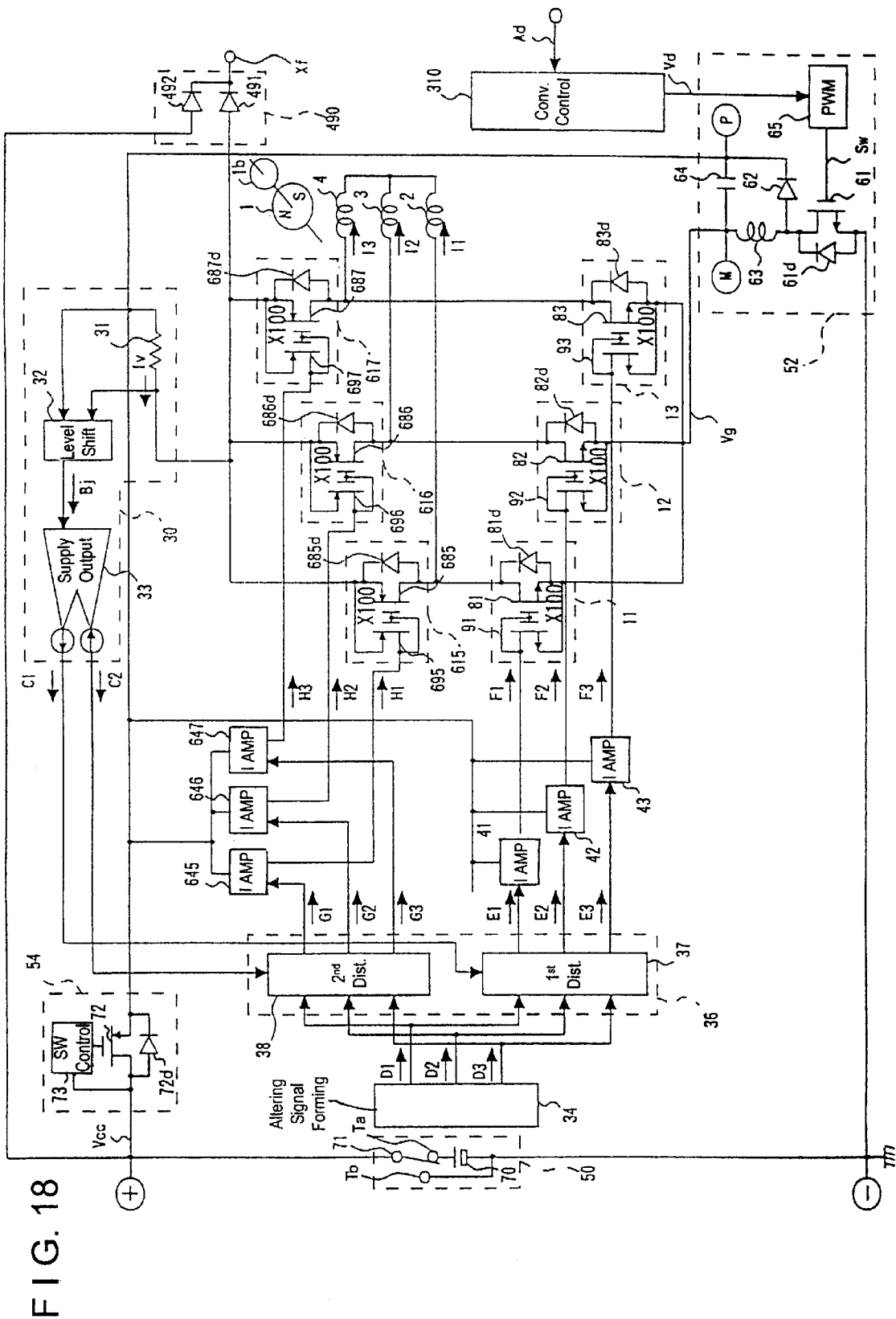
F I G. 18

F I G. 28
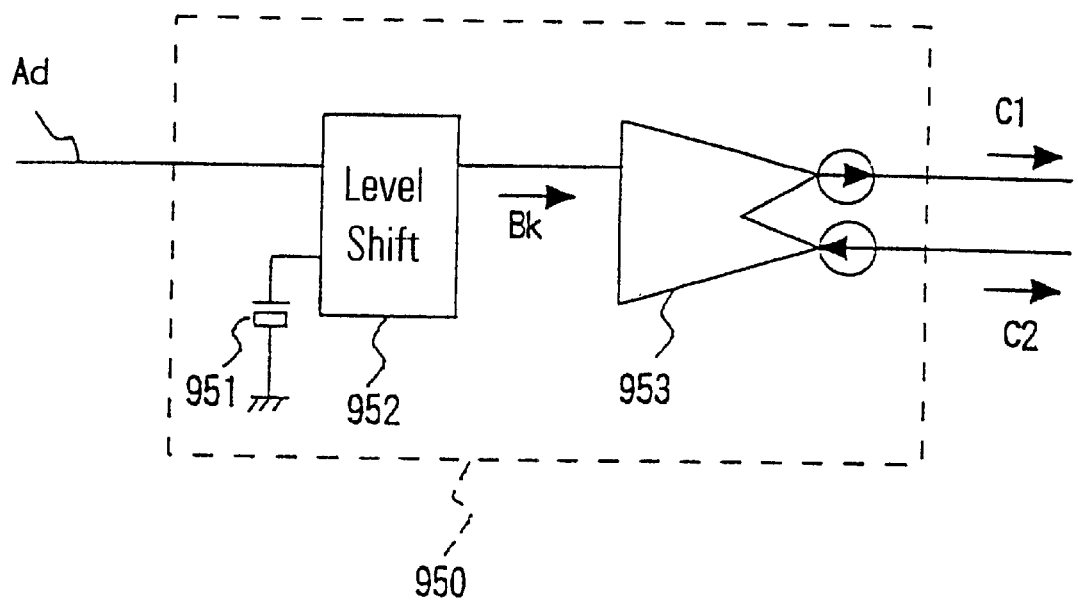

MOTOR WITH ELECTRONIC DISTRIBUTING CONFIGURATION

BACKGROUND OF THE INVENTION

The present invention relates to a motor that electronically switches current paths by using a plurality of transistors.

PRIOR ART

In recent years, motors that electronically switch current paths by using a plurality of transistors have been widely used as motors for driving office automation apparatus and audio visual apparatus. Examples of such motors include a motor that switches current paths to windings by using PNP-type power transistors and NPN-type power transistors.

FIG. 32 shows a prior art motor, the operation of which will be described. A rotor 2011 has a field part due to a permanent magnet, and a position detecting block 2041 generates two sets of three-phase voltage signals, K1, K2, K3 and K4, K5, K6, responding with the rotation of the rotor 2011. A first distributing block 2042 creates three-phase lower part conduction control signals L1, L2, and L3 responding with the voltage signals K1, K2, and K3, and controls the conduction of lower part NPN-type power transistors 2021, 2022, and 2023. A second distributing block 2043 creates three-phase upper part conduction control signals M1, M2, and M3 responding with the voltage signals K4, K5, and K6, and controls the conduction of upper part PNP-type power transistors 2025, 2026, and 2027. Three-phase drive voltages are thus supplied to windings 2012, 2013, and 2014.

However, this prior art motor has the following problems.

(1) Large Power Loss

In the prior art configuration, the emitter-collector voltages of the NPN-type power transistors 2021, 2022, and 2023 and the PNP-type power transistors 2025, 2026, and 2027 are controlled analoguely (that is in analogue fashion), thereby supplying drive currents of the necessary amplitude to the windings 2012, 2013, and 2014. As a result, the voltage drop across the power transistor in activated period is large, and this residual voltage multiplied by the conduction current of the transistor has led to a large power loss. In particular, since the drive currents to the motor windings are large, the power loss has been extremely large. As a result, the motor has a very low power efficiency.

(2) High Cost

In order to reduce the cost, it is effective to assemble transistors and resistors into a single integrated circuit (IC) chip. However, a large chip area is required to form the PNP-type power transistors 2025, 2026, and 2027, thereby producing a large factor of increasing the cost. Further, it has been difficult to operate the PNP-type power transistors at high speed because of the effects of parasitic capacitances when they are implemented in an integrated circuit form. Moreover, integrated circuit implementation has been difficult because of the large power loss of the power transistors. In particular, the large drive currents to the motor windings increase the danger of thermal breakdown of the integrated circuit due to the temperature rise of the power transistors. Further, when a radiating plate is mounted in order to prevent such thermal breakdown, the cost is greatly increased.

(3) Large Motor Vibration

In recent years, in optical disk apparatus such as DVD-ROM and magnetic disk apparatus such as HDD, there has been a need for a motor with reduced vibration because of high density recording and/or playbacking of a high-density disk. In the prior art configuration, however, abrupt switching of the power transistors has caused spike voltages in the windings, thereby pulsating the drive currents. As a result, the generated force of the motor is pulsated and a large motor vibration occurs.

It has been eagerly desired to develop a motor in which each of or all of these problems are solved.

An object of the present invention is to provide a motor that solves the above-enumerated problems individually or simultaneously, and that has the configuration suitable for implementation in integrated circuit form.

BRIEF SUMMARY OF THE INVENTION

The motor having the configuration according to the present invention comprises:

a movable member;

plural-phase windings;

voltage supplying means including a FET switching transistor for performing high-frequency switching of a power supplying path of a DC power source thereby to output a converted DC voltage obtained by converting a DC voltage of said DC power source;

Q pieces (Q is an integer of 2 or more) of first power amplifying means each including a first FET power transistor for forming a current path from a negative output terminal side of said voltage supplying means to one of said plural-phase windings;

Q pieces of second power amplifying means each including a second FET power transistor for forming a current path from a positive output terminal side of said voltage supplying means to one of said plural-phase windings;

altering signal producing means for producing plural-phase altering signals;

first distribution control means for controlling said Q pieces of first power amplifying means responding with output signals of said altering signal producing means so as to cause at least one of Q pieces of said first FET power transistors to perform an ON operation with a resistive voltage drop;

second distribution control means for controlling said Q pieces of second power amplifying means responding with output signals of said altering signal producing means so as to cause at least one of Q pieces of said second FET power transistors to perform an ON operation with a resistive voltage drop; and conversion control means for varying said converted DC voltage between said positive output terminal side and said negative output terminal side of said voltage supplying means in synchronization with a moving operation of said movable member.

The ON operation with a resistive voltage drop in the above-mentioned configuration refers to the full ON state of the three states of FET transistor, the full ON state, the half ON state, and the OFF state. And an active operation refers to the full ON state and the half ON state, inclusive.

With the above-mentioned configuration, the power loss of the first FET power transistors, the second FET power transistors, and the FET switching transistor was significantly reduced, and the power efficiency of the motor was drastically improved. Accordingly, the power devices, such as the FET switching transistor and the FET power transistors, can be formed at high density within a single-chip integrated circuit together with necessary semiconductor devices, and an inexpensive motor can thus be realized.

Further, the conversion control means varies the converted DC voltage of the voltage supplying means, and this achieves a reduction in the pulsation of the generated force of the motor by reducing bad influence of the back electromotive forces of the windings. Further, by supplying smoothly varying first Q-phase current signals and second Q-phase current signals to the conduction control terminals of the first power amplifying means and second power amplifying means, for example, smoothly varying bidirectional drive currents can be supplied to the windings, and the pulsation of the drive currents can thus be reduced greatly. As a result, the pulsation of the generated force is remarkably reduced, and a high performance motor can thus be realized.

The motor according to another configuration of the present invention comprises:

a movable member;

plural-phase windings;

voltage supplying means for supplying a DC voltage;

Q pieces (Q is an integer of 2 or more) of first power amplifying means each including a first FET power transistor for forming a current path from a negative output terminal side of said voltage supplying means to one of said plural-phase windings;

Q pieces of second power amplifying means each including a second FET power transistor for forming a current path from a positive output terminal side of said voltage supplying means to one of said plural-phase windings;

altering signal producing means for producing plural-phase altering signals;

first distribution control means for controlling said Q pieces of first power amplifying means responding with output signals of said altering signal producing means, thereby to cause at least one of Q pieces of said first FET power transistors to perform an ON operation with a resistive voltage drop; and second distribution control means for controlling said Q pieces of second power amplifying means responding with output signals of said altering signal producing means, thereby to cause at least one of Q pieces of said second FET power transistors to perform an ON operation with a resistive voltage drop;

said voltage supplying means including: inductor means for storing magnetic energy; capacitor means for storing electric energy; switching means having a FET switching transistor whose current output terminal side is connected to a negative terminal side of a DC power source and whose current input terminal side is connected to one end of said inductor means, for performing high-frequency switching of a power supply path for replenishing the magnetic energy of said inductor means from said DC power source; and current path forming means for forming a current path from said inductor means toward a circuit including said capacitor means by performing complementarily off-on operations corresponding to high-frequency switching on-off operations of said FET switching transistor, thereby to output a converted DC voltage between one end of said capacitor means and one end of said DC power source and supply said converted DC voltage to said Q pieces of first power amplifying means and said Q pieces of second power amplifying means, said motor further comprising:

one-chip integrated circuit means formed by integrating in one single chip integrated circuit said FET switching transistor, said first FET power transistors, said second FET power transistors and a predetermined number of semiconductor devices all together.

With the above-mentioned configuration, the power loss of the first FET power transistors and the second FET power transistors was significantly reduced. The power loss of the FET switching transistor in the voltage supplying means is also small. As a result, the power efficiency of the motor was drastically improved. Further, even when these power devices are implemented in integrated circuit form on a single chip, their temperature rise is extremely small. Further, the motor of the above-mentioned configuration prevents the parasitic transistor devices formed in the integrated circuit from operating. In other words, an undesirable operation due to the parasitic transistors does not occur even when the FET switching transistor performed high-frequency on-off switching. Accordingly, the power devices, such as the FET switching transistor and the FET power transistors, can be formed at high density within a single-chip integrated circuit together with necessary semiconductor devices, and a low cost motor can thus be realized.

Further, by supplying smoothly varying first Q-phase current signals and second Q-phase current signals to the conduction control terminals of the Q first power amplifying means and Q second power amplifying means, for example, smoothly varying bidirectional drive currents can be supplied to the windings, and thus the pulsation of the drive currents was reduced greatly. Further, the first FET power transistors and the second FET power transistors perform smooth current-path altering operations, thereby prevent an undesirable operation due to the parasitic transistors in the integrated circuit. As a result, the pulsation of the generated force is remarkably reduced, and a high performance motor can thus be realized.

The motor according to another configuration of the present invention comprises:

a movable member;

plural-phase windings;

voltage supplying means for supplying a DC voltage;

Q pieces (Q is an integer of 2 or more) of first power amplifying means each including a first FET power transistor for forming a current path from a negative output terminal side of said voltage supplying means to one of said plural-phase windings;

Q pieces of second power amplifying means each including a second FET power transistor for forming a current path from a positive output terminal side of said voltage supplying means to one of said plural-phase windings;

altering signal producing means for producing plural-phase altering signals;

first distribution control means for controlling said Q pieces of first power amplifying means responding with output signals of said altering signal producing means, thereby to cause at least one of Q pieces of said first FET power transistors to perform an ON operation with a resistive voltage drop;

second distribution control means for controlling said Q pieces of second power amplifying means responding with output signals of said altering signal producing means, thereby to cause at least one of Q pieces of said second FET power transistors to perform an ON operation with a resistive voltage drop;

bypass switch means having a bypass transistor for interrupting or connecting a current path between the positive output terminal side of said voltage supplying means and a common terminal side of said plural-phase windings;

shut-off means having a shut-off transistor for performing or stopping current supply to said plural-phase windings from said Q pieces of second power amplifying means; and diode means permitting uni-directional conduction from a current output terminal side toward a current input terminal side of at least one of said second FET power transistors.

With this configuration, a motor can operate with adequately altering a first activating mode wherein bidirectional currents are supplied to the windings so as to obtain a large generated force, and a second activating mode wherein unidirectional currents are supplied to the windings so as to perform a high-speed rotation. In particular, the diode means connected from the current output terminal side of second FET power transistor to the current input terminal side is provided to permit a reverse current to flow in response to the back electromotive forces generated in the windings in the second activating mode. However, the shut-off transistor in the shut-off means acts to block the reverse current flow, thereby performing the motor to normally operate.

Further, the configuration is such that, when the first FET power transistors, the second FET power transistors, the bypass transistor, and the shut-off transistor are fabricated in integrated circuit form, for example, an undesirable operation due to the many parasitic devices (including the diode means) formed in the integrated circuit is prevented from occurring, and the first activating mode and second activating mode are stably operated. Furthermore, since smoothly varying bidirectional or unidirectional drive currents can be supplied to the windings by supplying, for example, smoothly varying first Q-phase current signals and second Q-phase current signals to the conduction control terminals of said Q pieces of first power amplifying means and said Q pieces of second power amplifying means, the pulsation of the drive currents can be reduced significantly. As a result, a high performance motor with reduced pulsation of the generated force can be achieved.

The motor according to another configuration of the present invention comprises:

a movable member;

plural-phase windings;

voltage supplying means for supplying a DC voltage;

Q pieces (Q is an integer of 2 or more) of first power amplifying means each including a first NMOS-FET power transistor for forming a current path from a negative output terminal side of said voltage supplying means to one of said plural-phase windings;

Q pieces of second power amplifying means each including a second PMOS-FET power transistor for forming a current path from a positive output terminal side of said voltage supplying means to one of said plural-phase windings;

altering signal producing means for producing plural-phase altering signals;

first distribution control means for controlling said Q pieces of first power amplifying means responding with output signals of said altering signal producing means, thereby to cause at least one of Q pieces of said first NMOS-FET power transistors to perform an ON operation with a resistive voltage drop;

second distribution control means for controlling said Q pieces of second power amplifying means responding with output signals of said altering signal producing means, thereby to cause at least one of Q pieces of said second PMOS-FET power transistors to perform an ON operation with a resistive voltage drop;

power switch means having a PMOS-FET power switch transistor for connecting a power supplying path from a positive terminal side of a DC power source of said voltage supplying means toward the current input terminal sides of said Q pieces of second power amplifying means when said DC power source is on, and for interrupting the power supplying path between the positive terminal side of said DC power source and the current input terminal sides of said Q pieces of second power amplifying means when said DC power source is turned off; and voltage output means for outputting a rectified DC voltage obtained by rectifying plural-phase back electromotive forces of said plural-phase windings when said DC power source is turned off.

With this configuration, a motor is realized that can output a rectified DC voltage when the DC power source is turned off. Further, the motor is realized that can operate without a high-voltage outputting part which produces a high potential point higher than the output DC voltage of the DC power source part. The rectified DC voltage of the motor is used for executing an emergency operation in an equipment when the DC power source is turned off. In such an emergency case, because the powerless of a high-voltage outputting part reduces the power supplied by the rectified DC voltage of the motor, it is preferable to make the motor without having a high-voltage outputting part. Further, the motor has an advantage of reducing a number of components (especially, capacitors) by omitting a high-voltage outputting part, thereby reducing the cost of the motor.

These and other configurations and operations will be described in detail in conjunction with the preferred embodiments.

BRIEF DESCRIPTION OF THE DRAWINGS

FIG. 14 is a circuit diagram of the amplitude circuit 392 in another configuration in the second embodiment.

FIG. 18 is a diagram showing the configuration of a fourth embodiment of the present invention.

FIG. 28 is a diagram showing another configuration of a supply signal forming part in the embodiment of the present invention.

DETAILED DESCRIPTION OF THE INVENTION

Several preferred embodiments of the present invention will be described in detail below with reference to the accompanying drawings shown in FIGS. 1 to 31.

Embodiment 1

Figure 1:
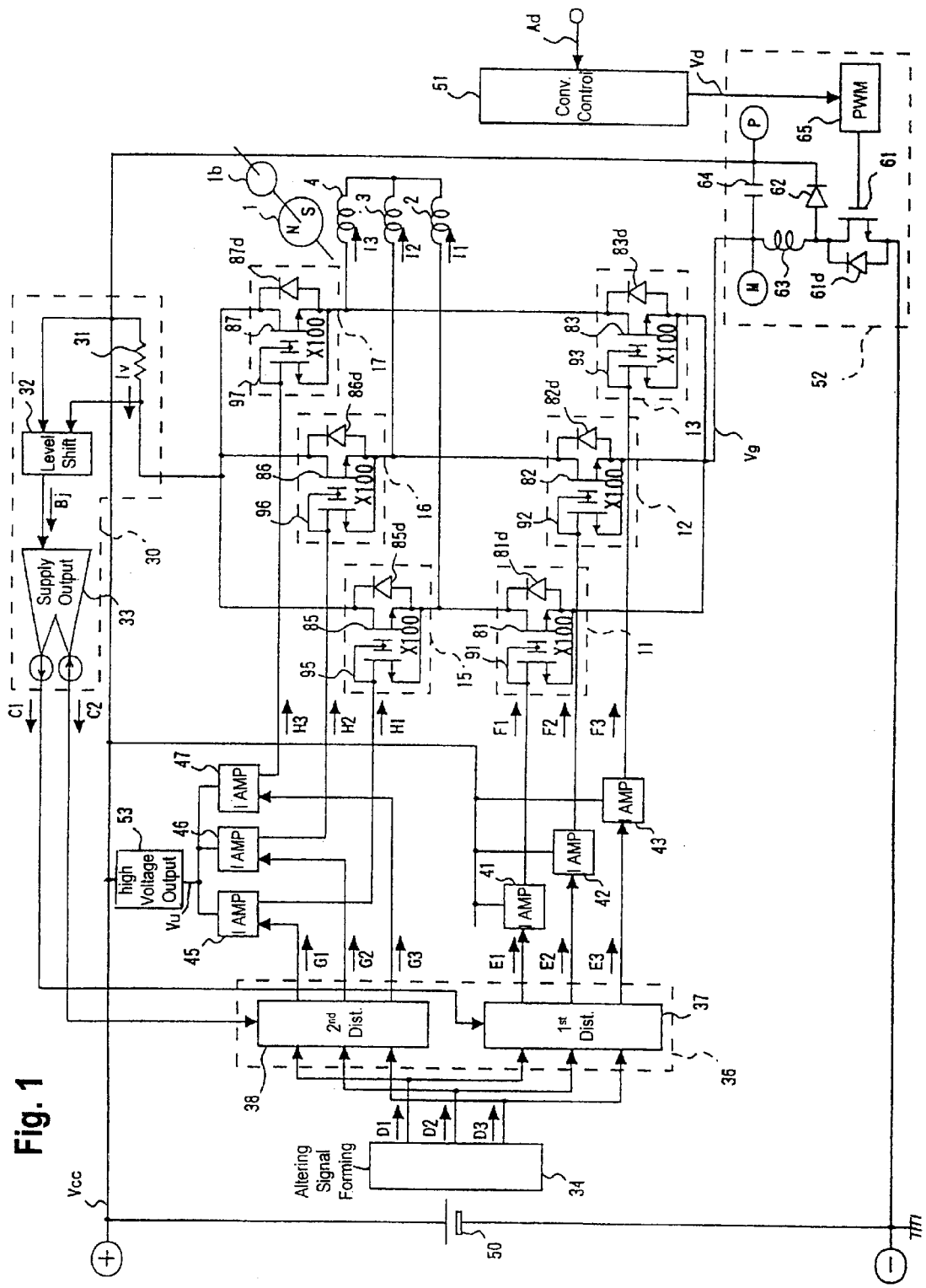
FIG. 1 is a diagram showing the configuration of a first embodiment of the present invention.

FIGS. 1 to 8 show a motor in accordance with a first embodiment of the present invention. The configuration is shown in FIG. 1. A movable member 1 is a rotor having a field part that generates magnetic fluxes of multiple poles and is configured by a permanent magnet, for example. The field part of the movable member 1 is shown here as a permanent magnet with two magnetized poles, but in modified embodiments, it may be constructed from a multipolar magnet or from many magnetic pole pieces. Three-phase windings 2, 3, and 4 are arranged, each displaced from the others by electrically 120 degree, and are mounted on a stator. The three-phase windings 2, 3, and 4 generate three-phase fluxes by three-phase drive current signals I1, I2, and I3. The motor generates a force by the interaction between the field part of the movable member 1 and the drive current signals, and give the force to the movable member 1. A disk 1b is mounted to the movable member 1 and rotates together with the movable member 1.

A voltage converting part 52 includes an NMOS-FET switching transistor 61 which performs high-frequency switching operations at about 200 kHz. Here, the NMOS-FET switching transistor is an FET switching transistor with N-channel MOS structure (FET: Field Effect Transistor, MOS: Metal Oxide Semiconductor). In the NMOS-FET switching transistor 61, the current output terminal side is connected to a negative terminal side (−) of a DC power source part 50, and the current input terminal side is connected to one end of a converting inductor 63. The switching transistor performs high-frequency switching (on-off operations) of a power supply path through which the magnetic energy of the converting inductor 63 is replenished from a positive terminal side (+) of the DC power source part 50 to the converting inductor 63.

A flywheel diode 62 connected to the one end of the converting inductor 63 performs off-on operations complementarily with the high-frequency on-off switching operations of the NMOS-FET switching transistor 61 so as to constitute a current path forming circuit through which the converting inductor 63 is connected to a circuit including a converting capacitor 64. Thus, when the NMOS-FET switching transistor 61 is off, the flywheel diode 62 forms a current path through which a current is supplied to the circuit including the converting capacitor 64 via the converting inductor 63. When the NMOS-FET switching transistor 61 is on, a power supply path elongating from the positive terminal side of the DC power source part 50 and passing through the converting inductor 63 is formed. Therefore, the magnetic energy of the converting inductor 63 is replenished (the magnetic energy of the converting inductor 63 is increased).

When the NMOS-FET switching transistor 61 is turned off, the terminal voltage of the converting inductor 63 is rapidly raised and the flywheel diode 62 is changed to be in the conduction state. Therefore, the current path forming circuit comprising the flywheel diode 62 operates so as to supply a current to the circuit including the converting capacitor 64 (the magnetic energy of the converting inductor 63 is reduced). Thus, a converted DC voltage (Vcc−Vg) is output between one end of the converting capacitor 64 and one end of the DC power source part 50.

The converting capacitor 64 is connected between the positive output terminal side (P) and negative output terminal side (M) of the voltage converting part 52, so as to form filtering circuit for smoothing a current and voltage supplied via the converting inductor 63. In this way, the potential Vg at the negative output terminal side of the voltage converting part 52 is controlled in a variable manner by operating the NMOS-FET switching transistor 61 in high frequency PWM (PWM: pulse width modulation).

As a result, with using a DC voltage Vcc supplied from the DC power source part 50 as a power source, the converted DC voltage (Vcc−Vg) is produced between the positive output terminal side and negative output terminal side of the voltage converting part 52. Here, the negative terminal of the DC power source part 50 is set as the ground potential (0 V). The DC power source part 50 and the voltage converting part 52 together constitute a voltage supplying block for supplying a necessary DC voltage.

The NMOS-FET switching transistor 61 is configured by, for example, an FET transistor with a double diffused N-channel MOS structure, and has a switching diode 61*d* formed as a parasitic device and reversely connected in an equivalent circuit or in a direction from the current output terminal side of the transistor to the current input terminal side (alternatively, the NMOS-FET switching transistor 61 may be incorporated into an integrated circuit form so as not to form such a parasitic switching diode 61*d*).

Current output terminal sides of three first power amplifying parts 11, 12, and 13 are connected in common to the negative output terminal side of the voltage converting part 52. The first power amplifying part 11 includes a first NMOS-FET power transistor 81, amplifies an output current F1 of a first current amplifying part 41 fed to the conduction control terminal side, and outputs the amplified current. Here, the NMOS-FET power transistor is an FET power transistor with an N-channel MOS structure.

The first NMOS-FET power transistor 81 and an NMOS-FET transistor 91 forms a first NMOS-FET power current-mirror circuit. Here, the NMOS-FET power current-mirror circuit refers to a power current-mirror circuit using an FET power transistor with an N-channel MOS structure.

The cell size of the NMOS-FET power transistor 81 is set to be 100 times that of the NMOS-FET transistor 91, and the first NMOS-FET power current-minor circuit can amplify the input current to 100 times when operating in the active operation region.

The first NMOS-FET power transistor 81 is configured by an FET transistor with a double diffused N-channel MOS structure, and has a first power diode 81*d* formed as a parasitic device and reversely connected in an equivalent circuit or in a direction from the current output terminal side of the transistor to the current input terminal side.

Similarly, the first power amplifying part 12 includes a first NMOS-FET power transistor 82, amplifies an output current F2 of a first current amplifying part 42 fed to the conduction control terminal side, and outputs the amplified current. The first NMOS-FET power transistor 82 and an NMOS-FET transistor 92 forms a first NMOS-FET power current-mirror circuit. The cell size of the NMOS-FET power transistor 82 is set to be 100 times that of the NMOS-FET transistor 92.

The first NMOS-FET power transistor 82 is configured by an FET transistor with a double diffused N-channel MOS structure, and has a first power diode 82*d* formed as a parasitic device and reversely connected in an equivalent circuit or in a direction from the current output terminal side of the transistor to the current input terminal side.

Similarly, the first power amplifying part 13 includes a first NMOS-FET power transistor 83, amplifies an output current F3 of a first current amplifying part 43 fed to the conduction control terminal side, and outputs the amplified current. The first NMOS-FET power transistor 83 and an NMOS-FET transistor 93 forms a first NMOS-FET power current-mirror circuit. The cell size of the NMOS-FET power transistor 83 is set to be 100 times that of the NMOS-FET transistor 93.

The first NMOS-FET power transistor 83 is configured by an FET transistor with a double diffused N-channel MOS structure, and has a first power diode 83*d* formed as a parasitic device and reversely connected in an equivalent circuit or in a direction from the current output terminal side of the transistor to the current input terminal side.

The current output terminal sides of the first NMOS-FET power transistors 81, 82, and 83 are connected in common to the negative output terminal side of the voltage converting part 52, while the current input terminal sides thereof are connected to the power supplying terminals of the windings 2, 3, and 4, respectively. In this way, the first power amplifying parts 11, 12, and 13 supply the currents to the power supplying terminals of the winding 2, 3, and 4 by amplifying the input currents of the conduction control terminal sides, so as to supply the negative current parts of the drive current signals I1, I2, and I3 to the windings 2, 3, and 4, respectively.

Current input terminal sides of three second power amplifying parts 15, 16, and 17 are connected in common to the positive output terminal side of the voltage converting part 52 via a current detecting resistor 31. The second power amplifying part 15 includes a second NMOS-FET power transistor 85, amplifies an output current H1 of a second current amplifying part 45 fed to the conduction control terminal side, and outputs the amplified current.

The second NMOS-FET power transistor 85 and an NMOS-FET transistor 95 constitute a second NMOS-FET power current-mirror circuit. The cell size of the NMOS-FET power transistor 85 is set to be 100 times that of the NMOS-FET transistor 95, and the second NMOS-FET power current-minor circuit can amplify the input current to 101 times when operating in the active operation region.

The second NMOS-FET power transistor 85 is configured by an FET transistor with a double diffused N-channel MOS structure, and has a second power diode 85*d* formed as a parasitic device and reversely connected in an equivalent circuit or in a direction from the current output terminal side of the transistor to the current input terminal side.

Similarly, the second power amplifying part 16 includes a second NMOS-FET power transistor 86, amplifies an output current H2 of a second current amplifying part 46 fed to the conduction control terminal side, and outputs the amplified current. The second NMOS-FET power transistor 86 and an NMOS-FET transistor 96 constitute a second NMOS-FET power current-mirror circuit. The cell size of the NMOS-FET power transistor 86 is set to be 100 times that of the NMOS-FET transistor 96.

The second NMOS-FET power transistor 86 is configured by an FET transistor with a double diffused N-channel MOS structure, and has a second power diode 86*d* formed as a parasitic device and reversely connected in an equivalent circuit or in a direction from the current output terminal side of the transistor to the current input terminal side.

Similarly, the second power amplifying part 17 includes a second NMOS-FET power transistor 87, amplifies an output current H3 of a second current amplifying part 47 fed to the conduction control terminal side, and outputs the amplified current. The second NMOS-FET power transistor 87 and an NMOS-FET transistor 97 constitute a second NMOS-FET power current-mirror circuit. The cell size of the NMOS-FET power transistor 87 is set to be 100 times that of the NMOS-FET transistor 97. The second NMOS-FET power transistor 87 is configured by an FET transistor with a double diffused N-channel MOS structure, and has a second power diode 87*d* formed as a parasitic device and reversely connected in an equivalent circuit or in a direction from the current output terminal side of the transistor to the current input terminal side.

The current input terminal sides of the second NMOS-FET power transistors 85, 86, and 87 are connected in common to the positive output terminal side of the voltage converting part 52 via the resistor 31 while the current output terminal sides thereof are connected to the power supplying terminals of the windings 2, 3, and 4, respectively. In this way, the second power amplifying parts 15, 16, and 17 supply the currents to the power supplying terminals of the windings 2, 3, and 4 by amplifying the input currents of the conduction control terminal sides, so as to supply the positive current parts of the drive current signals I1, I2, and I3 to the windings 2, 3, and 4, respectively.

As a current signal forming part, for example, a supply signal forming part 30 comprises a current detection block, which consists of the current detecting resistor 31 and a level shift circuit 32, and a supply output block 33. A composed supply current Iv to the windings, which corresponds to the composed value of the positive current parts of the drive current signals I1, I2, and I3, is detected as a voltage drop across the current detecting resistor 31. The level shift circuit 32 outputs a current detected signal Bj responding with the composed supply current Iv. The supply output block 33 outputs a first supply current signal C1 and a second supply current signal C2 responding with the current detected signal Bj.

Figure 3:
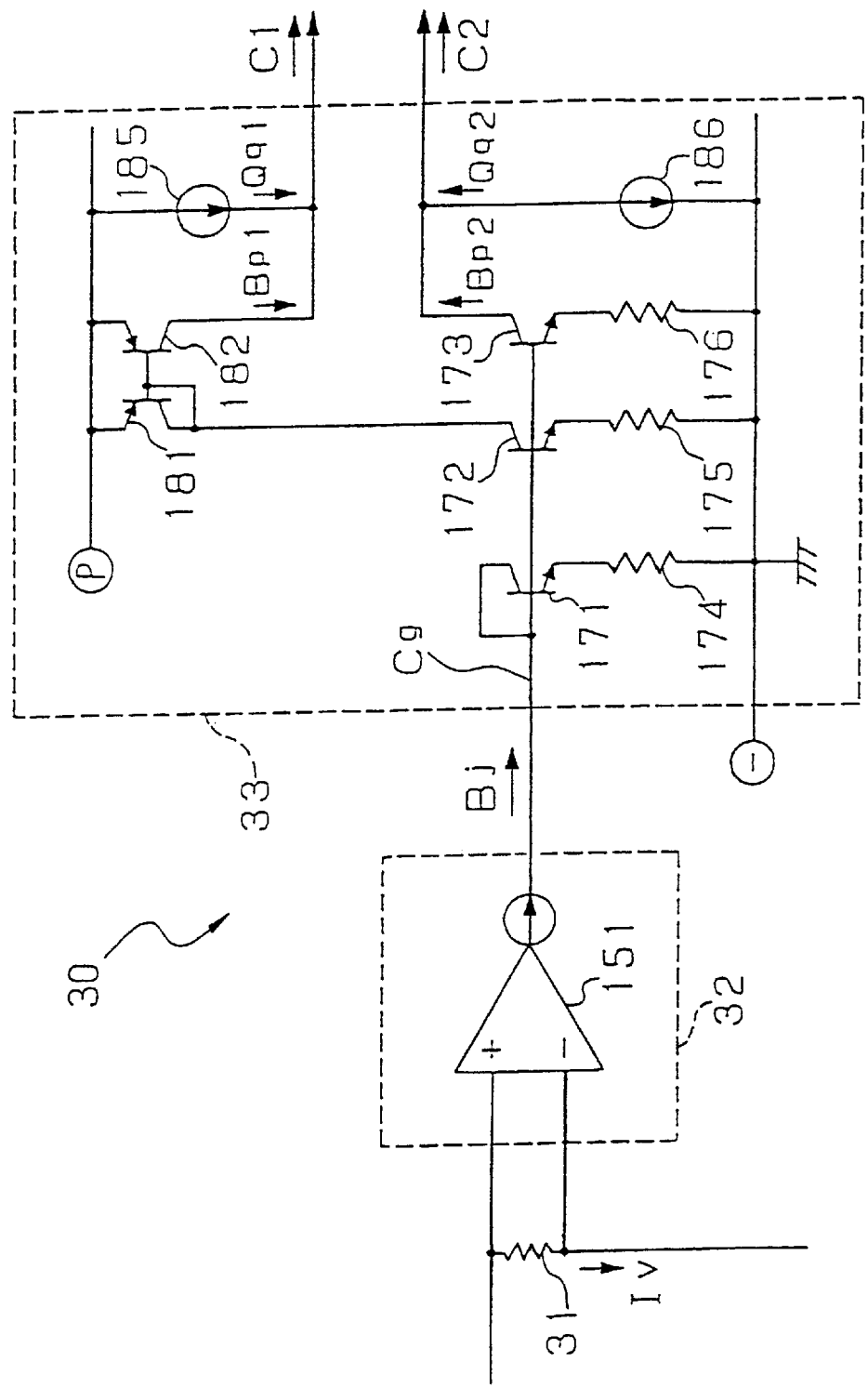
FIG. 3 is a circuit diagram of a supply signal forming part 30 in the first embodiment.

FIG. 3 shows the detailed configuration of the supply signal forming part 30. The level shift circuit 32 comprises a voltage-current converting circuit 151. The voltage-current converting circuit 151 outputs the current detected signal Bj proportional to the voltage drop across the current detecting resistor 31 due to the composed supply current Iv. The current detected signal Bj from the voltage-current converting circuit 151 flows through a transistor 171 and a resistor 174 in the supply output block 33, and a voltage signal Cg referred to the negative terminal side (−) of the DC power source part 50 is output.

A current-mirror circuit, formed from the transistors 171, 172, and 173 and the resistors 174, 175, and 176 in the supply output block 33, produces two current signals proportional to the current detected signal Bj at the collectors of the transistors 172 and 173. The collector current of the transistor 172 is output through a current-mirror circuit formed from transistors 181 and 182. Collector current Bp1 of the transistor 182 is summed with a first predetermined current Qq1 of a constant current source 185, and the summed current (Bp1+Qq1) is output as the first supply current signal C1. Collector current Bp2 of the transistor 173 is summed with a second predetermined current Qq2 of a constant current source 186, and the summed current (Bp2+Qq2) is output as the second supply current signal C2. Here, by setting the transistors 171, 172, 173, 181, and 182 at predetermined design values, the first supply current signal C1 and the second supply current signal C2 are produced as current signals responding with (proportional or substantially proportional to) the current detected signal Bj. Further, the first supply current signal C1 and the second supply current signal C2 include predetermined bias currents of the current values Qq1 and Qq2 of the constant current source 185 and 186, respectively. Here, the current values Qq1 and Qq2 of the constant current source 185 and 186 can be zero.

Figure 2:
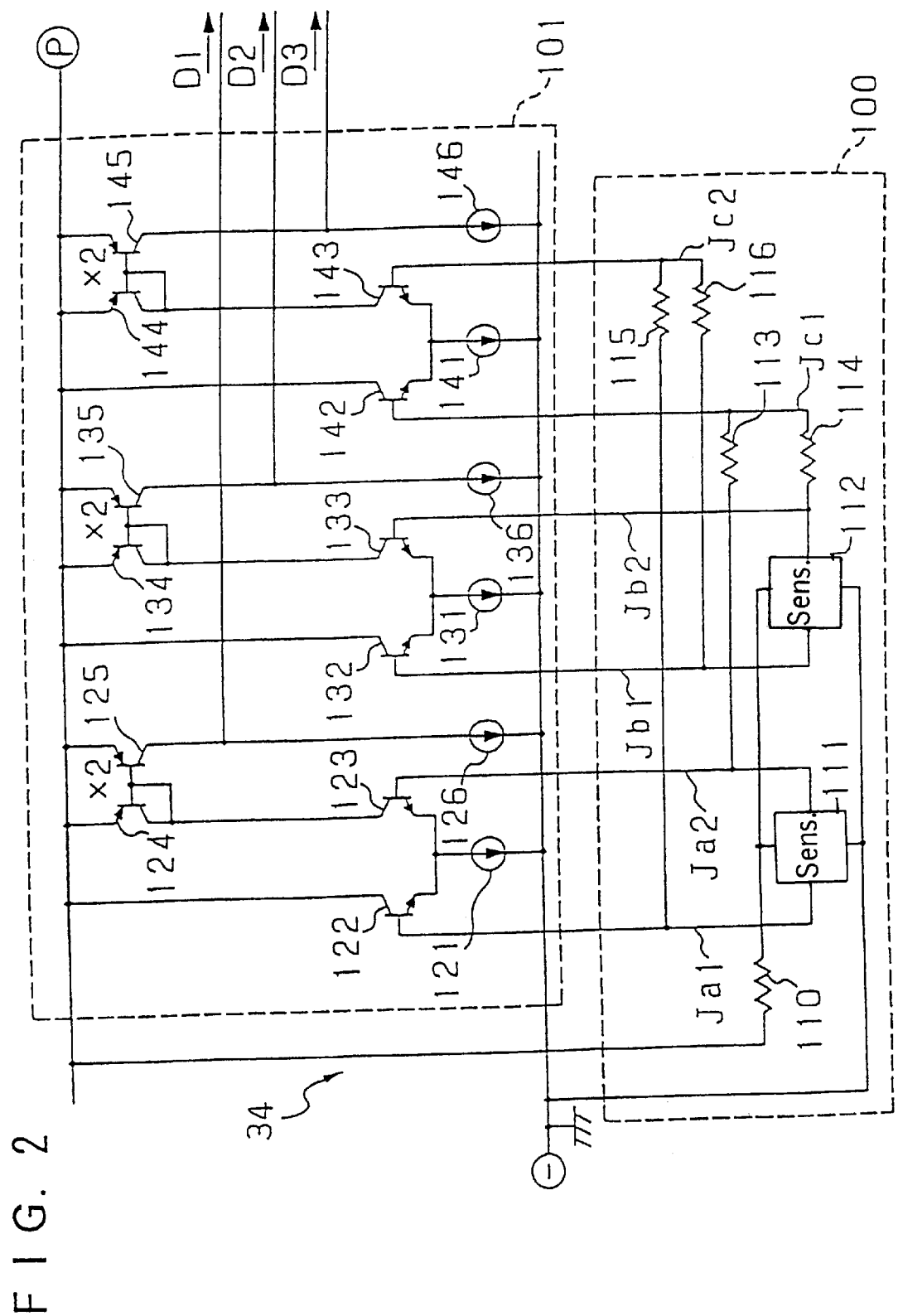
FIG. 2 is a circuit diagram of an altering signal forming part 34 in the first embodiment.

An altering signal forming part 34, shown in FIG. 1, outputs three-phase altering current signals D1, D2, and D3 varying smoothly or analoguely in order to flow the three-phase currents to the three-phase windings. FIG. 2 shows the detailed configuration of the altering signal forming part 34. In the illustrated example, the altering signal forming part 34 is configured by a position detecting block 100 and an altering signal block 101.

The position detecting block 100 includes position detecting elements 111 and 112 each consisting of a magnetic-to-electric converting element such as a Hall element. The position detecting elements 111 and 112 output two-phase position signals Ja1 and Jb1, and Ja2 and Jb2, electrically shifted in phase by 120 degree with respect to each other and varying in smooth sinusoidal form responding with the movement of the movable member 1. Here, Ja1 and Ja2 are inverted in phase with respect to each other (electrically shifted in phase by 180 degree), and Jb1 and Jb2 are inverted in phase with respect to each other. Phase inverted signals are not counted in the number of new phases. The position signals Ja2 and Jb2 are composed together by resistors 113 and 114 to produce the position signal Jc1 of a third phase, and the position signals Ja1 and Jb1 are composed together by resistors 115 and 116 to produce the position signal Jc2 of the third phase. In this way, the position detecting block 100 obtains the three-phase position signals Ja1, Jb1, and Jc1 (Ja2, Jb2, and Jc2) electrically shifted in phase by 120 degree.

Figure 29:
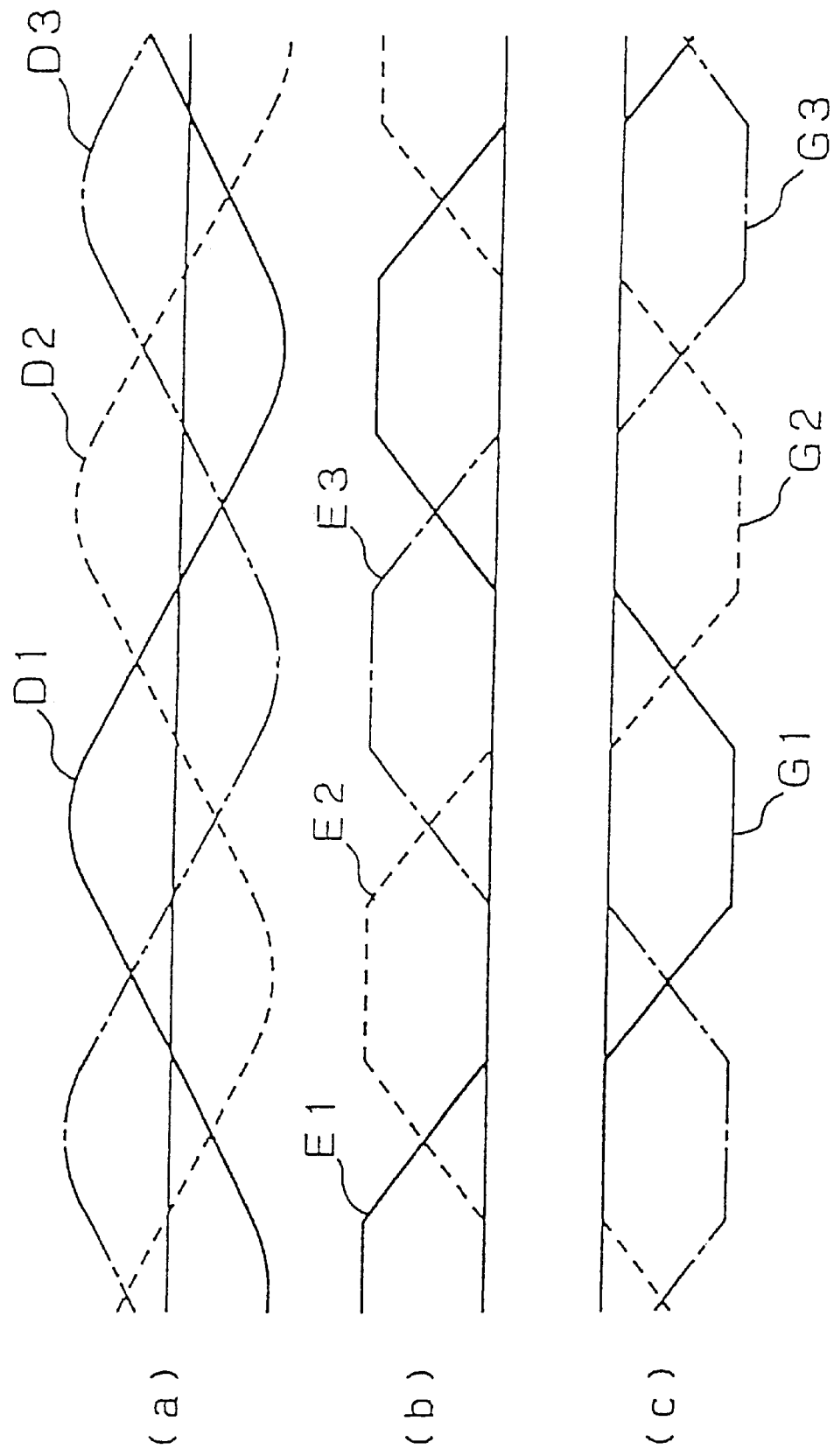
FIG. 29 is a diagram for explaining the operation of the embodiment of the present invention.

The altering signal block 101 produces the three-phase altering current signals D1, D2, and D3 varying smoothly in sinusoidal form responding with the three-phase position signals. Transistors 122 and 123 distribute the current from a constant current source 121 to the respective collector sides in accordance with a difference voltage between the first phase position signals Ja1 and Ja2. The collector current of the transistor 123 is amplified by a factor of two by a current-mirror circuit formed from transistors 124 and 125, and output from the collector of the transistor 125. The collector current of the transistor 125 is compared with the current value of a constant current source 126, and the resulting difference current is output as the first phase altering current signal D1. As a result, the altering current signal D1 varies smoothly responding with the position signal Ja1, and the current flows out during the first 180 degree electrical angle interval (positive current) and flows in during the next 180 degree interval (negative current). Similarly, the altering current signal D2 varies smoothly responding with the position signal Jb1, and the current flows out during the first 180 degree electrical angle interval (positive current) and flows in during the next 180 degree interval (negative current). Similarly, the altering current signal D3 varies smoothly responding with the position signal Jc1, and the current flows out during the first 180 degree electrical angle interval (positive current) and flows in during the next 180 degree interval (negative current). The altering current signals D1, D2, and D3 thus become three-phase sinusoidal electrical signals. FIG. 29(*a*) shows waveform examples of the altering current signals D1, D2, and D3. The horizontal scale of FIG. 29 is corresponding to the position of the movable member 1.

A distributed signal forming part 36, shown in FIG. 1, comprises a first distributor 37 and a second distributor 38. The first distributor 37 distributes the first supply current signal C1 of the supply signal forming part 30 responding with the three-phase altering current signals D1, D2, and D3 output from the altering signal forming part 34, and produces smoothly or analoguely varying three-phase first distributed current signals E1, E2, and E3. The second distributor 38 distributes the second supply current signal C2 of the supply signal forming part 30 responding with the three-phase altering current signals D1, D2, and D3 output from the altering signal forming part 34, and produces smoothly or analoguely varying three-phase second distributed current signals G1, G2, and G3.

Figure 4:
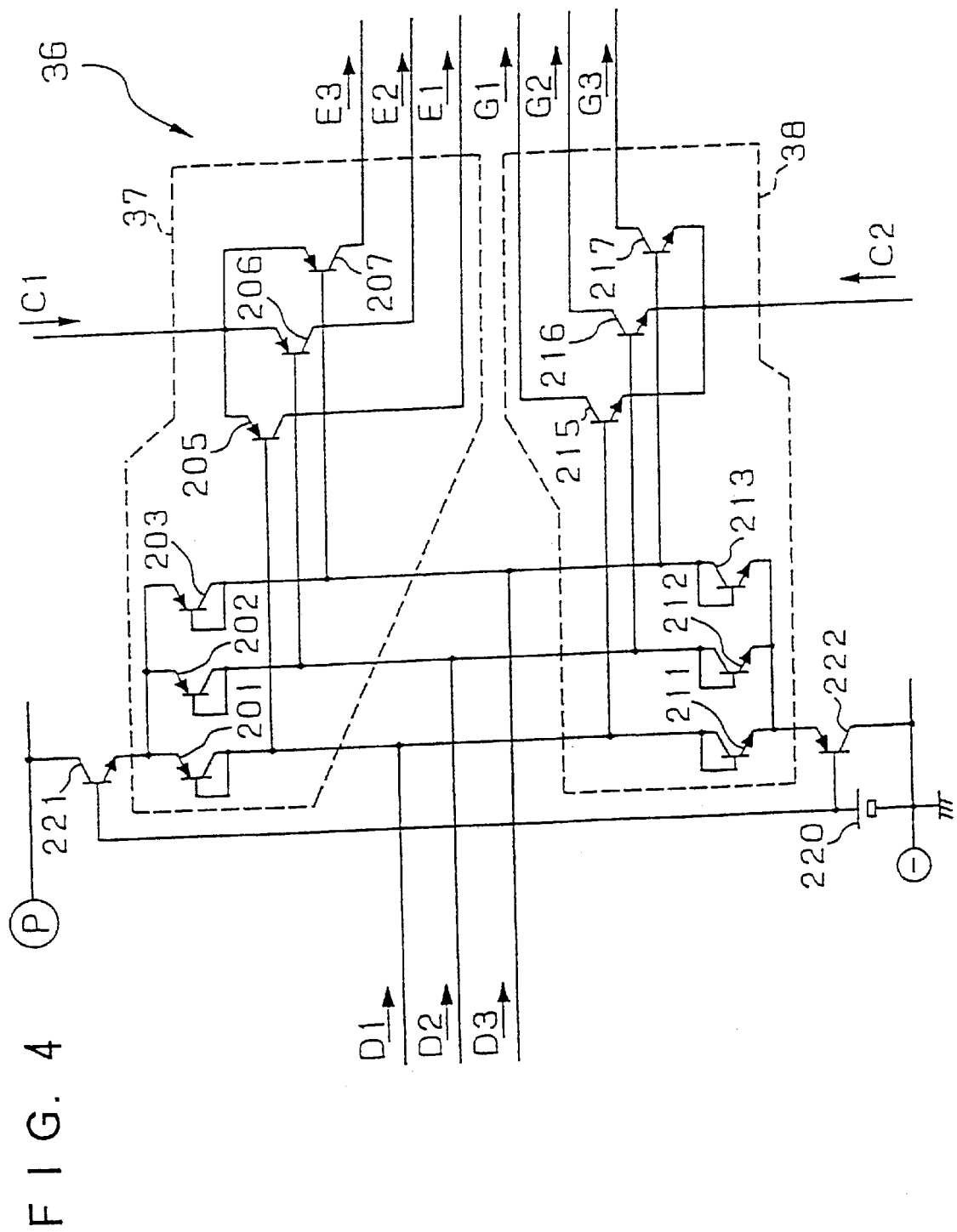
FIG. 4 is a circuit diagram of a distributed signal forming part 36 in the first embodiment.

FIG. 4 shows the detailed configuration of the distributed signal forming part 36. The first distributor 37 is configured by three first input transistors 201, 202, and 203, and three first distributing transistors 205, 206, and 207. The conduction control terminal and the signal input terminal of the current path terminal pair on each of the first input transistors 201, 202, and 203 are connected to the current input-output terminal side to which each of the three-phase altering current signals D1, D2, and D3 of the altering signal forming part 34 is supplied. The signal output terminals of the current path terminal pairs on the first input transistors 201, 202, and 203 are connected in common. The current signal input terminals of the first distributing transistors 205, 206, and 207 are connected in common, and the first supply current signal C1 from the supply signal forming part 30 is input to the common connection terminal side. The conduction control terminals of the first distributing transistors 205, 206, and 207 are connected to the current input-output terminal side to which the three-phase altering current signals D1, D2, and D3 are respectively supplied. With this configuration, the three first distributing transistors 205, 206, and 207 output the three-phase first distributed current signals E1, E2, and E3 from the current signal output terminal sides, respectively. Transistors of the same type are used as the first input transistors 201, 202, and 203 and the first distributing transistors 205, 206, and 207. Here, PNP-type bipolar transistors are used as the first input transistors 201, 202, and 203 and the first distributing transistors 205, 206, and 207. The conduction control terminal of each first input transistor is the base terminal, the signal input terminal of the current path terminal pair is the collector terminal, and the signal output terminal of the current path terminal pair is the emitter terminal. The conduction control terminal of each first distributing transistor is the base terminal, the current signal input terminal is the emitter terminal, and the current signal output terminal is the collector terminal.

The second distributor 38 is configured by three second input transistors 211, 212, and 213, and three second distributing transistors 215, 216, and 217. The conduction control terminal and the signal input terminal of the current path terminal pair on each of the second input transistors 211, 212, and 213 are connected to the current input-output terminal side to which each of the three-phase altering current signals D1, D2, and D3 of the altering signal forming part 34 is supplied. The signal output terminals of the current path terminal pairs on the second input transistors 211, 212, and 213 are connected in common. The current signal input terminals of the second distributing transistors 215, 216, and 217 are connected in common, and the second supply current signal C2 from the supply signal forming part 30 is input to the common connection terminal side. The conduction control terminals of the second distributing transistors 215, 216, and 217 are connected to the current input-output terminal side to which the three-phase altering current signals D1, D2, and D3 are respectively supplied. With this configuration, the three second distributing transistors 215, 216, and 217 output the three-phase second distributed current signals G1, G2, and G3 from the current signal output terminal sides, respectively. Transistors of the same type are used as the second input transistors 211, 212, and 213 and the second distributing transistors 215, 216, and 217. The type of transistors used as the second input transistors 211, 212, and 213 is different in polarity from that used as the first input transistors 201, 202, and 203. Here, NPN-type bipolar transistors are used as the second input transistors 211, 212, and 213 and the second distributing transistors 215, 216, and 217. The conduction control terminal of each second input transistor is the base terminal, the signal input terminal of the current path terminal pair is the collector terminal, and the signal output terminal of the current path terminal pair is the emitter terminal. The conduction control terminal of each second distributing transistor is the base terminal, the current signal input terminal is the emitter terminal, and the current signal output terminal is the collector terminal. Further, a reference voltage source 220 and transistors 221 and 222 together constitute a predetermined voltage supplying block, which supplies a first DC voltage to the common connection terminals of the first input transistors 201, 202, and 203 and a second DC voltage to the common connection terminals of the second input transistors 211, 212, and 213.

With this configuration, when the altering current signal D1 is a negative current, current flows through the first input transistor 201, but no current flows to the second input transistor 211. Conversely, when the altering current signal D1 is a positive current, current flows through the second input transistor 211, but no current flows to the first input transistor 201. In other words, a smooth current is supplied in a complementary manner to the first input transistor 201 and the second input transistor 211, and the current does not flow through the first input transistor 201 and the second input transistor 211 simultaneously. Similarly, when the altering current signal D2 is a negative current, current flows through the first input transistor 202, and when it is a positive current, current flows through the second input transistor 212. Similarly, when the altering current signal D3 is a negative current, current flows through the first input transistor 203, and when it is a positive current, current flows through the second input transistor 213.

Responding with the three-phase currents flowing through the first input transistors 201, 202, and 203, the first distributing transistors 205, 206, and 207 in the first distributor 37 distribute the first supply current signal C1 to the respective current signal outputs, thereby producing the three-phase first distributed current signals E1, E2, and E3. Accordingly, the three-phase first distributed current signals E1, E2, and E3 vary smoothly or analoguely responding with the negative current parts of the three-phase altering current signals D1, D2, and D3, and the composed value of the distributed current signals E1, E2, and E3 is equal to the first supply current signal C1. Similarly, responding with the three-phase currents flowing through the second input transistors 211, 212, and 213, the second distributing transistors 215, 216, and 217 in the second distributor 38 distribute the second supply current signal C2 to the respective current signal outputs, thereby producing the three-phase second distributed current signals G1, G2, and G3. Accordingly, the three-phase second distributed current signals G1, G2, and G3 vary smoothly or analoguely responding with the positive current parts of the three-phase altering current signals D1, D2, and D3, and the composed value of the distributed current signals G1, G2, and G3 is equal to the second supply current signal C2. FIG. 29(b) shows waveform examples of the three-phase first distributed current signals E1, E2, and E3, and FIG. 29(c) shows waveform examples of the three-phase second distributed current signals G1, G2, and G3. These signals vary smoothly in the rising and falling slope portions.

The first distributed current signals E1, E2, and E3 have a phase difference of 120 degree with respect to each other, and the second distributed current signals G1, G2, and G3 have a phase difference of 120 degree with respect to each other. The first distributed current signal E1 and the second distributed current signal G1 vary smoothly in a complementary manner while retaining a phase difference of 180 degree, and at any given time, either E1 or G1 is at zero. Similarly, the first distributed current signal E2 and the second distributed current signal G2 vary smoothly in a complementary manner while retaining a phase difference of 180 degree, and at any give time, either E2 or G2 is at zero. Similarly, the first distributed current signal E3 and the second distributed current signal G3 vary smoothly in a complementary manner while retaining a phase difference of 180 degree, and at any give time, either E3 or G3 is at zero.

The first distributed current signals E1, E2, and E3 from the first distributor 37 in FIG. 1 are input to the first current amplifying parts 41, 42, and 43, respectively. The first current amplifying parts 41, 42, and 43 amplify the first distributed current signals E1, E2, and E3 by a predetermined factor to produce the first amplified current signals F1, F2, and F3, respectively. The current amplifying parts 41, 42, and 43 supply the first amplified current signals F1, F2, and F3 to the conduction control terminal sides of the first power amplifying parts 11, 12, and 13, respectively. The first power amplifying parts 11, 12, and 13 amplify the three-phase first amplified current signals F1, F2, and F3 and supply the negative current parts of the drive current signals I1, I2, and I3 to the windings 2, 3, and 4, respectively.

Figure 5:
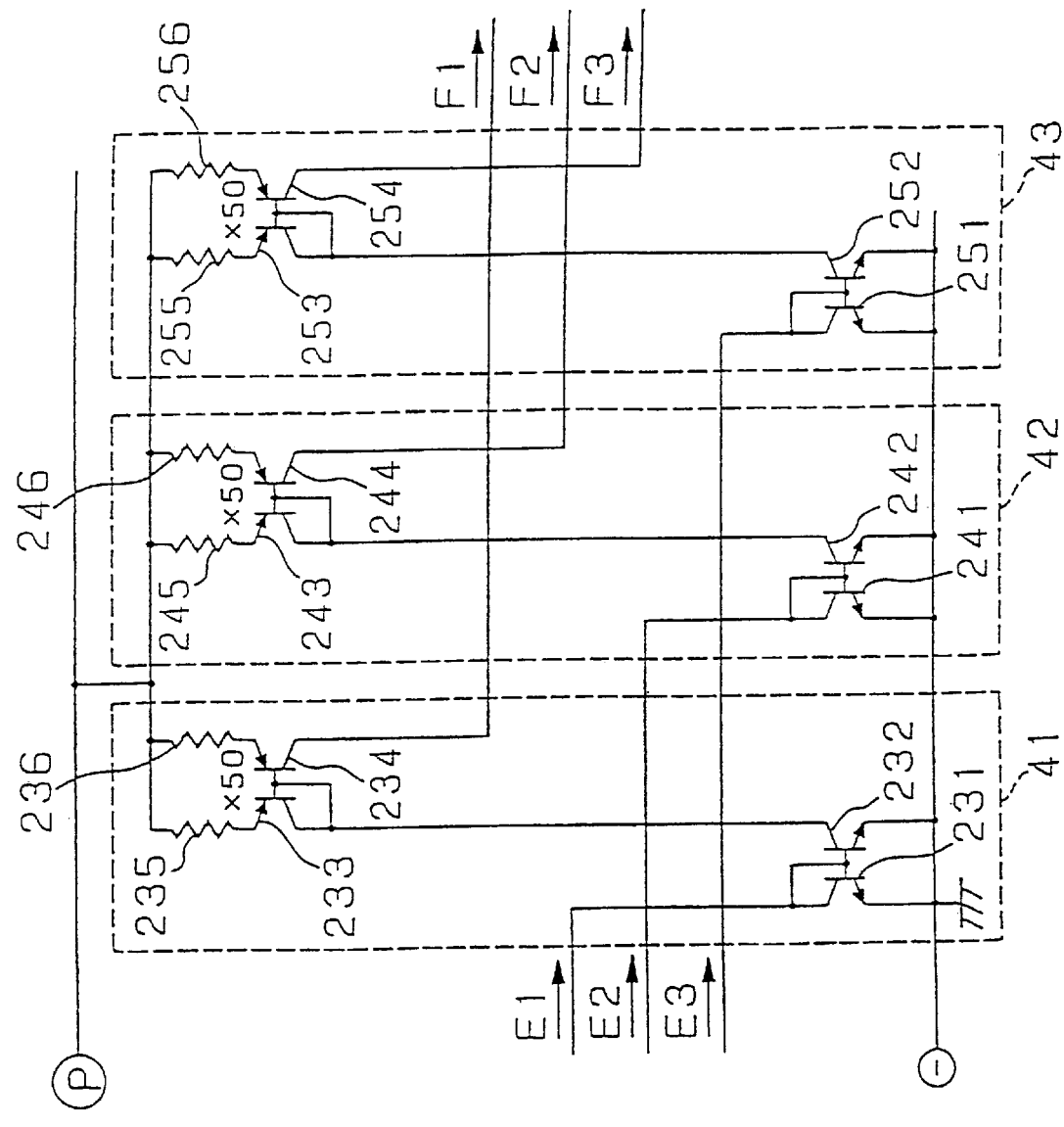
FIG. 5 is a circuit diagram of first current amplifying parts 41, 42, and 43 in the first embodiment.

FIG. 5 shows the detailed configuration of the first current amplifying parts 41, 42, and 43. The first current amplifying part 41 comprises a front end current-mirror circuit formed from transistors 231 and 232 and a back end current-mirror circuit formed from transistors 233, 234 and resistors 235, 236, the front end and back end current-mirror circuits being connected in cascade to form a first amplifying part current-mirror circuit. The ratio of the emitter areas of the transistors 231 and 232 is set to 1, and thus the current amplifying ratio of the front end current-mirror circuit is set to 1. The ratio of the emitter areas of the transistors 233 and 234 is set to 50 and the ratio of the resistors 236 and 235 to 50, and thus the current amplifying ratio of the back end current-mirror circuit is set to 50. As a result, the first amplifying part current-mirror circuit in the first current amplifying part 41 amplifies the current by a factor of 50 in terms of the current amplifying ratio. Similarly, the first current amplifying part 42 comprises a first amplifying part current-mirror circuit formed from transistors 241, 242, 243, 244 and resistors 245, 246, and amplifies the current by a factor of 50 in terms of the current amplifying ratio. Similarly, the first current amplifying part 43 comprises a first amplifying part current-mirror circuit formed from transistors 251, 252, 253, 254 and resistors 255, 256, and amplifies the current by a factor of 50 in terms of the current amplifying ratio. With this configuration, the first current amplifying parts 41, 42, and 43 produce the three-phase first amplified current signals F1, F2, and F3 by amplifying the three-phase first distributed current signals E1, E2, and E3 by a factor of 50, and supply the first amplified current signals to the conduction control terminal sides of the first power current-mirror circuits of the first power amplifying parts 11, 12, and 13.

The second distributed current signals G1, G2, and G3 from the second distributor 38 in FIG. 1 are input to the second current amplifying parts 45, 46, and 47, respectively. The second current amplifying parts 45, 46, and 47 amplify the second distributed current signals G1, G2, and G3 by a predetermined factor to produce the second amplified current signals H1, H2, and H3, respectively. A high voltage outputting part 53 charges upconverting capacitors responding with a high frequency pulse signal, and produces a high level potential Vu higher than the positive terminal side potential Vcc of the DC power source part 50. The second current amplifying parts 45, 46, and 47 supply the second amplified current signals H1, H2, and H3 from the high level point Vu of the high voltage outputting part 53 to the respective conduction control terminal sides of the second power amplifying parts 15, 16, and 17. The second power amplifying parts 15, 16, and 17 amplify the three-phase second amplified current signals H1, H2, and H3 and supply the positive current parts of the drive current signals I1, I2, and I3 to the windings 2, 3, and 4, respectively.

Figure 6:
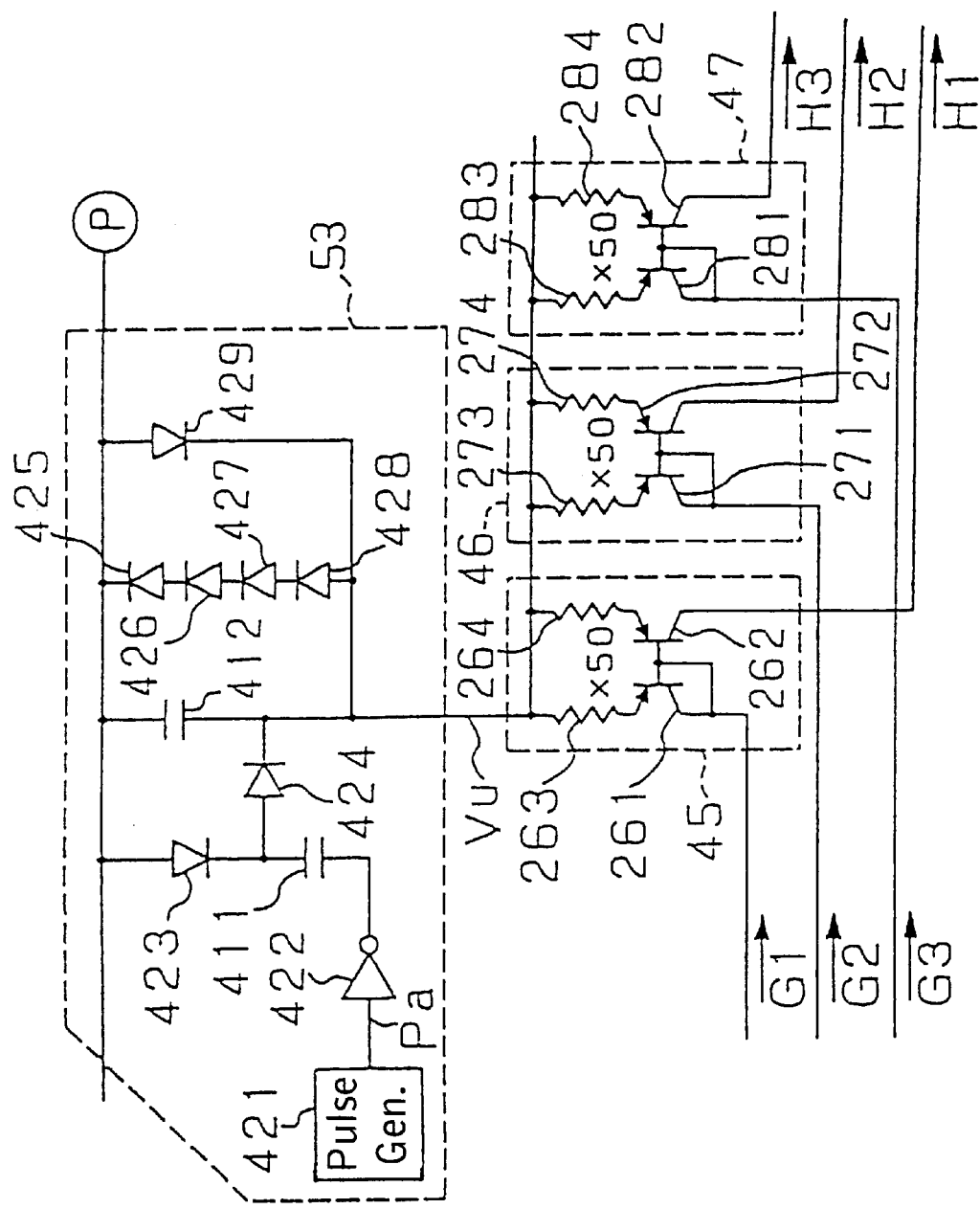
FIG. 6 is a circuit diagram of second current amplifying parts 45, 46, and 47 and a high-voltage outputting part 53 in the first embodiment.

FIG. 6 shows the detailed configuration of the second current amplifying parts 45, 46, and 47 and the high voltage outputting part 53. The high voltage outputting part 53 comprises: a pulse generating circuit 421 for outputting a high frequency pulse signal Pa of about 100 kHz; a first upconverting capacitor 411; a second upconverting capacitor 412; a first voltage limit circuit consisting of diodes 425 to 428; and a second voltage limit circuit consisting of a diode 429. Responding with the pulse signal Pa of the pulse generating circuit 421, an inverter 422 changes in a digital manner. When the inverter 422 is at "L" (Low, or at, for example, the negative terminal side potential of the DC power source part 50), the first upconverting capacitor 411 is charged via a diode 423. When the inverter 422 changes to "H" (High, or to, for example, the positive terminal side potential of the DC power source part 50), the electric charge stored in the first upconverting capacitor 411 is transferred to the second upconverting capacitor 412 via a diode 424, thus charging the second upconverting capacitor 412. As a result, the high level potential Vu higher than the positive output terminal side potential of the voltage converting part 52 is output at a terminal of the second upconverting capacitor 412. The high level potential Vu is coupled to the second current amplifying parts 45, 46, and 47.

Here, if the second upconverting capacitor 412 is continued to be charged, the high level voltage Vu will become too high, leading to the possibility of voltage breakdown of the transistors and diodes constructed in integrated circuit form. To prevent the high level voltage Vu from increasing above a predetermined voltage, the voltage is limited by the first voltage limit circuit consisting of the diodes 425 to 428. If there is no concern of voltage breakdown, the first voltage limit circuit may be omitted.

The second amplified current signals H1, H2, and H3 operate so as to discharge the charge stored in the second upconverting capacitor 412. When a large current operation continues for a sustained period of time, for example, when starting the motor, a situation can occur where the amount of charge stored in the second upconverting capacitor 412 becomes low, resulting in a considerable drop in the potential Vu at the output voltage point of the high voltage outputting part 53. This can make the circuit operation temporarily unstable, hampering the starting operation. To address this, the second voltage limit circuit consisting of the diode 429 is provided to prevent the high level potential Vu of the high voltage outputting part 53 from dropping considerably. Here, in the normal control state where the current level is small, the second voltage limit circuit is not put in operation. Further, in applications where the variation of the potential Vu is small, the second voltage limit circuit may be omitted.

The second current amplifying part 45 comprises a second amplifying part current-mirror circuit formed from transistors 261, 262 and resistors 263, 264. The ratio of the emitter areas of the transistors 261 and 262 is set to 50 and the ratio of the resistors 264 and 263 to 50, to provide a current amplifying ratio of 50. As a result, the second amplifying part current-mirror circuit in the second current amplifying part 45 amplifies the current by a factor of 50 in terms of the current amplifying ratio. Similarly, the second current amplifying part 46 comprises a second amplifying part current-mirror circuit formed from transistors 271, 272 and resistors 273, 274, and amplifies the current by a factor of 50 in terms of the current amplifying ratio. Similarly, the second current amplifying part 47 comprises a second amplifying part current-mirror circuit formed from transistors 281, 282 and resistors 283, 284, and amplifies the current by a factor of 50 in terms of the current amplifying ratio. With this configuration, the second current amplifying parts 45, 46, and 47 produce the second amplified current signals H1, H2, and H3 by amplifying the three-phase second distributed current signals G1, G2, and G3 by a factor of 50, and supply the second amplified current signals from the high level point Vu of the high voltage outputting part 53 to the conduction control terminal sides of the second power current-mirror circuits of the second power amplifying parts 15, 16, and 17.

A conversion control part 51, shown in FIG. 1, outputs a conversion control signal Vd responding with a command signal Ad. The command signal Ad is obtained, for example, by a speed control block that compares a speed of the movable member 1 with a desired speed. In the voltage converting part 52, a PWM part 65 produces a high frequency PWM signal Sw (pulse width modulated signal) having a pulse width responding with the conversion control signal Vd of the conversion control part 51, thereby causing the NMOS-FET switching transistor 61 to perform high-frequency switching (including the case where the NMOS-FET switching transistor is always on). That is, the PWM switching operation of the NMOS-FET switching transistor 61 in the voltage converting part 52 is controlled responding with the conversion control signal Vd of the conversion control part 51. The voltage converting part 52 produces the converted DC voltage (Vcc–Vg) responding with the PWM switching operation of the NMOS-FET switching transistor 61, converted from the DC voltage Vcc of the DC power supply part 50 as a power source.

Figure 7:
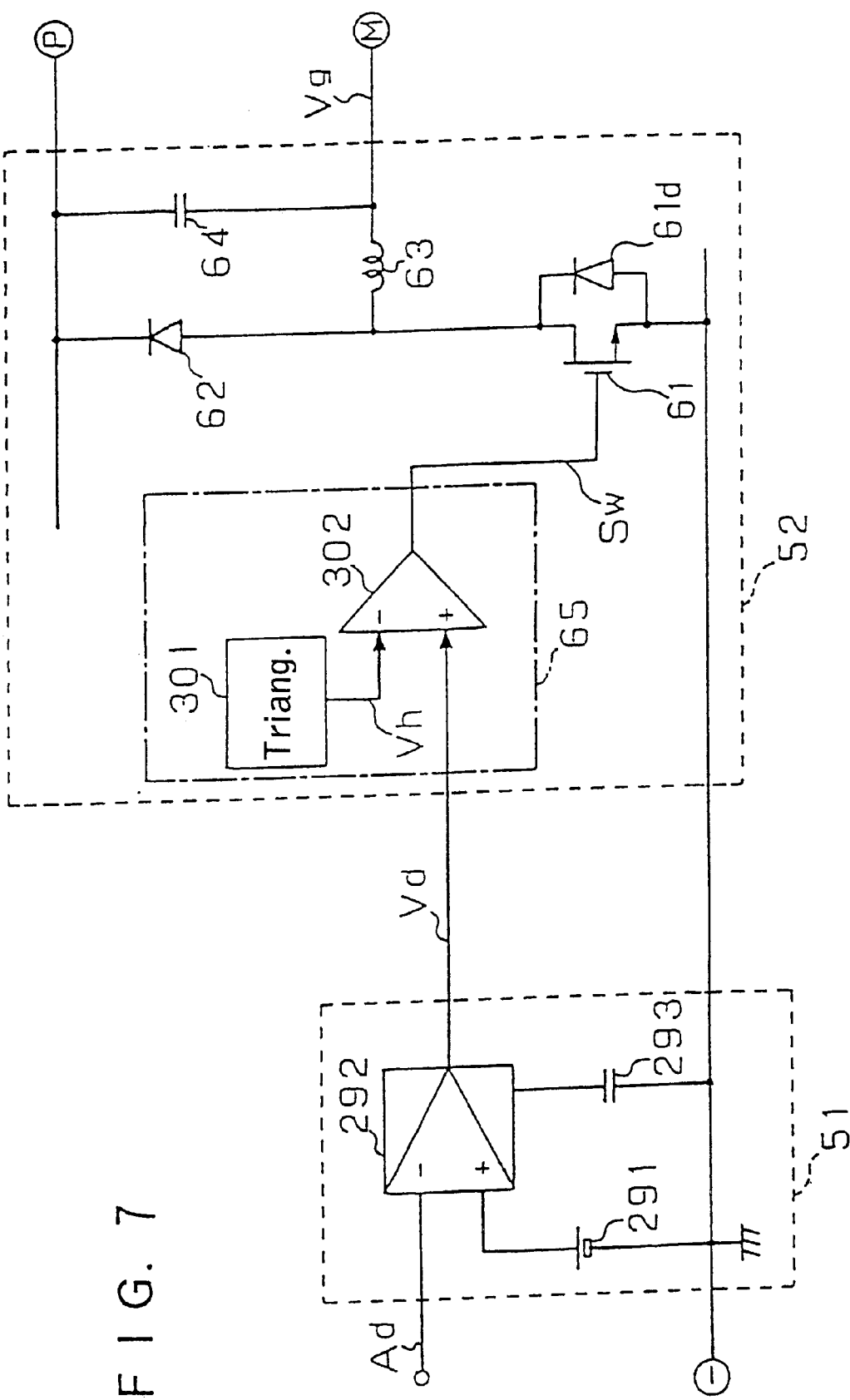
FIG. 7 is a circuit diagram of a conversion control part 51 and a voltage converting part 52 in the first embodiment.

FIG. 7 shows the detailed configuration of the conversion control part 51 and the voltage converting part 52. In the conversion control part 51, a differential amplifier circuit 292 compares the command signal Ad with the voltage value of a reference voltage source 291, and amplifies the resulting difference voltage to output the conversion control signal Vd. A capacitor 293 constitutes a filter in the differential amplifier circuit 292.

The PWM part 65 in the voltage converting part 52 includes a triangular signal generating circuit 301 and a comparator 302. The triangular signal generating circuit 301 generates a triangular signal Vh of about 200 kHz. The comparator 302 compares the triangular signal Vh of the triangular signal generating circuit 301 with the conversion control signal Vd of the conversion control part 51, and produces the PWM voltage signal Sw responding with the conversion control signal Vd. The PWM signal Sw is supplied to the conduction control terminal side of the NMOS-FET switching transistor 61, and the NMOS-FET switching transistor 61 performs on-off operations responding with the PWM signal Sw. The NMOS-FET switching transistor 61 performs high-frequency switching of the power supply path through which the magnetic energy of the converting inductor 63 is replenished from the positive terminal side of the DC power source part 50. The flywheel diode 62 constituting the current path forming circuit performs off-on operations complementarily to the high-frequency switching on-off operations of the NMOS-FET switching transistor 61, and forms the current path from the converting inductor 63 to the circuit including the converting capacitor 64. With the increase and decrease of the magnetic energy of the converting inductor 63 associated with the high-frequency switching of the NMOS-FET switching transistor 61, the converted DC voltage (Vcc–Vg) is output between one end of the converting capacitor 64 and one end of the DC power source part 50. In this way, with the DC voltage from the DC power source part 50 as a power source, the NMOS-FET switching transistor 61 performs high frequency PWM operations (pulse width modulation operation) responding with the conversion control signal Vd, controls the potential Vg at the negative output terminal side of the voltage converting part 52, and outputs the converted DC voltage (Vcc–Vg) between the positive output terminal side and negative output terminal side of the voltage converting part 52. The converted DC voltage (Vcc–Vg) is supplied to the first power amplifying parts 11, 12, and 13 which are connected in parallel, and also to the second power amplifying parts 15, 16, and 17 which are connected in parallel.

Figure 8:
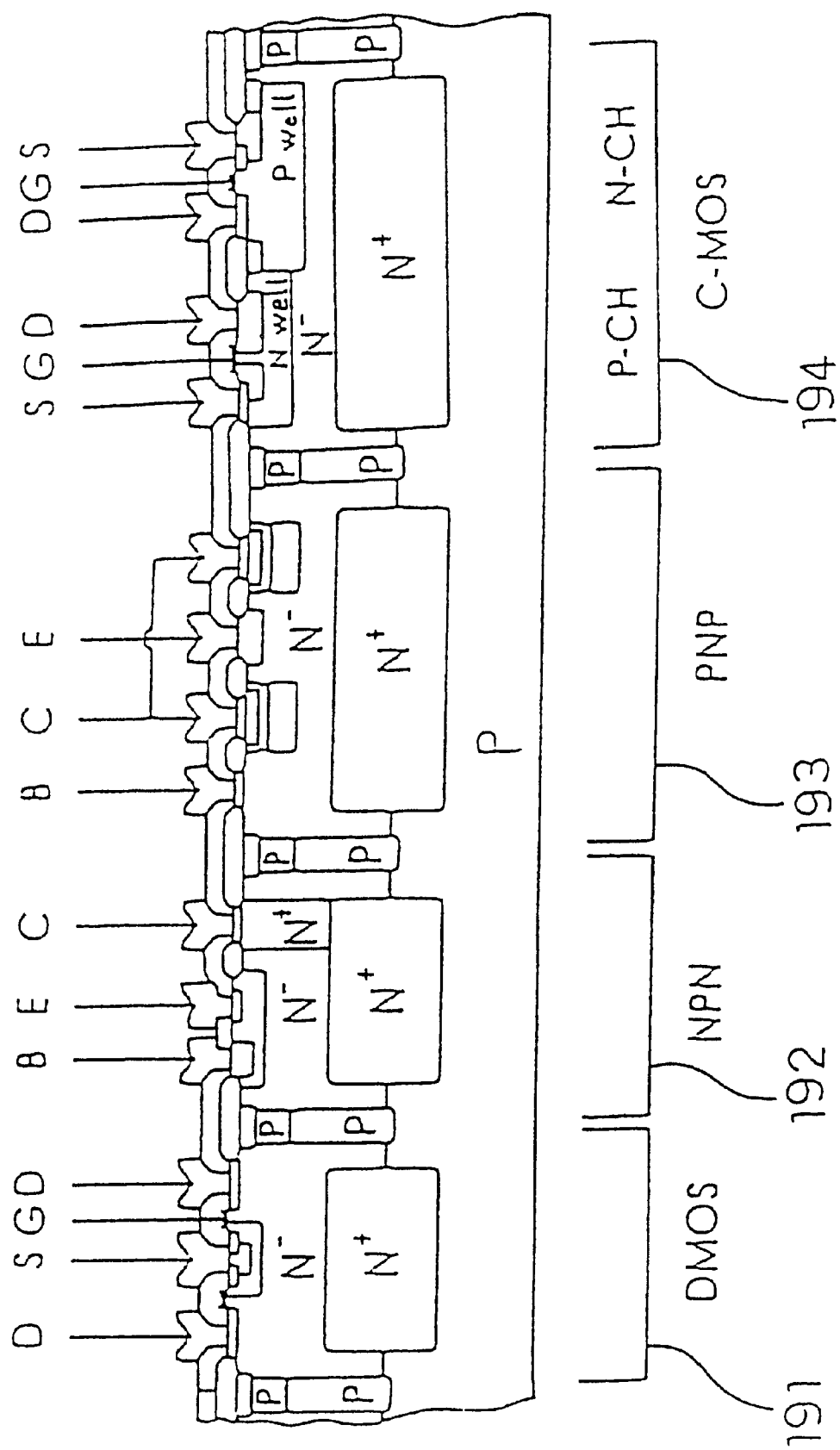
FIG. 8 is a cross sectional view of a portion of an integrated circuit in the first embodiment.

In FIG. 1, the first power transistors 81, 82, and 83 in the first power amplifying parts 11, 12, and 13, the second power transistors 85, 86, and 87 in the second power amplifying parts 15, 16, and 17, and the switching transistor 61 in the voltage converting part 52 are fabricated in integrated circuit form on a single silicon substrate, each isolated by junctions from the others, together with the transistors, resistors, and other components in the supply signal forming part 30, the altering signal forming part 34, the distributed signal forming part 36, the first current amplifying parts 41, 42, and 43, the second current amplifying parts 45, 46, and 47, the conversion control part 51, the voltage converting part 52, and the high voltage outputting part 53. FIG. 8 shows one example of an integrated circuit process. Various transistors are formed by diffusing required N+ layers, N– layers, P+ layers, P– layers, etc. into a P type silicon substrate. Reference numeral 191 designates an example of an FET transistor with a double diffused N-channel MOS structure; the transistors of this type are used as the first NMOS-FET power transistors, the second NMOS-FET power transistors, and the NMOS-FET switching transistor. Reference numeral 192 designates an example of an NPN-type bipolar transistor; the transistors of this type are used as signal amplifying transistors. Reference numeral 193 designates an example of an PNP-type bipolar transistor; the transistors of this type are used as signal amplifying transistors. The reference numeral 194 designates an example of a P-channel and a N-channel CMOS FET transistors which are used for logic signal processing. Each transistor is isolated from the others by P layers which are held at the same potential as the silicon substrate connected to the ground potential (0 V). The integrated circuit with junction isolations, compared with integrated circuits with dielectric isolations, achieves high density integration of a large number of power transistors and signal transistors on a small one-chip substrate by using a low cost fabrication process. In other words, a junction-isolated integrated circuit can be economically produced. A specific mask layout is a design matter and hence a detailed description of the layout is omitted.

Next, the operation of the motor of FIG. 1 will be described. The altering signal forming part 34 produces the smoothly varying three-phase altering current signals D1, D2, and D3, and supplies the signals to the distributed signal forming part 36. The first distributor 37 distributes the first supply current signal C1 of the supply signal forming part 30, responding with the three-phase altering current signals D1, D2, and D3, and outputs the three-phase first distributed current signals E1, E2, and E3. The first current amplifying parts 41, 42, and 43 output the first amplified current signals F1, F2, and F3 by amplifying the first distributed current signals E1, E2, and E3 by a predetermined current amplifying ratio, and supply the signals to the respective conduction control terminal sides of the first power amplifying parts 11, 12, and 13. The first power amplifying parts 11, 12, and 13 amplify the first amplified current signals F1, F2, and F3, and supply the negative current parts of the drive current signals I1, I2, and I3 to the three-phase windings 2, 3, and 4, respectively. Here, the supply signal forming part 30, the first distributor 37, and the first current amplifying parts 41, 42, and 43 together form a first distribution control block, which controls the first power amplifying parts 11, 12, and 13 responding with the output signals from the altering signal forming part 34.

On the other hand, the second distributor 38 distributes the second supply current signal C2 of the supply signal forming part 30, responding with the three-phase altering current signals D1, D2, and D3, and outputs the three-phase second distributed current signals G1, G2, and G3. The second current amplifying parts 45, 46, and 47 output the second amplified current signals H1, H2, and H3 by amplifying the second distributed current signals G1, G2, and G3 by a predetermined current amplifying ratio, and supply the signals to the respective conduction control terminal sides of the second power amplifying parts 15, 16, and 17. The second power amplifying parts 15, 16, and 17 amplify the second amplified current signals H1, H2, and H3, and supply the positive current parts of the drive current signals I1, I2, and I3 to the three-phase windings 2, 3, and 4, respectively. Here, the supply signal forming part 30, the second distributor 38, and the second current amplifying parts 45, 46, and 47 together form a second distribution control block, which controls the second power amplifying parts 15, 16, and 17 responding with the output signals from the altering signal forming part 34.

The current detecting resistor 31 in the supply signal forming part 30 detects the composed supply current Iv which is a composed value of the positive current parts of the drive current signals I1, I2, and I3, and produces the current detected signal Bj responding with the composed supply current Iv, via the level shift circuit 32. The supply output block 33 outputs the first supply current signal C1 and the second supply current signal C2 responding with the current detected signal Bj. The first supply current signal C1 and the second supply current signal C2 vary proportionally or substantially proportionally to the composed supply current signal Iv.

The first distribution control block (comprising of the supply signal forming part 30, the first distributor 37, and the first current amplifying parts 41, 42, and 43) produces the three-phase first amplified current signals F1, F2, and F3 (the first three-phase current signals), each of which varies smoothly at last in the rising and falling slopes, and supplies the first amplified current signals F1, F2, and F3 to the conduction control terminal sides of the first power amplifying parts 11, 12, and 13, respectively. In this way, the current path altering operation by the three first NMOS-FET power transistors 81, 82, and 83 is performed smoothly, and at least one of three first NMOS-FET power transistors 81, 82, and 83 is caused to perform the ON operation with a resistive voltage drop. Here, the ON operation with a resistive voltage drop means the full ON state of a FET transistor. In other words, in the ON operation with a resistive voltage drop, the voltage between the current input and current output terminal sides of the transistor is a voltage drop that varies proportionally or substantially proportionally to the current through the current path terminal pair of the transistor. Accordingly, each of the first NMOS-FET power transistors smoothly varies the current value by performing a current amplification operation of the half ON operation within the active region in portions of the rising and falling slopes of the current. After the current path has been formed, each of the first NMOS-FET power transistors performs an ON operation with a resistive voltage drop. Therefore, the occurrence of spike voltages are avoided in current path altering operation, and the drive current signals I1, I2, and I3 to the windings 2, 3, and 4 vary smoothly.

The second distribution control block (comprising of the supply signal forming part 30, the second distributor 38, and the second current amplifying parts 45, 46, and 47) produces the three-phase second amplified current signals H1, H2, and H3 (the second three-phase current signals), each of which varies smoothly at least in the rising and falling slopes, and supplies the second amplified current signals H1, H2, and H3 to the conduction control terminal sides of the second power amplifying parts 15, 16, and 17, respectively. In this way, the current path altering operation by the three second NMOS-FET power transistors 85, 86, and 87 is performed smoothly, and at least one of the three second NMOS-FET power transistors 85, 86, and 87 is caused to perform the ON operation with a resistive voltage drop. Accordingly, each of the second NMOS-FET power transistors smoothly varies the current value by performing a current amplification operation of the half ON operation within the active region in portions of the rising and falling slopes of the current. After the current path has been formed, each of the second NMOS-FET power transistors performs an ON operation with a resistive voltage drop. Therefore, the occurrence of spike voltages are avoided in the current path altering operation, and the drive current signals I1, I2, and I3 to the windings 2, 3, and 4 vary smoothly.

The first distribution control block and the first power amplifying parts form a first positive feedback loop, whose combined transfer gain (the combined forward gain of the supply signal forming part 30, the first distributor 37, the first current amplifying parts 41, 42, and 43, and the first power amplifying parts 11, 12, and 13) is made larger than unity. Similarly, the second distribution control block and the second power amplifying parts form a second positive feedback loop, whose combined transfer gain (the combined forward gain of the supply signal forming part 30, the second distributor 38, the second current amplifying parts 45, 46, and 47, and the second power amplifying parts 15, 16, and 17) is made larger than unity. Therefore, the operation of the motor can be stabilized. In other words, at least one of the three first NMOS-FET power transistors 81, 82, and 83 is surely performing the ON operation with a resistive voltage drop and at least one of the three second NMOS-FET power transistors 85, 86, and 87 is surely performing the ON operation with a resistive voltage drop, thereby forming a current path to the windings. Further, the loop transfer gains of the two positive feedback loops are set as small as possible, to ensure smooth altering operation of the current paths.

The first distributed current signal E1 and the second distributed current signal GI of the same phase flow in a complementary manner with a phase difference of 180 degree with respect to each other. Accordingly, the first power amplifying part 11 and the second power amplifying part 15 operate in a complementary manner, so that the bidirectional drive current signal I1 varying smoothly and continuously is supplied to the winding 2. Similarly, the first distributed current signal E2 and the second distributed current signal G2 flow in a complementary manner with a phase difference of 180 degree with respect to each other, and the first power amplifying part 12 and the second power amplifying part 16 thus operate in a complementary manner, so that the bidirectional drive current signal I2 varying smoothly and continuously is supplied to the winding 3. Similarly, the first distributed current signal E3 and the second distributed current signal G3 flow in a complementary manner with a phase difference of 180 degree with respect to each other, and the first power amplifying part 13 and the second power amplifying part 17 thus operate in a complementary manner, so that the bidirectional drive current signal I3 varying smoothly and continuously is supplied to the winding 4. In this way, the first power amplifying part and second power amplifying part of the same phase are not placed in the conducting state at the same time, and therefore, a short-circuiting current does not occur between the positive output terminal side and the negative output terminal side of the voltage converting part 52. As a result, breakdown due to excessive temperature rise or overcurrent of the power transistors does not occur. Furthermore, since the smoothly varying continuous drive current signals I1, I2, and I3 are supplied to the windings 2, 3, and 4, there is no occurrence of spike voltages in the windings 2, 3, and 4, nor does a situation occur where abnormal currents flow via the parasitic devices, i.e., the first power diodes 81d, 82d, 83d, and the second power diodes 85d, 86d, 86d. Therefore, the pulsation of the generated force is remarkably reduced.

The conversion control part 51 produces the conversion control signal Vd responding with the command signal Ad, and the voltage converting part 52 changes the potential Vg at the negative output terminal side by switching the NMOS-FET switching transistor 61 in high frequency PWM mode responding with the conversion control signal Vd. The converted DC voltage (Vcc−Vg) from the voltage converting part 52 is supplied to the first power amplifying parts 11, 12, and 13 and the second power amplifying parts 15, 16, and 17, thereby forming the respective current paths to the windings 2, 3, and 4 via the selected first NMOS-FET power transistors and the selected second NOMS-FET power transistors. As a result, the composed supply current Iv to the windings 2, 3, and 4 is controlled by the converted DC voltage (Vcc−Vg) from the voltage converging part 52 responding with the command signal Ad.

As described above, the embodiment has a motor configuration suitable for implementation in integrated circuit form. First, since the power devices are realized by using MOS-FET switching transistors and MOS-FET power transistors as power devices, these devices can be implemented in integrated circuit form on a small chip. In particular, as a result of recent studies, it is prospected that MOS-FET power devices can be realized at a low cost by integration on the same chip. The transistors, diodes, resistors, and other semiconductor devices in the supply signal forming part 30, the altering signal forming part 34, the distributed signal forming part 36, the first current amplifying parts 41, 42, and 43, the second current amplifying parts 45, 46, and 47, the conversion control part 51, the voltage converting part 52, and the high voltage outputting part 53 are integrated on a single chip with being junction-isolated, together with the above-mentioned MOS-FET power transistors and MOS-FET switching transistor. As composed with a dielectrically isolated integrated circuit, integration of a junction-isolated integrated circuit can be performed with a high density on a small chip substrate, with the result that such an integrated circuit can be economically realized. FET transistors with a double diffused MOS structure are used as the first and second NMOS-FET power transistor, and integrated on a small size chip. When FET transistors with a double diffused MOS structure are used, parasitic power diodes are formed from the current output terminal side toward the current input terminal side. However, since the current path altering operation is performed smoothly, the parasitic power diodes are prevented from operating is prevented, and pulsation of the drive currents is thus reduced.

Further, in the embodiment, the operation of the parasitic transistor devices formed at junction-isolated portions is prevented, thereby providing the configuration suitable for integrated circuit implementation. The integrated circuit using the junction-isolated technique, as shown in FIG. 8, achieves a low cost IC suitable for high density integration. However, such an integrated circuit has a disadvantage that many parasitic transistor devices are formed, with the junction isolation portions connected to the negative terminal side (ground potential) of the DC power source part working as the base terminals. Usually, these parasitic transistor devices are reversely biased so as not to operate. However, when a terminal potential of integrated transistor becomes lower than the ground potential by the forward voltage drop of a diode, a situation occurs that the parasitic transistors operates to take currents from other integrated transistors. In applications such as a motor where large currents are supplied to the converting inductors and the windings having inductances, the operation of the integrated transistors may be seriously interfered with if the parasitic transistors operate, and the motor cannot be normally operated. The NMOS-FET switching transistor 61 in the embodiment is connected at the current output terminal side to the negative terminal side of the DC power source part 50 and at the current input terminal side to one end of the converting inductor 63, and performs high-frequency switching of the power supply path to replenish magnetic energy of the converting inductor 63 from the positive terminal side of the DC power source part 50. The flywheel diode 62 constituting the current path forming circuit is connected between the one end of the converting inductor 63 and the positive terminal side of the DC power source part 50, and performs off-on operations complementarily to the high-frequency switching ON-OFF operations of the NMOS-FET switching transistor 61, thus forming the current path from the converting inductor 63 to the circuit including the converting capacitor 64. The converted DC voltage (Vcc−Vg) is obtained between one end of the converting capacitor 64 and one end of the DC power source part 50. The converted DC voltage (Vcc−Vg) is supplied to the paralleled first power amplifying parts 11, 12, and 13 and also to the paralleled second power amplifying parts 15, 16, and 17. In this way, the potential at each terminal of the NMOS-FET switching transistor 61 and flywheel diode 62 is prevented from dropping below the potential at the negative terminal of the DC power source part 50. Therefore, even when the NMOS-FET switching transistor 61 performs high-frequency switching on-off operations, the parasitic transistors is not put into operation. Further, since the first NMOS-FET power transistors and the second NMOS-FET power transistors are altering the current paths smoothly, the potential at each terminal of these transistors also does not drop below the negative terminal of the DC power source part 50. Therefore, even when the first power transistors and the second power transistors are operated to alter the current paths, the parasitic transistors are not put into operation. As a result, even if the switching transistor, the flywheel diode, the first power transistors, and the second power transistors are integrated on a single chip together with other transistors, the operation of the parasitic transistors can be surely prevented from operation.

Further, in the embodiment, the temperature rise of each power device is reduced to a very small level, thereby providing the configuration suitable for integrated circuit implementation. Since the first NMOS-FET power transistors 81, 82, and 83 of the first power amplifying parts 11, 12, and 13 perform an ON operation with a resistive voltage drop when conducting mainly, the power loss in the first power amplifying parts is very small. Since the second NMOS-FET power transistors 85, 86, and 87 of the second power amplifying parts 15, 16, and 17 perform an ON operation with a resistive voltage drop when conducting mainly, the power loss in the second power amplifying parts is very small. Since the voltage converting part 52 performs voltage conversion by switching the NMOS-FET switching transistor 61 in high frequency PWM mode, the power loss associated with the voltage conversion is also very small. Further, since the NMOS-FET switching transistor 61 is switched in the PWM mode by the voltage signal Sw to the conduction control terminal (gate terminal), a current to the conduction control terminal side is very small, resulting in very little power loss. Thus, the power loss and temperature rise in the first power amplifying parts, the second power amplifying parts, and the voltage converting part are very small, which makes it possible to integrate the power transistors and the switching transistor on a single chip. Not to mention, the need for radiating plates and other means for preventing a temperature rise is eliminated.

In the embodiment, the supply signal forming part 30 comprises the current detecting block (the resistor 31 and the level shift circuit 32) for obtaining the current detected signal Bj responding with the composed supply current Iv that varies corresponding to the command signal Ad, and the supply output block 33 for outputting the first supply current signal C1 and the second supply current signal C2 responding with the current detected signal Bj. The first power amplifying parts 11, 12, and 13 are controlled by the first amplified current signals F1, F2, and F3, each amplitude varying proportional to the first current signal C1 corresponding to the composed supply current Iv or the command signal Ad. The second power amplifying parts 15, 16, and 17 are controlled by the second amplified current signals H1, H2, and H3, each amplitude varying proportional to the second current signal C2 corresponding to the composed supply current Iv or the command signal Ad. As a result, the rising and falling slope portions of each of the first amplified current signals and the rising and falling slope portions of each of the second amplified current signals vary the gradients corresponding to the command signal Ad or the composed current signal Iv. Accordingly, even if the composed supply current Iv is large such as a starting period of the motor or small such as a steady state period in the speed control, the altering operation of the current paths can be performed smoothly, thereby varying the drive current signals I1, I2, and I3 smoothly. As a result, the pulsation of the drive force can be remarkably reduced, even if the composed supply current Iv varies.

Further, in the embodiment, each of the first power amplifying parts includes the first FET power current-mirror circuit having the first FET power transistor, and each of the second power amplifying parts includes the second FET power current-mirror circuit having the second FET power transistor, thereby reducing the variation of the current amplifying ratios of the first power amplifying parts 11, 12, and 13 and the second power amplifying parts 15, 16, and 17. Further, the three-phase first amplified current signals F1, F2, and F3 as first three-phase current signals, each varying smoothly at least in the rising and falling slope portions, are supplied to the conduction control terminal sides of the three first power amplifying parts 11, 12, and 13, respectively. Similarly, the three-phase second amplified current signals H1, H2, and H3 as second three-phase current signals, each varying smoothly at least in their rising and falling slope portions, are supplied to the conduction control terminal sides of the three second power amplifying parts 15, 16, and 17, respectively. Therefore, the configuration achieves smooth altering operation of the current paths by the three first FET power transistors 81, 82, and 83 and the three second FET power transistors 85, 86, and 87. As a result, the drive current pulsation and motor vibration are greatly reduced. Further, by fabricating the FET power transistors in integrated circuit form, the variation of the current amplifying ratio of each FET power current-mirror circuit can be reduced.

The embodiment has positive feedback loops so that at least one of the three first MOS-FET power transistors 81, 82, and 83 is made to perform an ON operation with a resistive voltage drop and at least one of the three second MOS-FET power transistors 85, 86, and 87 is made to perform an ON operation with a resistive voltage drop. The first supply current signal C1 and the second supply current signal C2 of the supply signal forming part 30 are made to vary proportionally or substantially proportionally to the composed supply current Iv to the windings which varies corresponding to the command signal Ad. This configuration enables the first three-phase current signals with appropriate slope portions to be supplied to the conduction control terminal sides of the first power amplifying parts and the second three-phase current signals with appropriate slope portions to be supplied to the conduction control terminal sides of the second power amplifying parts, even if the composed supply current varies largely, for example, from a large current supply at the time of starting to a small current supply in the steady control state. As a result, drive current signals having smooth slope portions can be supplied to the windings, thereby reducing the pulsation of the generated force. To ensure smooth altering operation of the current paths, it is preferable that the rising slope portion or falling slope portion of each of the first three-phase current signals (F1, F2, and F3) and each of the second three-phase current signals (H1, H2, and H3) be set equal to or greater than 15 degree in terms of electrical angle. The angle of each of the first three-phase current signals or the second three-phase current signals is preferable to be equal to or greater than 150 degree. Most preferably, the angle is equal to or substantially equal to 180 degree.

Furthermore, in the embodiment, provisions are made in the distributed signal forming part 36 so that the first amplified current signal and the second amplified current signal of the same phase vary smoothly in a complementary manner with a phase difference of 180 degree with respect to each other, and so that either the first amplified current signal or the second amplified current signal is equal to zero or substantially zero at any given time. Therefore, the occurrence of the situation, where the first power amplifying part and second power amplifying part of the same phase are put into the conducting state at the same time, is prevented. As a result, no short-circuiting currents occur, thereby preventing current breakdown or thermal breakdown of power transistors.

In the embodiment, the drive circuit for supplying the drive currents to the three-phase loads (the windings 2, 3, and 4) is configured by the first power amplifying parts 11,

12, and 13, the second power amplifying parts 15, 16, and 17, the supply signal forming part 30, the altering signal forming part 34, the distributed signal forming part 36 (the first distributor 37 and the second distributor 38), the first current amplifying parts 41, 42, and 43, the second current amplifying parts 45, 46, and 47, the conversion control part 51, the voltage converting part 52, and the high voltage outputting part 53. Further, the DC power source part 50 and the voltage converting part 52 constitute the voltage supplying block for supplying a DC voltage such as a converted DC voltage (Vcc−Vg) between the positive output terminal side and negative output terminal side of the voltage converting part 52. These configurations can be modified as necessary. The altering signal forming part 34 of the present embodiment is configured by including the position detecting block 100 having magnetic-to-electric converting elements. However, the three-phase altering signals can be produced without the above-mentioned elements, for example, by detecting the back electromotive forces generated in the windings 2, 3, and 4.

Further, the three-phase first amplifying current signals F1, F2, and F3 or the three-phase second amplifying current signals H1, H2, and H3 are only required to change smoothly or analoguely in rising and falling slope portions. With this, the drive current signals I1, I2, and I3 alter the current paths smoothly, sloping up and down corresponding to the first current signals and the second current signals. Further, it is preferable to vary the current value continuously when the drive current changes in polarity. But it is allowable that there exists a short period in which the first amplified current signal and second amplified current signal become zero at the same time.

In the embodiment, the first power amplifying parts 11, 12, and 13 and the second power amplifying parts 15, 16, and 17 are not limited to the configuration shown in FIG. 1, but various modifications are possible. For example, a power amplifying part 1000 shown in FIG. 22 can be used instead of each of the first power amplifying parts 11, 12, and 13 and the second power amplifying parts 15, 16, and 17. The power amplifying part 1000 comprises an NMOS-FET power transistor 1010, an NMOS-FET transistor 1011, and a resistor 1012 which together constitute an FET power current-mirror circuit. The FET power current-mirror circuit 1000 is configured so that a control terminal side of the FET power transistor 1010 is connected to a control terminal side of the FET transistor 1011 (directly or through some components e.g. a resistor), one terminal side of the current path terminal pair of the FET transistor 1011 is connected via the resistor 1012 to one terminal side of the current path terminal pair of the FET power transistor 1010, the other terminal side of the current path terminal pair of the FET transistor 1011 is connected to a conduction control terminal side of the power amplifying part 1000 (directly or through some components), and the control terminal side of the FET transistor 1011 is connected to the conduction control terminal side of the power amplifying part 1000 (directly or through some components). The FET power current-mirror circuit provides preferably a large current amplifying ratio larger than the ratio of the cell sizes of the NMOS-FET power transistor 1010 and the NMOS-FET transistor 1011. Therefore, the power amplifying part 1000 has an advantage to reduce the input current to the power amplifying part.

Figure 23:
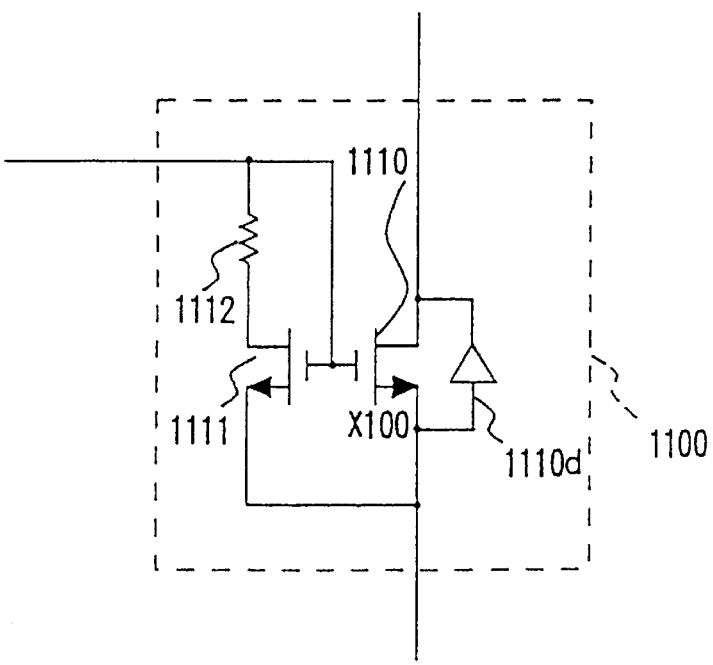
FIG. 23 is a diagram showing another configuration of a power amplifying part in the embodiment of the present invention.
Figure 24:
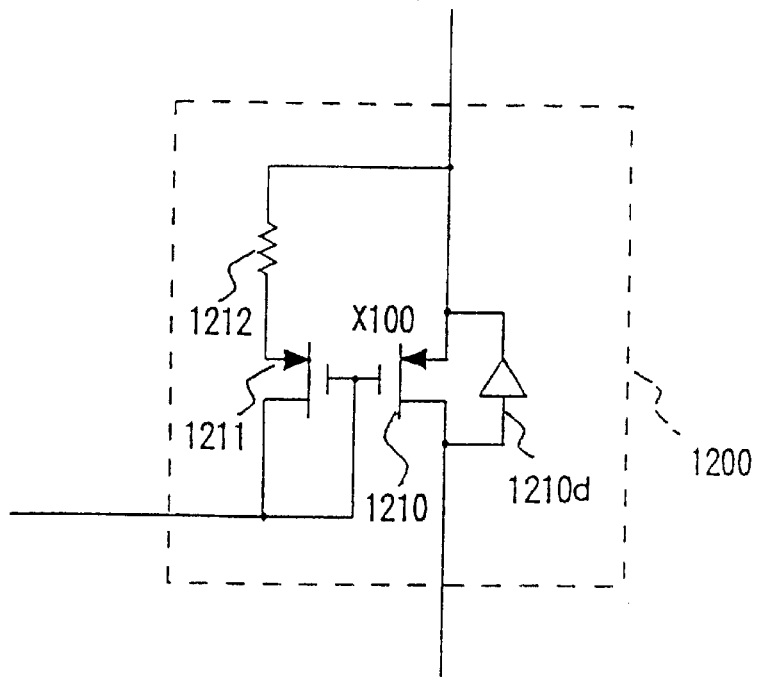
FIG. 24 is a diagram showing another configuration of a power amplifying part in the embodiment of the present invention.

Further, a power amplifying part 1100 shown in FIG. 23, for example, can be used. The power amplifying part 1100 comprises an NMOS-FET power transistor 1110, an NMOS-FET transistor 1111, and a resistor 1112 which together constitute an FET power current-mirror circuit. The FET power current-mirror circuit 1100 is configured so that a control terminal side of the FET power transistor 1110 is connected to a control terminal side of the FET transistor 1111 (directly or through some components), one terminal side of the current path terminal pair of the FET transistor 1111 is connected via the resistor 1112 to the conduction control terminal side of the power amplifying part 1100, the other terminal side of the current path terminal pair of the FET transistor 1111 is connected to one terminal side of the current path terminal pair of the FET power transistor 1110 (directly or through some components), and the control terminal side of the FET transistor 1111 is connected to the conduction control terminal side of the power amplifying part 1110 (directly or through some components). The FET power current-mirror circuit provides a predetermined current amplifying ratio when the input current to the conduction control terminal side is small, but the current amplifying ratio rapidly increases as the input current increases. Therefore, the power amplifying part 1100 has an advantage to reduce the input current when supplying a large current to the windings, for example, at the motor starting period.

Furthermore, in the embodiment, various modifications are possible to the flywheel diode 62 constituting the current path forming circuit in the voltage converting part 52. For example, the flywheel diode 62 can be replaced by an NMOS-FET synchronous rectifying transistor 1400 shown in FIG. 26. The synchronous rectifying transistor 1400 can be switched off and on in a complementary manner to the on-off operations of the switching transistor 61 by a signal from the PWM part 65. The synchronous rectifying transistor 1400 is configured by an FET transistor with a double diffused N-channel MOS structure; a flywheel diode effect can also be obtained with a parasitic diode 1400d connected between the current path terminals of the synchronous rectifying transistor 1400.

Figure 27:
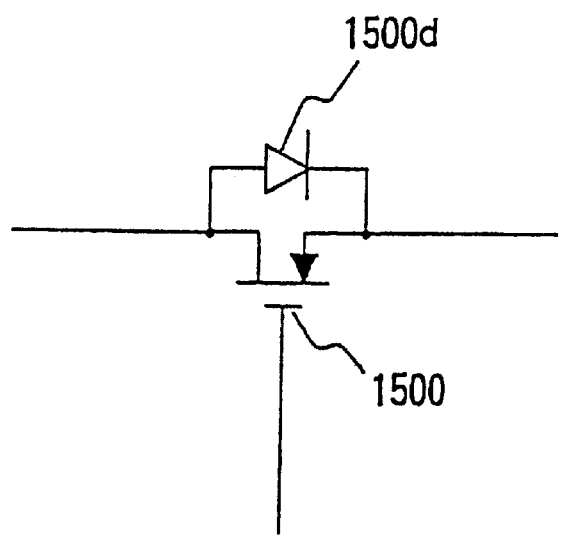
FIG. 27 is a diagram showing another configuration of a current path forming circuit in the voltage converting part in the embodiment of the present invention.

Also, a PMOS-FET synchronous rectifying transistor 1500 shown in FIG. 27, for example, can be used. The synchronous rectifying transistor 1500 can be switched off and on in a complementary manner to the on-off operations of the switching transistor 61 by a signal from the PWM part 65. The synchronous rectifying transistor 1500 is configured by a FET transistor with a double diffused P-channel MOS structure; a flywheel diode effect can also be obtained with a parasitic diode 1500d connected between the current path terminals of the synchronous rectifying transistor 1500. The synchronous rectifying transistors 1400 and 1500 can be easily implemented in an integrated circuit.

Further, the supply signal forming part 30 is not limited in configuration to the one shown in FIG. 1, but various modifications are possible. The supply signal forming part 30 shown in FIG. 1 can be replaced, for example, by a supply signal forming part 950 shown in FIG. 28. The supply signal forming part 950 produces via a level shifting block 952 a current signal Bk proportional or substantially proportional to the difference voltage between the command signal Ad and the voltage of a voltage source 951, and outputs via a supply output block 953 the first supply current signal C1 and second supply current signal C2 proportional or substantially proportional to the current signal Bk. Therefore, the first supply current signal C1 and the second supply current signal C2 change directly responding with the command signal Ad. The detailed configuration of the supply signal forming part 950 is similar as that of the supply signal forming part 30 shown in FIG. 3, so a detailed description thereof is omitted.

Embodiment 2

Figure 9:
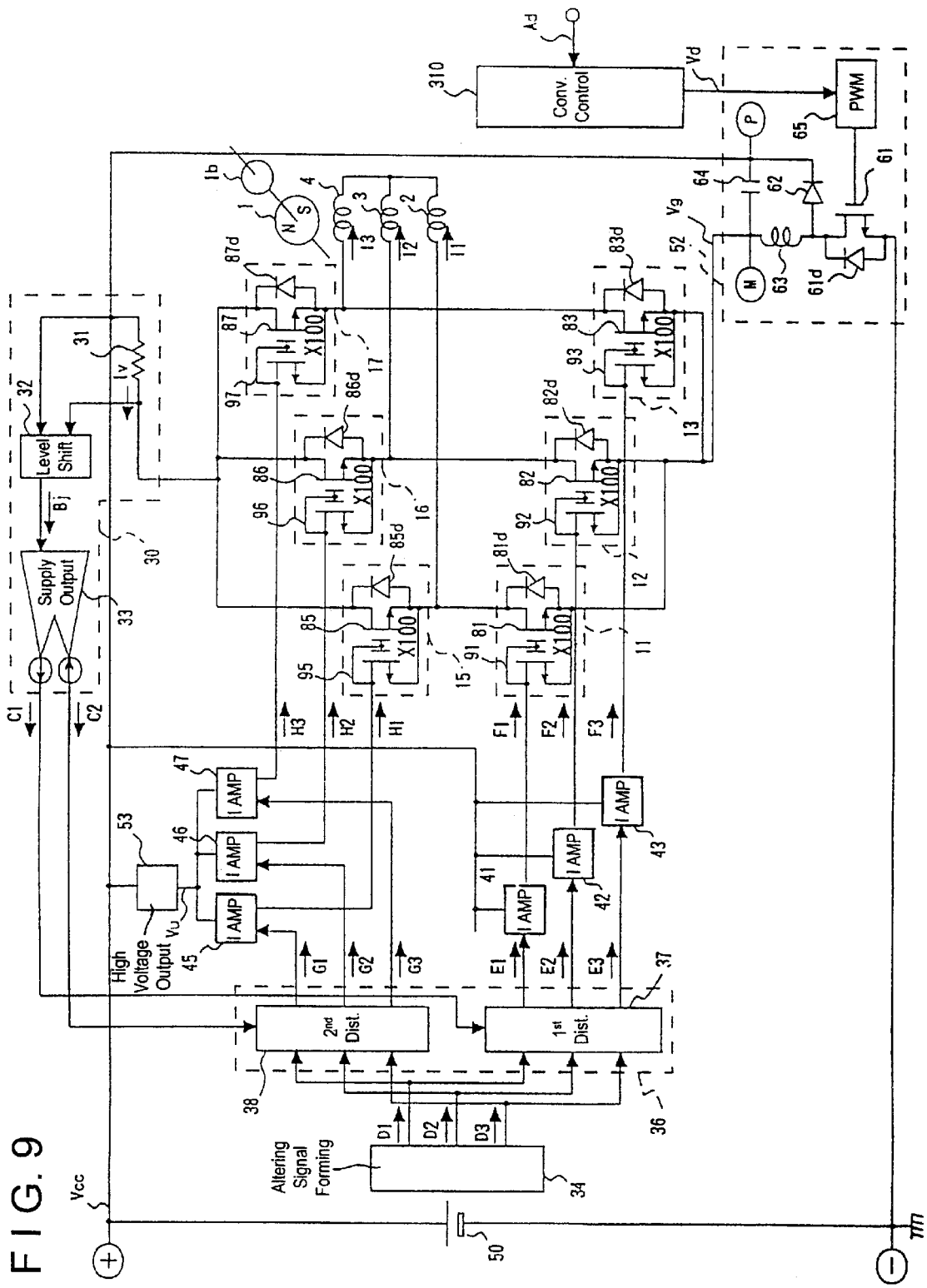
FIG. 9 is a diagram showing the configuration of a second embodiment of the present invention.

FIGS. 9 to 12 show a motor in accordance with a second embodiment of the present invention. The configuration is shown in FIG. 9. In the second embodiment, a conversion control part 310 varies the converted DC voltage of the voltage converting part 52 corresponding to the movement of the movable member 1. In the other configuration, components similar to those of the foregoing first embodiment are designated by the same numerals, and detailed explanation thereof is omitted.

The conversion control part 310 in FIG. 9 produces a conversion control signal Vd responding with the command signal Ad and the modulated current signal Pm described hereinafter. The voltage converting part 52 switches the NMOS-FET switching transistor 61 at high frequency responding with the conversion control signal Vd. With the DC voltage Vcc of the DC power supply part 50 as a power source, the voltage converting part 52 produces the converted DC voltage (Vcc−Vg) responding with the PWM switching operation of the NMOS-FET switching transistor 61.

Figure 10:
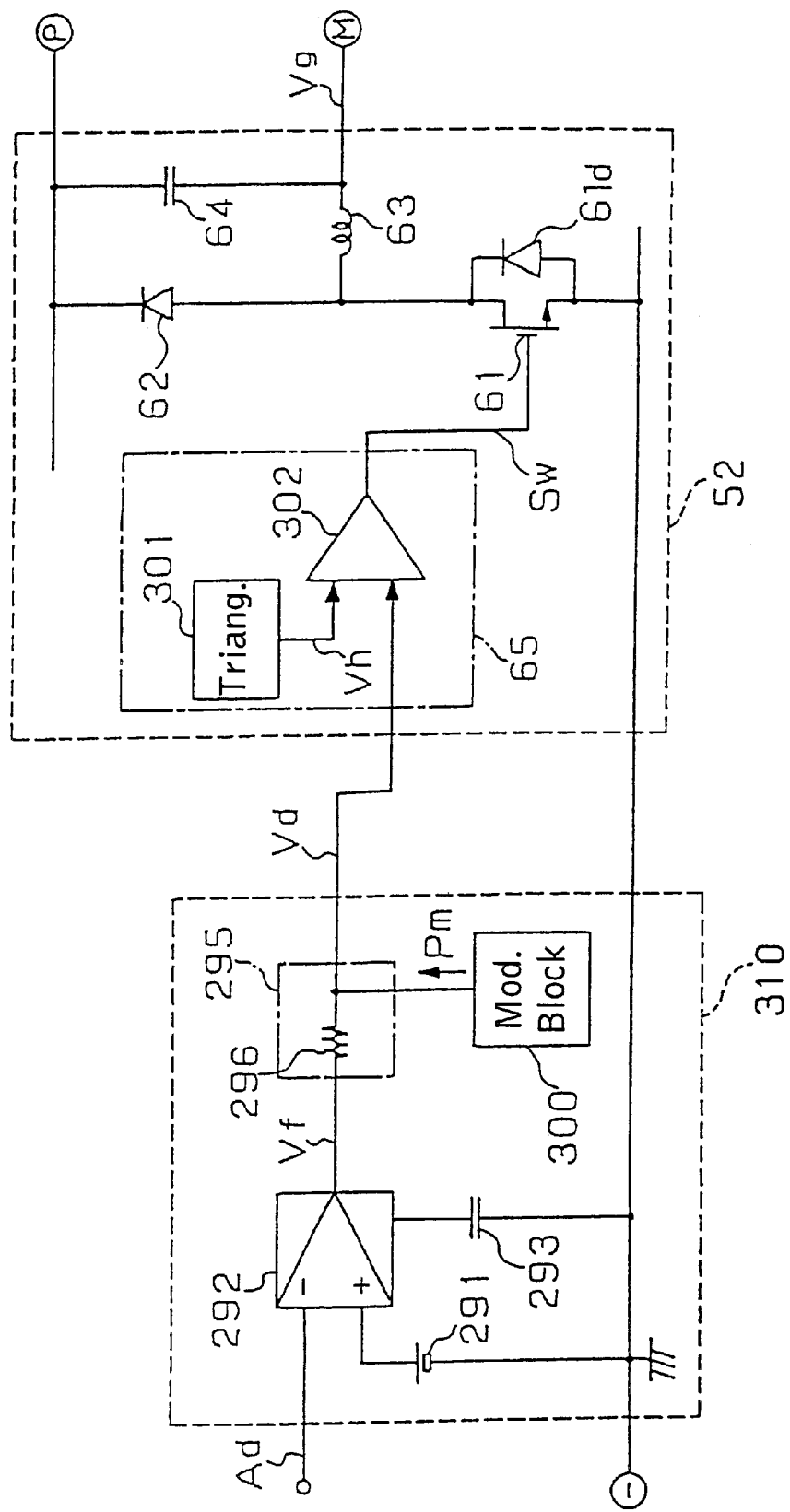
FIG. 10 is a circuit diagram of a conversion control part 310 and a voltage converting part 52 in the second embodiment.

FIG. 10 shows the detailed configuration of the conversion control part 310 and the voltage converting part 52. In the conversion control part 310, the differential amplifier circuit 292 compares the command signal Ad with the voltage value of the reference voltage source 291, amplifies the resulting difference voltage, and outputs an amplified signal Vf. The modulating block 300 outputs the modulated current signal Pm that varies in analogue fashion responding with the moving motion of the movable member 1. The modulated current signal Pm is supplied to a resistor 296 in a combining block 295, and the conversion control signal Vd is produced at a terminal of the resistor 296. In other words, the conversion control signal Vd varies responding with the command signal Ad and the modulated current signal Pm. The conversion control signal Vd is supplied to the voltage converting part 52. The capacitor 293 constitutes a filter in the differential amplifier circuit 292.

Figure 11:
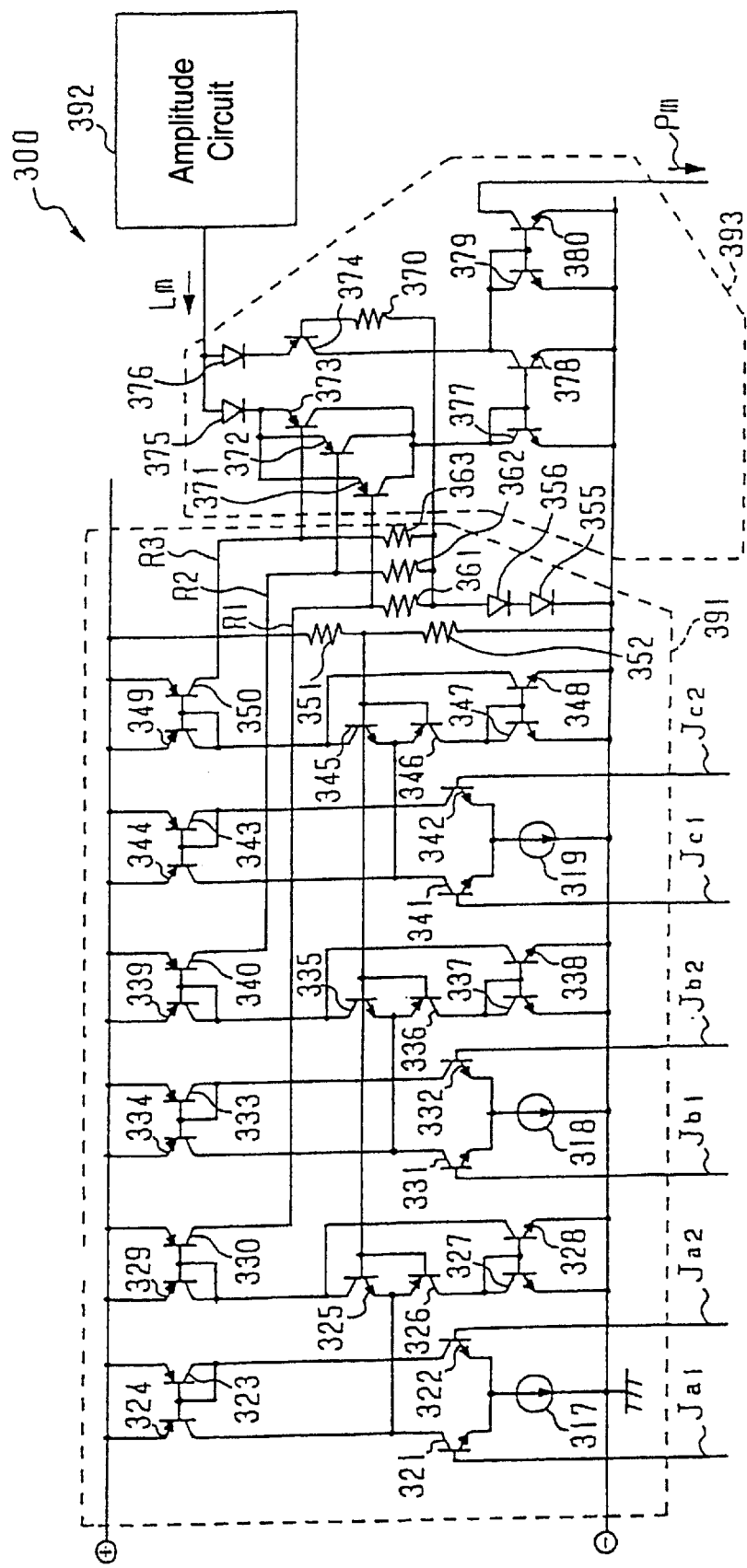
FIG. 11 is a circuit diagram of a modulating part 300 in the second embodiment.

FIG. 11 shows the detailed configuration of the modulating block 300. The modulating block 300 comprises: a modulating signal forming circuit 391 for obtaining modulating signals R1, R2, and R3 that vary in synchronization with the rotational movement of the movable member 1; an amplitude circuit 392 for producing an amplitude current signal Lm; and a modulated signal forming circuit 393 for outputting the modulated current signal Pm by modulating the amplitude current signal Lm with the modulating signals R1, R2, and R3.

Transistors 321 and 322 in the modulating signal forming circuit 391 distribute the current from a constant current source 317 to their collector sides in accordance with the position signals Ja1 and Ja2 of the altering signal forming part 34. The collector currents of the transistors 321 and 322 are compared in a current-mirror circuit formed from transistors 323 and 324. The absolute value of the difference current between them is output via an absolute value circuit consisting of the transistors 325, 326, 327, 328, 329, and 330, and the voltage signal R1 is produced across a resistor 361. In other words, the voltage signal R1 corresponds to the absolute value of the position signal Ja1. Similarly, transistors 331 to 340, a constant current source 318, and a resistor 362 produce the voltage signal R2 corresponding to the absolute value of the position signal Jb1 at a terminal of the resistor 362. Similarly, transistors 341 to 350, a constant current source 319, and a resistor 363 produce the voltage signal R3 corresponding to the absolute value of the position signal Jc1 at a terminal of the resistor 363. In other words, the voltage signals R1, R2, and R3 are three-phase absolute signals responding with the three-phase position signals Ja1, Jb1, and Jc1.

The amplitude circuit 392 outputs the amplitude current signal Lm that determines the amplitude of the modulated current signal Pm (the detailed configuration will be described later). Transistors 371, 372, 373, 374 and diodes 375, 376 in the modulated signal forming circuit 393 compare the three-phase absolute voltage signals R1, R2, and R3 with a predetermined voltage (here, the voltage at the common connection terminal of the resistors 361, 362, and 363), and distribute the amplitude current signal Lm to the collectors of the transistors 371, 372, 373, and 374 in accordance with the result of the comparison. The collectors of the transistors 371, 372, and 373 are connected in common, and the composed current and the collector current of the transistor 374 are compared in a current-mirror circuit formed from transistors 377 and 378, and the resulting difference current is output as the modulated current signal Pm via a current-mirror circuit formed from transistors 379 and 380.

In this way, the modulated current signal Pm varies the amplitude in analogue fashion in synchronization with the rotational movement of the movable member 1. In particular, with the configuration of the transistors 371, 372, 373, 374 and diodes 375, 376, the modulated current signal Pm varies in accordance with the results of the multiplications between the minimum values of the three-phase absolute voltage signals R1, R2, and R3 and the amplitude current signal Lm. The minimum value of the three-phase absolute voltage signals R1, R2, and R3 is a harmonic signal that varies six times during one cycle period of a position signal. Accordingly, the modulated current signal Pm is a harmonic signal that has a peak amplitude proportional to the amplitude current signal Lm, and that varies six times in analogue fashion during one cycle period (electrical angle of 360 degrees) of the position signals. The number of variation of the modulated current signal Pm corresponds to the number of times in which the current paths to the windings 2, 3, and 4 are altered by the first power transistors and the second power transistors.

Figure 12:
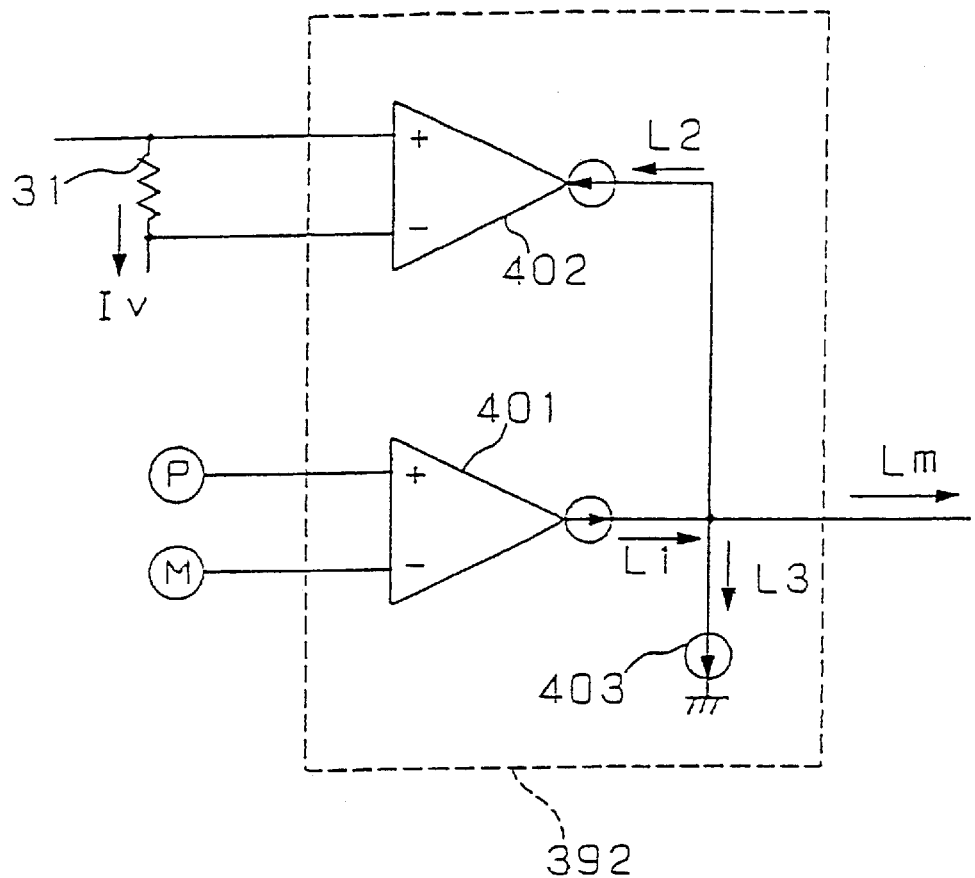
FIG. 12 is a circuit diagram of an amplitude circuit 392 in the second embodiment.

FIG. 12 shows one example of the detailed configuration of the amplitude circuit 392. A voltage-current converting circuit 401 of the amplitude circuit 392 flows out a current signal L1 proportional to the converted DC voltage between the positive output terminal side and the negative output terminal side of the voltage converting part 52. A voltage-current converting circuit 402 flows in a current signal L2 proportional to the composed supply current Iv. A constant current source 403 flows in a current signal L3 of a predetermined value. Accordingly, the amplitude current signal Lm of the amplitude circuit 392 is obtained by combining the current signals L1, L2, and L3, thereby obtaining Lm=|L1|−|L2|−|L3|. Here, |A| means the absolute value of signal A. Further, the current signal |L1| is made to correspond to the converted DC voltage of the voltage converting part 52, the current signal |L2| is made to correspond to the voltage drop across the resistor 31 and winding resistances and ON resistances of the first and second power transistors, and the current signal |L3| is made to correspond to some other voltage drop (L3 may be zero). As a result, the amplitude circuit 392 forms a back electromotive force estimating mechanism which estimates the magnitude of the back electromotive force generated in the energized windings, and the amplitude current signal Lm is thus corresponding to the magnitude of the back electromotive force. Accordingly, the modulated current signal Pm in FIG. 11 is a harmonic signal that has a peak amplitude responding with the magnitude of the back electromotive force of the energized windings, and that varies in analogue fashion responding with the movement of the movable member 1. The conversion control signal Vd in FIG. 10 varies responding with both the command signal Ad and the modulated current signal Pm.

The PWM part 65 of the voltage converting part 52 in FIG. 10 includes the triangular signal generating circuit 301 and the comparator 302. The comparator 302 compares the triangular signal Vh of the triangular signal generating circuit 301 with the conversion control signal Vd of the conversion control part 51, and produces the PWM voltage signal Sw responding with the conversion control signal Vd. The PWM signal Sw is supplied to the conduction control terminal side of the NMOS-FET switching transistor 61, and the NMOS-FET switching transistor 61 performs on-off operations responding with the PWM signal Sw. The NMOS-FET switching transistor 61 is connected at the current output terminal side to the negative terminal side of the DC power source part 50 and at the current input terminal side to one end of the converting inductor 63, and performs high-frequency switching of the power supply path to replenish a magnetic energy of the converting inductor 63 from the positive terminal side of the DC power source part 50. The flywheel diode 62, connected between the one end of the converting inductor 63 and the positive output terminal side of the voltage converting part 52, performs off-on operations complementarily to the high-frequency switching on-off operations of the NMOS-FET switching transistor 61, and forms the current path from the converting inductor 63 to the circuit including the converting capacitor 64. With the increase and decrease of the magnetic energy of the converting inductor 63 associated with the high-frequency switching, the voltage converting part 52 outputs the converted DC voltage (Vcc–Vg) between one end of the converting capacitor 64 and one end of the DC power source part 50.

Therefore, the voltage converting part 52 in FIG. 9 variably controls the converted DC voltage (Vcc–Vg) between the positive output terminal side and the negative output terminal side by switching the NMOS-FET switching transistor 61 in high frequency PWM mode responding with the command signal Ad and the modulated current signal Pm. Since voltage conversion is performed by the PWM-operating NMOS-FET switching transistor 61 and the converting inductor 63, the power loss of the voltage converting part 52 is small. In particular, since the NMOS-FET switching transistor 61 is operated fully on and off by the PWM signal Sw, the temperature rise of the switching transistor 61 is greatly reduced.

The conversion control part 310 includes the modulating block 300, and produces the conversion control signal Vd responding with the modulated current signal Pm. The voltage converting part 52 variably controls the potential Vg at the negative output terminal side by switching the NMOS-FET switching transistor 61 in high frequency PWM mode responding with the conversion control signal Vd. Accordingly, the potential Vg at the negative output terminal side of the voltage converting part 52 and the converted DC voltage (Vcc–Vg) vary responding with the modulated current signal Pm. The converted DC voltage (Vcc–Vg) from the voltage converging part 52 is supplied to the paralleled first power amplifying parts 11, 12, and 13 and also to the paralleled second power amplifying parts 15, 16, and 17. The selected first NMOS-FET power transistor and the selected second NOMS-FET power transistor perform an ON operation with a resistive voltage drop. The modulated current signal Pm of the modulating block 300 varies responding with the converted DC voltage of the voltage converting part 52, and has a peak amplitude responding with the magnitude of the back electromotive force of the energized windings. Also, the modulated current signal Pm is formed as a harmonic signal varying in synchronization with the movement of the movable member 1. In this way, the operation is performed to compensate the influence of ripples in the back electromotive force in the energized windings. This will be explained below.

Three-phase back electromotive forces of sinusoidal waveforms with a phase difference relative to each other are generated in the windings 2, 3, and 4. The combined back electromotive force of the energized windings contains ripples associated with the current path alternation. It has been found that the drive currents to the windings are disturbed under the influence of the ripples in the combined back electromotive force, causing appreciable fluctuation of the generated force. To reduce this fluctuation, the converted DC voltage (Vcc–Vg) of the voltage converting part 52 is varied responding with the modulated current signal Pm of the modulating block 300, thereby compensating the influence of ripples of the back electromotive force in the energized windings. In particular, by making the peak amplitude of the modulated current signal Pm to respond to the magnitude of the back electromotive force, the modulated current signal Pm is varied responding with the converted DC voltage of the voltage converting part 52 so that the influence of the back electromotive force can be compensated accurately. As a result, the fluctuation of the drive force is greatly reduced, and thus a high performance motor with reduced vibration can be realized.

In particular, in the amplitude circuit 392 shown in FIG. 12, the amplitude current signal Lm is varied responding with the magnitude of the back electromotive force of the energized windings, and the peak amplitude of the modulated current signal Pm of the modulating block 300 is varied corresponding to the magnitude of the back electromotive force. With this arrangement, even if the back electromotive force varies greatly due to the variation of the rotational speed of the movable member 1, a high frequency component of appropriate amplitude can be incorporated into the converted DC voltage. As a result, the fluctuation of the generated force is held to be a small level at any rotational speed.

Figure 13:
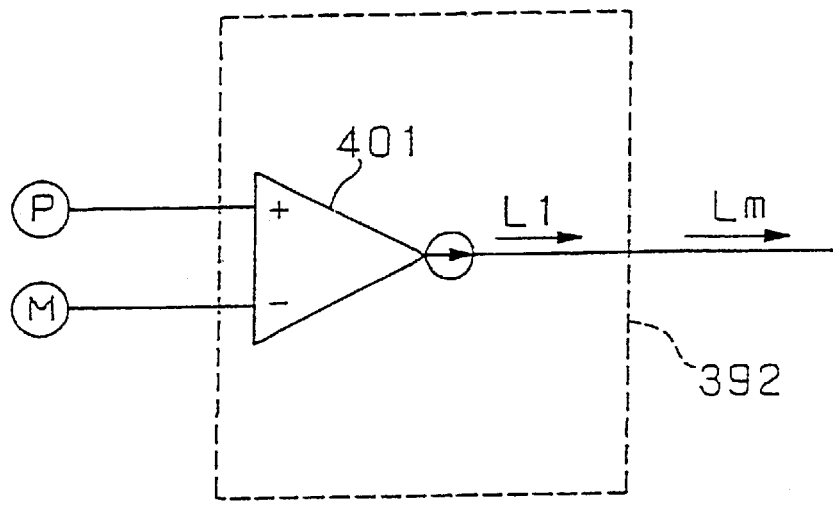
FIG. 13 is a circuit diagram of the amplitude circuit 392 in another configuration in the second embodiment.

FIG. 13 shows another example of the configuration of the amplitude circuit 392. The current signal L1 responding with the converted DC voltage of the voltage converting part 52 is output directly as the amplitude current signal Lm. As a result, the modulated current signal Lm also varies responding with the converted DC voltage. With this configuration also, the fluctuation of the drive force can be reduced.

FIG. 14 shows still another example of the configuration of the amplitude circuit 392. The amplitude current signal Lm is obtained by combining the current signal L4, responding with the amplified voltage signal Vf of the conversion control part 51 responding with the command signal Ad, with a predetermined current value L5. Accordingly, the amplitude current signal Lm and the modulated current signal Pm vary responding with the command signal Ad. With this configuration also, the fluctuation of the generated force can be reduced. If the variation in the magnitude of the back electromotive force is small, the amplitude current signal Lm may be set at a constant value.

The remainder of the configuration and operation is similar as that in the foregoing first embodiment, and a detailed description thereof will be omitted.

In the embodiment, the power loss and temperature rise of the power devices are reduced. Since the first power amplifying parts and the second power amplifying parts are performing an ON operation with a resistive voltage drop when conducting mainly, the power loss in the first NMOS-FET power transistors and the second NMOS-FET power transistors is very small. Further, the power loss in the NMOS-FET switching transistor 61 in the voltage converting part 52 is also small. In this way, since the temperature rise in the power devices is small, the motor configuration is suitable for integrated circuit implementation. Accordingly, transistors, diodes, and resistors in the supply signal forming part 30, the altering signal forming part 34, the distributed signal forming part 36, the first current amplifying parts 41, 42, and 43, the second current amplifying parts 45, 46, and 47, the conversion control part 310, the voltage converting part 52, and the high voltage outputting part 53 can be easily integrated on the same chip that accommodates the power transistors and the switching transistor.

In the embodiment, the conversion control part 310 is provided with the modulating block 300 for obtaining the modulated current signal Pm that varies in synchronization with the movement of the movable member 1, and the converted DC voltage of the voltage converting part 52 is varied responding with the output signal Pm of the modulating block 300. As a result, the fluctuation of the generated force is greatly reduced. Further, the modulated current signal Pm of the modulating block 300 is varied responding with the converted DC voltage of the voltage converting part 52 so that the fluctuation of the generated force can be reduced even when the rotational speed of the movable member 1 changed.

Further, the altering signal forming part 34 in the embodiment is configured to include the position detecting block 100 having magnetic-to-electric converting elements. However, the three-phase altering signals can be produced without the elements, for example, by the back electromotive forces generated in the windings 2, 3, and 4. In this case, the modulated signal varying in synchronization with the movement of the movable member 1 can be obtained by detecting the zero cross points of the electromotive forces as timing signals, and the converted DC voltage of the voltage converting part can be varied responding with the modulated signal.

Embodiment 3

Figure 15:
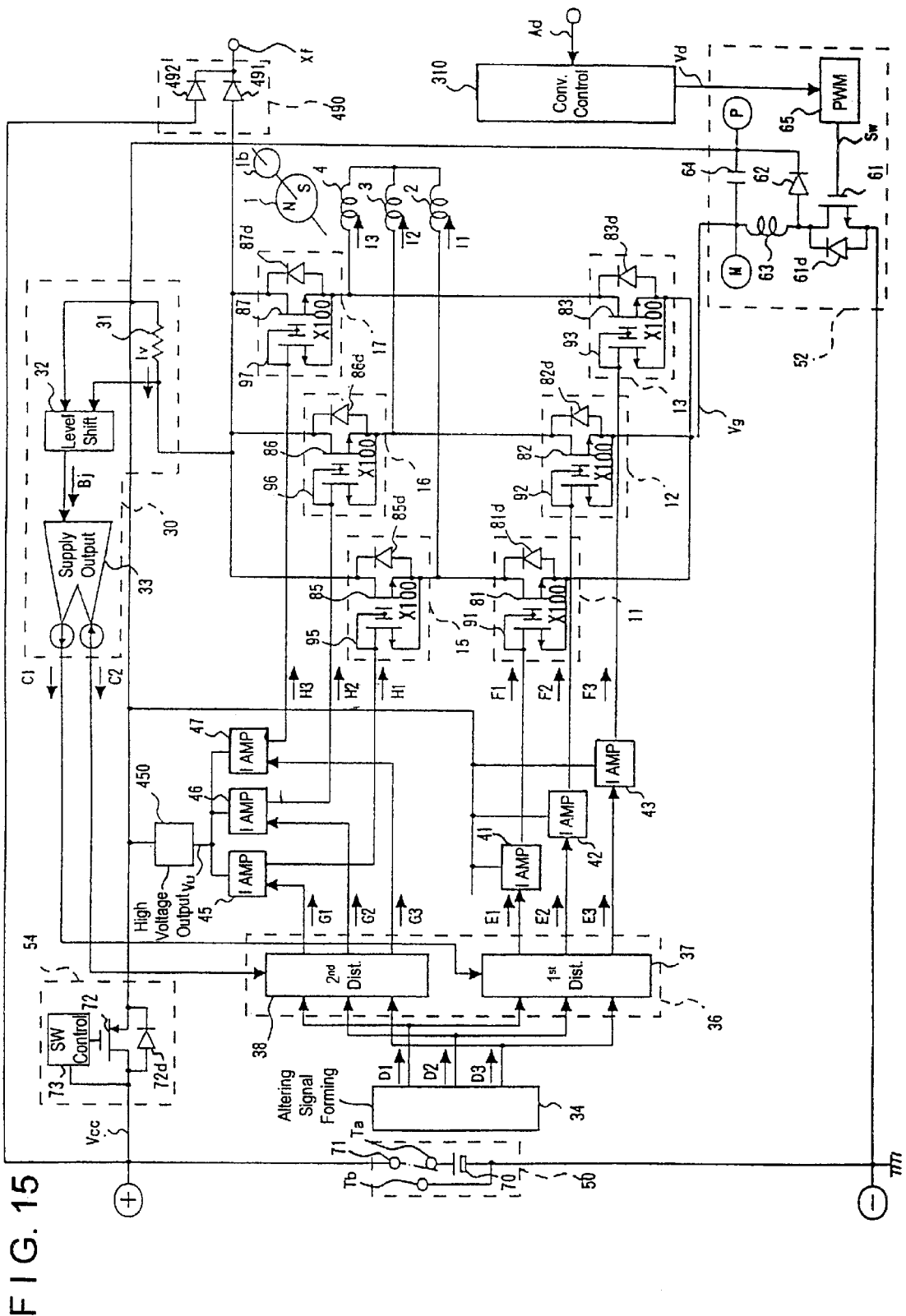
FIG. 15 is a diagram showing the configuration of a third embodiment of the present invention.
Figure 16:
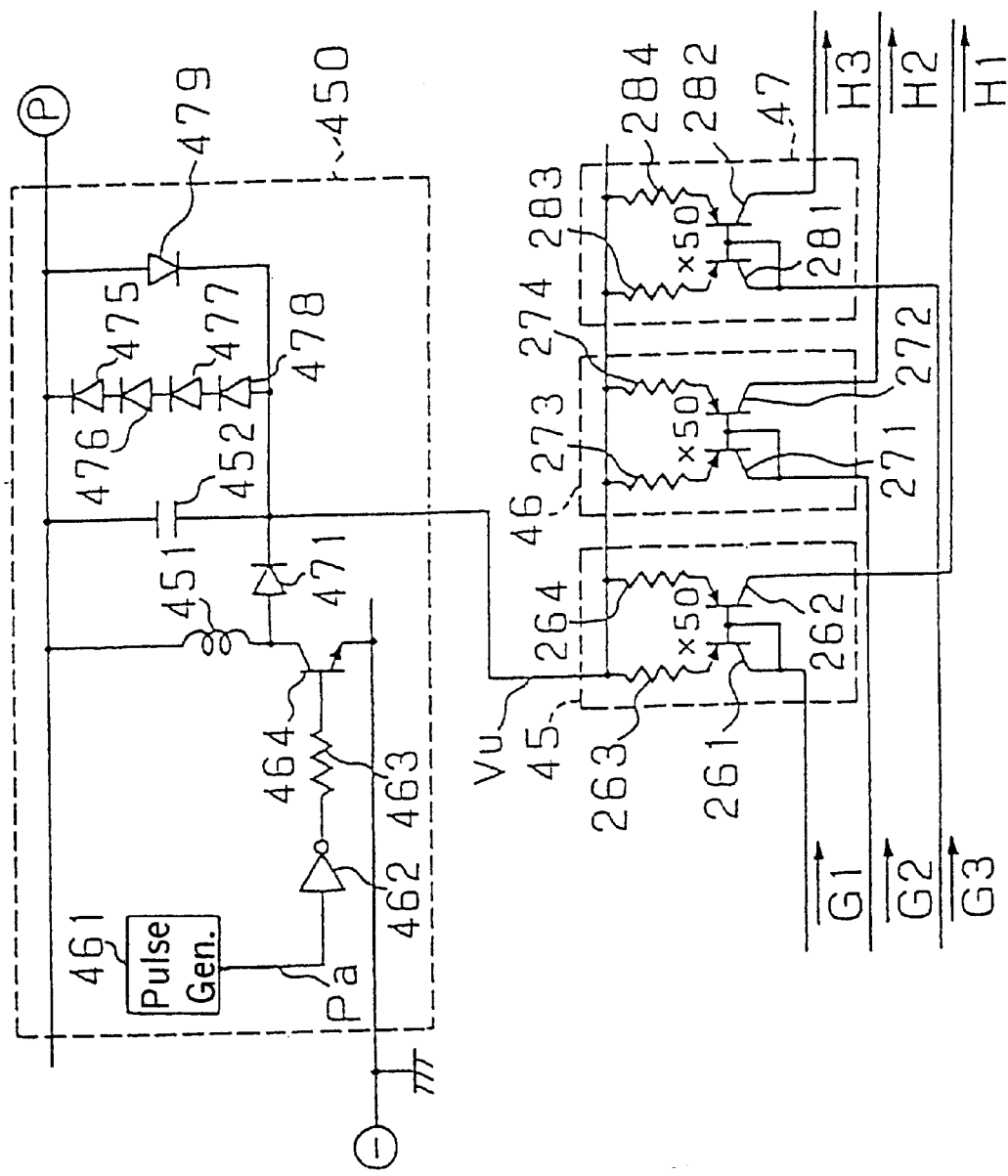
FIG. 16 is a circuit diagram of a high-voltage outputting part 450 in the third embodiment.
Figure 17:
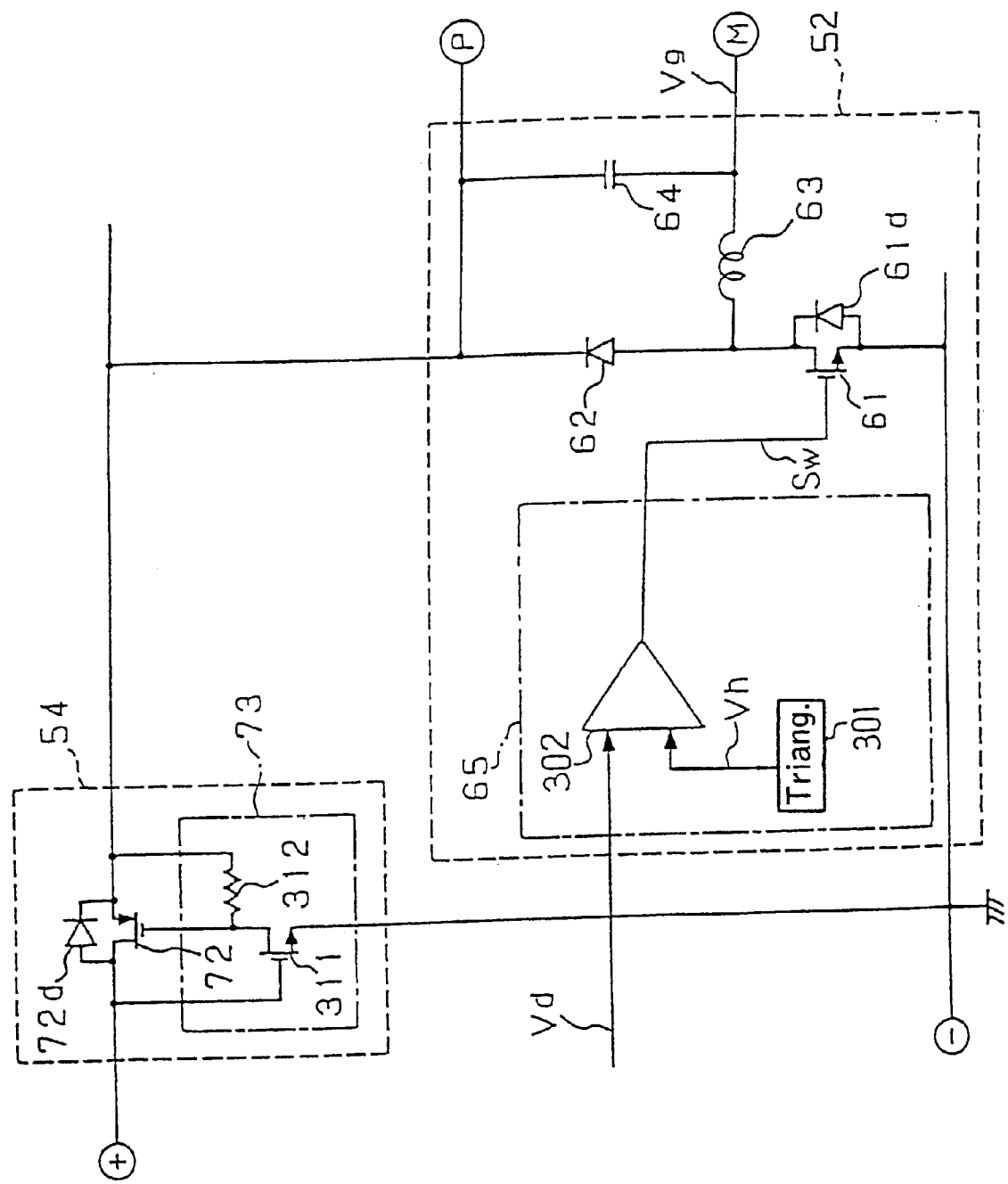
FIG. 17 is a circuit diagram of a power switch part 54 and a voltage converting part 52 in the third embodiment.

FIGS. 15 to 17 show a motor in accordance with a third embodiment of the present invention. The configuration is shown in FIG. 15. In the third embodiment, when the DC power source part 50 is turned off, a power switch part 54 is turned off, and a rectified DC voltage of three-phase back electromotive forces of the windings 2, 3, and 4 is output at a terminal Xf of a voltage output part 490. Further, a high voltage outputting part 450 of a different configuration is used. In the remaining portion of the configuration, components similar to those in the foregoing second embodiment or the first embodiment are designated by like numerals, and detailed explanation thereof is omitted.

The high voltage outputting part 450 in FIG. 15 includes an upconverting inductor and an upconverting capacitor, and produces a high level potential Vu higher than the positive terminal potential Vcc of the DC power source part 50 so as to supply the high level potential Vu to the second current amplifying parts 45, 46, and 47.

FIG. 16 shows the detailed configuration of the high voltage outputting part 450. The high voltage outputting part 450 comprises: a pulse generating circuit 461 for outputting a high frequency pulse signal Pa of about 100 kHz; an upconverting inductor 451; an upconverting capacitor 452; a first voltage limit circuit consisting of diodes 475 to 478; and a second voltage limit circuit consisting of a diode 479. An inverter 462 varies in digital fashion responding with the pulse signal Pa from the pulse generating circuit 461. When the pulse signal Pa is "L", a transistor 464 is on, and current flows through the transistor 464 to the upconverting inductor 451 to charge magnetic energy into the upconverting inductor 451. When the pulse signal Pa changes to "H", the transistor 464 is turned off, a charge path for flowing current to the upconverting capacitor 452 via the diode 471 is formed by the magnetic energy stored in the upconverting inductor 451, and the upconverting capacitor 452 is charged to store the charge therein. As a result, the high level potential Vu higher than the positive terminal side potential Vcc of the DC power source part 50 is output at a terminal of the upconverting capacitor 452.

If the upconverting capacitor 452 continues to be charged, the high level voltage Vu will become very high, so it maybe happen to make a voltage breakdown of the integrated transistors and diodes. The first voltage limit circuit consisting of the diodes 475 to 478 prevents voltage breakdown by liming the high level potential Vu within a predetermined value. The second voltage limit circuit consisting of the diode 479 prevents the high level voltage Vu of the high voltage outputting part 450 from dropping considerably below the positive terminal side potential Vcc of the DC power source part 50. Since the high level potential Vu does not drop excessively even at the time of large current supply, for example, when staring the motor, stable integrated-circuit operation is ensured. Here, the first voltage limit circuit and the second voltage limit circuit need not be connected if they are not necessary.

The DC power source part 50 in FIG. 15 comprises, for example, a DC voltage source 70 and a switch circuit 71. When the DC power source part 50 is on, the switch circuit 71 is connected to the Ta terminal side, so that the DC voltage from the DC voltage source 70 is output between the positive terminal side and the negative terminal side of the DC power source part 50. When the DC power source part 50 is off, the switch circuit 71 is connected to the Tb terminal side, so that the positive terminal side and negative terminal side of the DC power source part 50 are equivalently short-circuited. Therefore, the DC power source part 50 is normally on, but is turned off in power off, emergency or irregular case.

The power switch part 54 in FIG. 15 includes a PMOS-FET power switch transistor 72 which turns on and off responding with the output voltage of the DC power source part 50. When the DC power source part 50 is supplying the predetermined output voltage, the PMOS-FET power switch transistor 72 is on, thereby connecting the power supplying path from the positive terminal side of the DC power source part 50 to the current input terminal sides of the second power amplifying parts 15, 16, and 17. When the output voltage of the DC power source part 50 becomes zero or decreases below a predetermined value, the PMOS-FET power switch transistor 72 is off, thereby interrupting the power supplying path from the positive terminal side of the DC power source part 50 to the current input terminal sides of the second power amplifying parts 15, 16, and 17.

The PMOS-FET power switch transistor 72 is connected at the current input terminal side to the positive terminal side of the DC power source part 50 and at the current output side to the positive output terminal side of the voltage converting part 52. The PMOS-FET power switch transistor 72 is switched by a switch controller 73 between on and off responding with the output voltage of the DC power source part 50.

FIG. 17 shows the detailed configuration of the power switch part 54. The switch controller 73 has an NMOS-FET transistor 311 and a resistor 312. When the switch circuit 71 in the DC power source part 50 is on the Ta side and the DC power source part 50 is outputting the predetermined voltage, the NMOS-FET transistor 311 is on, thereby causing the PMOS-FET power switch transistor 72 to turn on. When the switch circuit 71 in the DC power source part 50 is switched to the Tb side and the DC power source part 50 is off, the NMOS-FET transistor 311 is off, so that the PMOS-FET power switch transistor 72 is also off. Here, the PMOS-FET power switch transistor 72 is constructed from a reversely connected P-channel FET transistor with double diffused MOS structure. That is, the drain terminal is set as the current input terminal side and the source terminal as the current output terminal side, and a switch diode 72d formed as a parasitic device is equivalently connected in such a manner as to be connected from the current input terminal side toward the current output terminal side. When the PMOS-FET power switch transistor 72 is on, both side of the switch diode 72d are short-circuited, and when the PMOS-FET power switch transistor 72 is off, the switch diode 72d acts as a protect diode for preventing a reverse current. However, even if the switch diode 72d does not exist, no problems occur in operation.

The voltage output part 490 in FIG. 15 comprises a first output diode 491 and a second output diode 492, whose output sides are connected in common. The input side of the first output diode 491 is connected to the common connection terminal side of the second NMOS-FET power transistors of the second power amplifying parts. The input side of the second output diode 492 is connected to the positive terminal side of the DC power source part 50. The positive output terminal Xf of the voltage output part 490 is the common connection terminal side of the first output diode 491 and second output diode 492. With this configuration, the DC voltage at the common connection terminal side of the second NMOS-FET power transistors is compared with the output DC voltage Vcc of the DC power source part 50, and a DC voltage responding with the greater one of the two voltage values is output at the output terminal Xf of the voltage output part 490.

Normally, the DC power source part 50 is on, and the DC voltage responding with the output DC voltage Vcc of the DC power source part 50 is output at the output terminal Xf of the voltage output part 490. However, when the DC power source part 50 is turned off in an emergency case, the output DC voltage Vcc of the DC power source part 50 becomes zero, and the PMOS-FET power switch transistor 72 in the power switch part 54 is turned off. When the DC power source part 50 is turned off, the first supply current signal C1 and the second supply current signal C2 of the supply signal forming part 30 become zero or very small, and the first distributed current signals of the first distributor 37 and the second distributed current signals of the second distributor 38 become zero or very small. As a result, the first NMOS-FET power transistors 81, 82, and 83 in the first power amplifying parts 11, 12, and 13 and the second PMOS-FET power transistors 85, 86, and 87 in the second power amplifying parts 15, 16, and 17 stop conducting. At this time, three-phase back electromotive forces have being generated in the windings 2, 3, and 4 because of the rotational movement of the movable member 1. The first power diodes 81d, 82d, 83d, the second power diodes 85d, 86d, 87d, and the switching diode 61d rectify the back electromotive forces of the windings 2, 3, and 4, and output the rectified DC voltage at the common connection terminal side of the second power amplifying parts. Since the power switch transistor 72 in the power switch part 54 is off, the rectified DC voltage is output at the output terminal Xf via the first output diode 491 in the voltage output part 490. In other words, when the DC power source part 50 is turned off, the voltage output part 490 outputs the rectified DC voltage at the output terminal Xf, obtained by rectifying the three-phase back electromotive forces of the windings 2, 3, and 4 by means of the power diodes. Using the rectified DC voltage of the voltage output part 490, various emergency operation of disk drive apparatus can be performed.

The remainder of the configuration and operation is similar to that in the foregoing first or second embodiment, and a detailed description thereof will be omitted.

In the embodiment, when the DC power source part 50 is turned off, the rectified DC voltage obtained by rectifying the three-phase back electromotive forces of the windings by means of the first power diodes and the second power diodes is output at the terminal Xf of the voltage output part 490. Using the rectified DC voltage of the voltage output part 490, various emergency operation can be performed. For example, when the motor of the embodiment is used as a spindle motor of a HDD, it becomes possible to store the contents of a RAM memory electrically or to retract the playback head mechanically by using the rectified DC voltage of the voltage output part 490 when the DC power source part 50 is turned off.

Besides, it is possible to set the first supply current signal C1 of the supply signal forming part 30 to a predetermined value when the DC power source part 50 is turned off, thereby causing to put the first NMOS-FET power transistors 81, 82, and 83 of the first power amplifying parts 11, 12, and 13 into the ON state sequentially responding with the movement of the movable member 1. Moreover, it is possible to set the PWM signal Sw of the voltage converting part 52 to a high voltage, thereby causing to put the NMOS-FET switching transistor 61 into the ON state. In this way, the negative side voltage of the three-phase back electromotive forces of the windings can be rectified by activating the first power transistors and the switching transistor, while the positive side voltage can be rectified by means of the second power diodes 85d, 86d, and 87d. Furthermore, it is possible to set the second supply current signal C2 to a predetermined value, thereby causing to operate the second power amplifying parts 15, 16, 17 so as to rectify the positive side voltage of the three-phase back electromotive forces by using the second power transistors.

In the embodiment, various advantages similar to those achieved in the foregoing embodiments can also be obtained.

Embodiment 4

Figure 19:
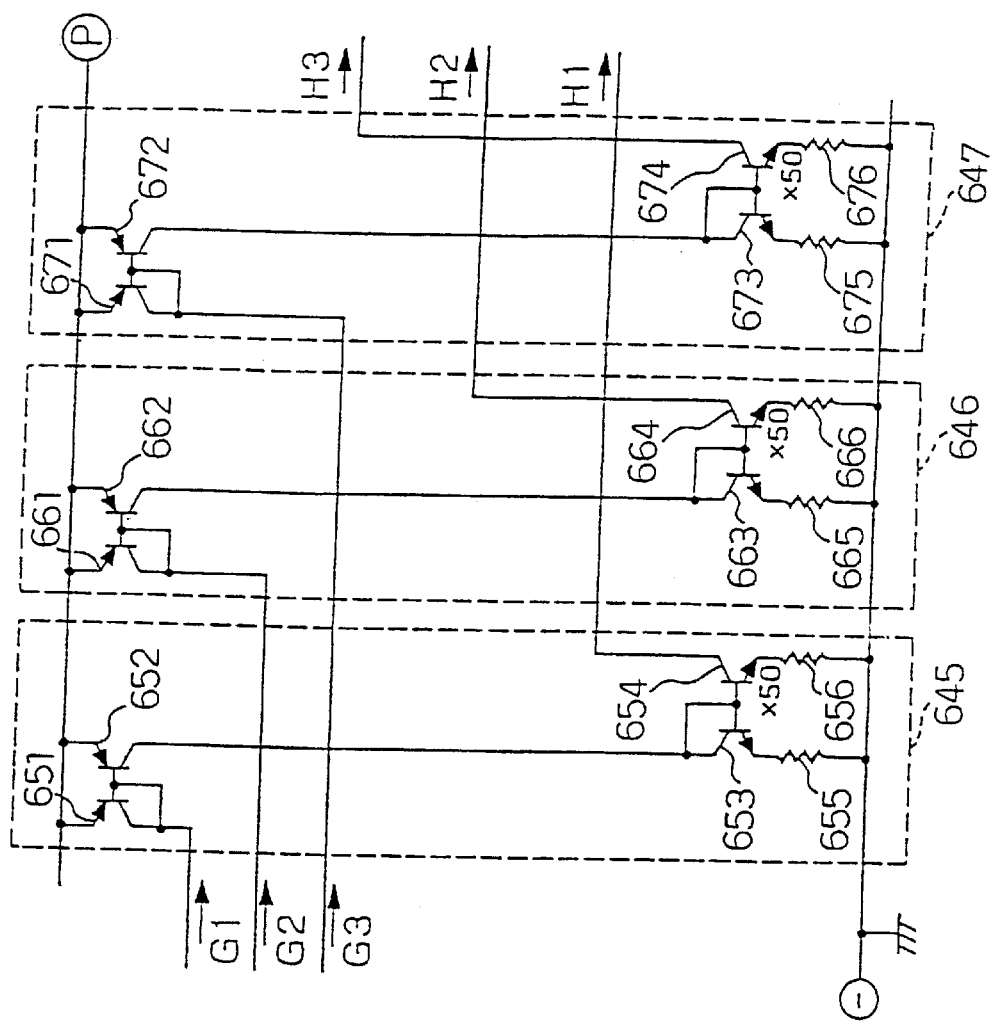
FIG. 19 is a circuit diagram of second current amplifying parts 645, 646, and 647 in the fourth embodiment.

FIGS. 18 and 19 show a motor in accordance with a fourth embodiment of the present invention. The configuration is shown in FIG. 18. In the fourth embodiment, second PMOS-FET power transistors 685, 686, and 687 are used in the second power amplifying parts 615, 616, and 617 so as not to use a high voltage outputting part. The second power amplifying parts 615, 616, and 617 are also changed. In the remaining portion of the configuration, components similar to those in the foregoing third embodiment, the second embodiment, or the first embodiment are designated by like numerals, and detailed explanation thereof is omitted.

The current input terminal sides of the three second power amplifying parts 615, 616, and 617 are connected in common, via the current detecting resistor 31, to the positive output terminal side of the voltage converting part 52 in FIG. 18. The second power amplifying part 615 comprises a second FET power current-mirror circuit formed from the PMOS-FET second power transistor 685 and a PMOS-FET transistor 695, amplifies the output current H1 of the second current amplifying part 645 fed to the conduction control terminal side, and outputs the amplified current. Here, the PMOS-FET transistor means a FET transistor with a P-channel MOS structure. The PMOS-FET second power transistor 685 and the PMOS-FET transistor 695 forms the second PMOS-FET power current-mirror circuit. Here, the PMOS-FET power current-mirror circuit refers to a power current-mirror circuit using an FET power transistor with a P-channel MOS structure. The cell size of the PMOS-FET power transistor 685 is set to be 100 times that of the PMOS-FET transistor 695, and the second PMOS-FET power current-mirror circuit can amplify the input current to 100 times when operating in the active operation region. Further, the second PMOS-FET power transistor 685 is configured by an FET transistor with a double diffused P-channel MOS structure, and has a second power diode 685d formed as a parasitic device and reversely connected in an equivalent circuit or in a direction from the current output terminal side of the transistor to the current input terminal side.

Similarly, the second power amplifying part 616 comprises a second FET power current-mirror circuit formed from the PMOS-FET power transistor 686 and a PMOS-FET transistor 696, amplifies the output current H2 of the second current amplifying part 646 fed to the conduction control terminal side, and outputs the amplified current. The cell size of the PMOS-FET power transistor 686 is set to be 100 times that of the PMOS-FET transistor 696. The second PMOS-FET power transistor 686 is configured by an FET transistor with a double diffused P-channel MOS structure, and has a second power diode 686d formed as a parasitic device and reversely connected in an equivalent circuit or in a direction from the current output terminal side of the transistor to the current input terminal side.

Similarly, the second power amplifying part 617 comprises a second FET power current-mirror circuit formed from the PMOS-FET power transistor 687 and a PMOS-FET transistor 697, amplifies the output current H3 of the second current amplifying part 647 fed to the conduction control terminal side, and outputs the amplified current. The cell size of the PMOS-FET power transistor 687 is set to be 100 times that of the PMOS-FET transistor 697. The second PMOS-FET power transistor 687 is configured by an FET transistor with a double diffused P-channel MOS structure, and has a second power diode 687d formed as a parasitic device and reversely connected in an equivalent circuit or in a direction from the current output terminal side of the transistor to the current input terminal side.

The current input terminal sides of the second PMOS-FET power transistors 685, 686, and 687 are connected in common, via the resistor 31, to the positive output terminal side of the voltage converting part 52, while the current output terminal sides thereof are connected to the power supplying terminals of the windings 2, 3, and 4, respectively. In this way, the second power amplifying parts 615, 616, and 617 supply the currents to the power supplying terminals of the windings 2, 3, and 4 by amplifying the input currents of the conduction control terminal sides, so as to supply the positive current parts of the drive current signals I1, I2, and I3 to the windings 2, 3, and 4, respectively.

The second distributed signals G1, G2, and G3 of the second distributor 38 in FIG. 18 are input to the second current amplifying parts 645, 646, and 647, respectively. The second current amplifying parts 645, 646, and 647 produce the second amplified current signals H1, H2, and H3, respectively, by amplifying the second distributed current signals G1, G2, and G3 by a predetermined factor, and supply the second amplified current signals to the conduction control terminal sides of the second power amplifying parts 615, 616, and 617. The second power amplifying parts 615, 616, and 617 amplify the three-phase second amplified current signals H1, H2, and H3, respectively.

FIG. 19 shows the detailed configuration of the second current amplifying parts 645, 646, and 647. The second current amplifying part 645 comprises a front end current-mirror circuit formed from transistors 651 and 652 and a back end current-mirror circuit formed from transistors 653, 654 and resistors 655, 656, the front end and back end current-mirror circuits being connected in cascade to form a second amplifying part current-mirror circuit. The ratio of the emitter areas of the transistors 651 and 652 is set to 1, and thus the current amplifying ratio of the front end current-mirror circuit is set to 1. The ratio of the emitter areas of the transistors 653 and 654 is set to 50 and the ratio of the resistors 656 and 655 to 50, and thus the current amplifying ratio of the back end current-mirror circuit is set to 50. As a result, the second amplifying part current-mirror circuit in the second current amplifying part 645 amplifies the current by a factor of 50 in terms of the current amplifying ratio. Similarly, the second current amplifying part 646 comprises a second amplifying part current-mirror circuit formed from transistors 661, 662, 663, 664 and resistors 665, 666, and amplifies the current by a factor of 50 in terms of the current amplifying ratio. Similarly, the second current amplifying part 647 comprises a second amplifying part current-mirror circuit formed from transistors 671, 672, 673, 674 and resistors 675, 676, and amplifies the current by a factor of 50 in terms of the current amplifying ratio. With this configuration, the second current amplifying parts 645, 646, and 647 produce the three-phase second amplified current signals H1, H2, and H3 by amplifying the three-phase second distributed current signals G1, G2, and G3 by a factor of 50, and supply the amplified current signals to the conduction control terminal sides of the second power current-mirror circuits in the second power amplifying parts 615, 616, and 617. The second amplifying part current-mirror circuits in the second current amplifying parts 645, 646, and 647 supply the currents to the second power amplifying parts 615, 616, and 617, respectively, via the output NPN-type transistors 654, 664, and 674. In this way, the conduction of the second PMOS-FET power transistors 685, 686, and 687 in the second power amplifying parts 615, 616, and 617 is fully controlled.

The operation of the motor of FIG. 18 will be described next. The altering signal forming part 34 supplies the smoothly varying three-phase altering current signals D1, D2, and D3 to the distributed signal forming part 36. The first distributor 37 distributes the first supply current signal C1 of the supply signal forming part 30 responding with the three-phase altering current signals D1, D2, and D3, and outputs the smoothly varying three-phase first distributed current signals E1, E2, and E3. The first current amplifying parts 41, 42, and 43 outputs the first amplified current signals F1, F2, and F3 by amplifying the first distributed current signals E1, E2, and E3 by a predetermined current amplifying ratio, and supply the first amplified current signals to the respective conduction control terminal sides of the first power amplifying parts 11, 12, and 13. The first FET power current-mirror circuits in the first power amplifying parts 11, 12, and 13 amplify the first amplified current signals F1, F2, and F3, and supply the negative current parts of the drive current signals I1, I2, and I3 to the three-phase windings 2, 3, and 4, respectively.

The second distributor 38 distributes the second supply current signal C2 of the supply signal forming part 30 responding with the three-phase altering current signals D1, D2, and D3, and outputs the smoothly varying three-phase second distributed current signals G1, G2, and G3. The second current amplifying parts 645, 646, and 647 outputs the second amplified current signals H1, H2, and H3 by amplifying the second distributed current signals G1, G2, and G3 by a predetermined current amplifying ratio, and supply the second amplified current signals to the respective conduction control terminal sides of the second power amplifying parts 615, 616, and 617. The second FET power current-mirror circuits in the second power amplifying parts 615, 616, and 617 amplify the second amplified current signals H1, H2, and H3, and supply the positive current parts of the drive current signals I1, I2, and I3 to the three-phase windings 2, 3, and 4, respectively.

The current detecting resistor 31 in the supply signal forming part 30 detects the composed supply current Iv which is a composed value of the positive current parts of the drive current signals I1, I2, and I3, and produces the current detected signal Bj responding with the composed supply current Iv, via the level shift circuit 32. The supply output block 33 outputs the first supply current signal C1 and the second supply current signal C2 responding with the current detected signal Bj. The first supply current signal C1 and the second supply current signal C2 vary proportionally or substantially proportionally to the composed supply current signal Iv.

The first distribution control block (comprising of the supply signal forming part 30, the first distributor 37, and the first current amplifying parts 41, 42, and 43) produces the three-phase first amplified current signals F1, F2, and F3 (the first three-phase current signals), each of which varies at least in the rising and falling slopes, and supplies the first amplified current signals F1, F2, and F3 to the conduction control terminal sides of the first power amplifying parts 11, 12, and 13, respectively. In this way, the current path altering operation by the three first NMOS-FET power transistors 81, 82, and 83 is performed smoothly, and at least one of the three first NMOS-FET power transistors 81, 82, and 83 is caused to perform the ON operation with a resistive voltage drop. Accordingly, each of the first NMOS-FET power transistors smoothly varies the current value by performing a current amplification operation of the half ON operation within the active operation region during portions of the rising and falling slopes of the current. After the current path has been formed, each of the first NMOS-FET power transistors performs an ON operation with a resistive voltage drop. Therefore, the occurrence of spike voltages are avoided in current path altering operation, and the drive current signals I1, I2, and I3 to the windings 2, 3, and 4 vary smoothly.

The second distribution control block (comprising of the supply signal forming part 30, the second distributor 38, and the second current amplifying parts 645, 646, and 647) produces the three-phase second amplified current signals H1, H2, and H3 (the second three-phase current signals), each of which varies smoothly at least in the rising and falling slopes, and supplies the second amplified current signals H1, H2, and H3 to the conduction control terminal sides of the second power amplifying parts 615, 616, and 617, respectively. In this way, the current path altering operation by the three second PMOS-FET power transistors 685, 686, and 687 is performed smoothly, and at least one of the three second PMOS-FET power transistors 685, 686, and 687 is caused to perform the ON operation with a resistive voltage drop. Here, the ON operation of a PMOS-FET transistor with a resistive voltage drop means the full ON state of the FET transistor. In other words, in the ON operation with a voltage resistive drop, the voltage between the current input and current output terminal sides of the transistor is a voltage drop that varies proportionally or substantially proportionally to the current through the current path terminal pair of the transistor. Accordingly, each of the second PMOS-FET power transistors smoothly varies the current value by performing a current amplification operation of the half ON operation within the active operation region during portions of the rising and falling slopes of the current. After the current path has been formed, each of the second PMOS-FET power transistor performs an ON operation with a resistive voltage drop. Therefore, the occurrence of spike voltages are avoided in current path altering operation, and the drive current signals I1, I2, and I3 to the windings 2, 3, and 4 vary smoothly.

Further, a first positive feedback loop is formed by the first distribution control block and the first power amplifying parts 11, 12, and 13, and a second positive feedback loop is formed by the second distribution control block and the second power amplifying parts 615, 616, and 617. As a result, at least one of the three FET power transistors 81, 82, and 83 of the first power amplifying parts 11, 12, and 13 is surely performing the ON operation with a resistive voltage drop, and at least one of the three second PMOS-FET power transistors 685, 686, and 687 of the second power amplifying parts 615, 616, and 617 is surely performing the ON operation with a resistive voltage drop. Therefore, the operation of the motor can be stabilized.

Since the first amplified current signal F1 and second amplified current signal H1 for the same phase flow in a complementary manner with a phase difference of 180 degree with respect to each other, the first power amplifying part 11 and the second power amplifying part 615 operate in a complementary manner. Accordingly, the bidirectional drive current signal I1 varying smoothly and continuously is supplied to the winding 2. Similarly, since the first amplified current signal F2 and second amplified current signal H2 flow in a complementary manner with a phase difference of 180 degree with respect to each other, the first power amplifying part 12 and the second power amplifying part 616 operate in a complementary manner. Accordingly, the bidirectional drive current signal I2 varying smoothly and continuously is supplied to the winding 3. Similarly, since the first amplified current signal F3 and second amplified current signal H3 flow in a complementary manner with a phase difference of 180 degree with respect to each other, the first power amplifying part 13 and the second power amplifying part 617 operate in a complementary manner. Accordingly, the bidirectional drive current signal I3 varying smoothly and continuously is supplied to the winding 4. In this way, the first power amplifying part and second power amplifying part of the same phase are made not to be in the conducting state simultaneously, and therefore, no short-circuiting current of the first NMOS-FET power transistor and the second PMOS-FET power transistor flows. Furthermore, since the smoothly varying continuous drive current signals I1, I2, and I3 are supplied to the windings 2, 3, and 4, no occurrence of spike voltages in the windings 2, 3, and 4 can be happened in current path altering operation, thereby preventing an undesirable current flow via the parasitic devices, i.e., the first power diodes 81*d*, 82*d*, 83*d*, and the second power diodes 685*d*, 686*d*, 686*d*. As the result of this, the pulsation of the generated force is remarkably reduced.

The voltage converting part 52 varies the converted DC voltage (Vcc–Vg) between the positive output terminal side and the negative output terminal side by switching the NMOS-FET switching transistor 61 in high frequency PWM mode. The conversion control part 310 outputs the conversion control signal Vd responding with the command signal Ad and the modulated current signal Pm of the modulating block 300. The switching operation of the NMOS-FET switching transistor 61 is controlled responding with the output signal Vd of the conversion control part 310, and thus, the converted DC voltage (Vcc–Vg) of the voltage converting part 52 is controlled in a variable manner. Accordingly, the converted DC voltage (Vcc–Vg) of the voltage converting part 52 varies responding with the modulated current signal Pm of the modulating block 300, thereby reducing the fluctuation of the generated force.

Further, when the DC power source part 50 is turned off in an emergency case, the rectified DC voltage is output at the terminal Xf of the voltage output part 490, by rectifying the three-phase back electromotive forces of the windings 2, 3, 4, by means of the first power diodes 81*d*, 82*d*, and 83*d* and the second power diodes 685*d*, 686*d*, and 687*d*. Using the rectified DC voltage of the voltage output part 490, various emergency storing operation of a disk drive apparatus are performed.

The embodiment provides a motor configuration suitable for integrated circuit implementation. First, the power loss of power devices such as the first power transistors, the second power transistors and the switching transistor is much reduced, thereby reducing a temperature rise of the integrated circuit so as not to make a thermal breakdown. Further, the chip size was reduced by using double diffused MOS FET transistors as the first power transistors and second power transistors. Moreover, the parasitic diodes, each formed from the current output terminal toward the current input terminal of each power transistor, are used as the power diodes, for producing the rectified DC voltage of the back electromotive forces, and thus, the chip area for the power diodes is reduced substantially to zero.

Further, the second PMOS-FET power transistors and the PMOS-FET power switch transistor are used in the second power amplifying parts and the power switch part, thereby omitting a high voltage outputting part which requires components such as capacitors and makes a power loss. Therefore, the configuration of the motor has been greatly simplified, thereby reducing the cost remarkably.

In the embodiment, the supply signal forming part 30 outputs the first supply current signal C1 and the second supply current signal C2 responding with the composed supply current Iv. Using the first amplified current signals F1, F2, and F3 responding with the first supply current signal C1, the conductions of the first power current-mirror circuits in the first power amplifying parts 11, 12, and 13 are controlled. And using the second amplified current signals H1, H2, and H3 responding with the second supply current signal C2, the conductions of the second power current-mirror circuits in the second power amplifying parts 15, 16, and 17 are controlled. By so doing, the current path altering operation can be performed smoothly even when the composed supply current Iv to the windings changes corresponding to the command signal Ad, and thus, the pulsation of the generated force associated with the current path altering operation is greatly reduced.

Further, in the embodiment, each of the first power amplifying parts 11, 12, and 13 is configured by the first FET power current-mirror circuit having each of the first NMOS-FET power transistors, and each of the second power amplifying parts 615, 616, and 617 is configured by the second FET power current-mirror circuit having each of the second PMOS-FET power transistors, thereby significantly reducing the variation of the current amplifying ratio. Usually, an NMOS-FET power transistor and a PMOS-FET power transistor have greatly different nonlinear voltage amplification characteristics. In the embodiment, however, variation between the current amplifying ratios of the first and second FET power current-mirror circuits can be reduced significantly. Accordingly, the current path altering operation by the three first NMOS-FET power transistors 81, 82, 83 and the three PMOS-FET power transistors 685, 686, 687 can be made smooth by supplying the first amplified current signals F1, F2, and F3 (the first three-phase current signals), each varying smoothly at least in the rising and falling slope portions, to the conduction control terminal sides of the three first power amplifying parts 11, 12, and 13, respectively, and by supplying the second amplified current signals H1, H2, and H3 (the second three-phase current signals), each varying smoothly at least in the rising and falling slope portions, to the conduction control terminal sides of the three second power amplifying parts 615, 616, and 617, respectively. Further, at least one transistor of the three first NMOS-FET power transistors can be surely made to perform the ON operation with a resistive voltage drop, and at least one transistor of the three second PMOS-FET power transistors can be surely made to perform the ON operation with a resistive voltage drop. Therefore, a motor with reduced pulsation of the generated force and reduced temperature rise can be realized.

In the embodiment, when the DC power source part 50 is turned off, the rectified DC voltage is output at the terminal Xf of the voltage output part 490, by rectifying the three-phase back electromotive forces of the windings by means of the first power diodes and second power diodes. By using the rectified DC voltage of the voltage output part 490, it becomes possible to store the contents of a RAM memory electrically or to retract the read head mechanically when the DC power source part is turned off in an emergency case.

In the embodiment, the first power amplifying parts 11, 12, and 13 are not limited to the configuration shown in FIG. 18, but various modifications are possible. For example, the power amplifying part 1000 shown in FIG. 22 can be used instead of each of the first power amplifying parts 11, 12, and 13. Further, the power amplifying part 1100 shown in FIG. 23, for example, can also be used instead of each of the first power amplifying parts 11, 12, and 13.

In the embodiment, the second power amplifying parts 615, 616, and 617 are not limited to the configuration shown in FIG. 18, but various modifications are possible. For example, a power amplifying part 1200 shown in FIG. 24 can be used instead of each of the second power amplifying parts 615, 616, and 617. The power amplifying part 1200 comprises a PMOS-FET power transistor 1210, a PMOS-FET transistor 1211, and a resistor 1212 which together constitute an FET power current-mirror circuit. The FET power current-mirror circuit 1200 is configured so that a control terminal side of the FET power transistor 1210 is connected to a control terminal side of the FET transistor 1211 (directly or through some components), one terminal side of the current path terminal pair of the FET transistor 1211 is connected via the resistor 1212 to one terminal side of the current path terminal pair of the FET power transistor 1210, the other terminal side of the current path terminal pair of the FET transistor 1211 is connected to a conduction control terminal side of the power amplifying part 1200 (directly or through some components), and the control terminal side of the FET transistor 1211 is connected to the conduction control terminal side of the power amplifying part 1200 (directly or through some components). The FET power current-mirror circuit provides preferably a large current amplifying ratio larger than the ratio of the cell sizes of the PMOS-FET power transistor 1210 and the PMOS-FET transistor 1211. Therefor, the power amplifying part 1200 has an advantage to reduce the input current.

Figure 25:
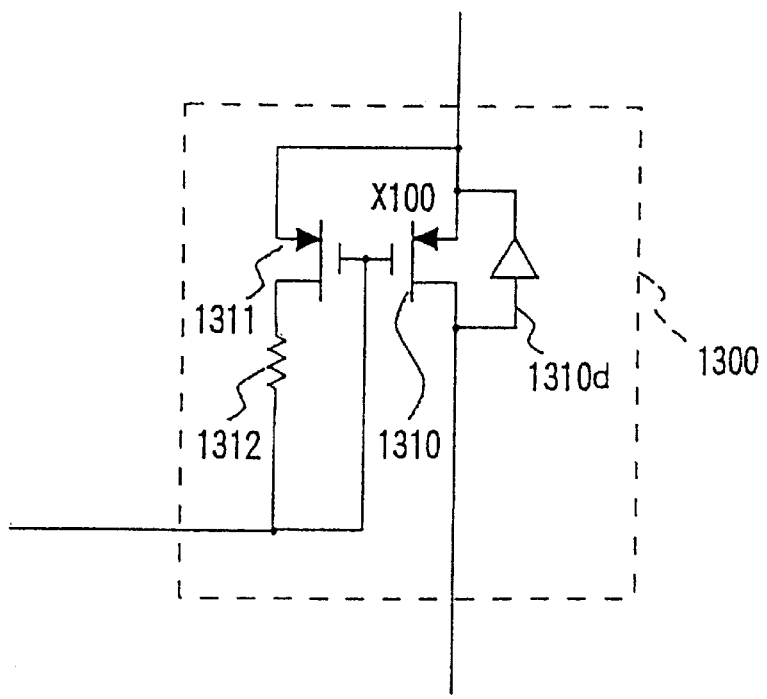
FIG. 25 is a diagram showing another configuration of a power amplifying part in the embodiment of the present invention
Figure 26:
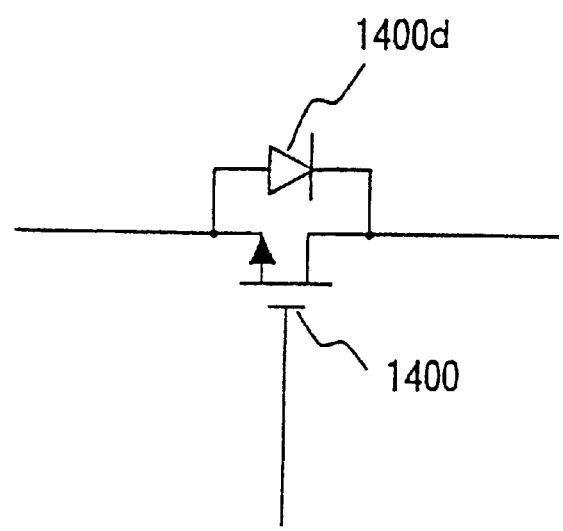
FIG. 26 is a diagram showing another configuration of a current path forming circuit in the voltage converting part in the embodiment of the present invention.

Further, a power amplifying part 1300 shown in FIG. 25, for example, can be used. The power amplifying part 1300 comprises a PMOS-FET power transistor 1310, a PMOS-FET transistor 1311, and a resistor 1312 which together constitute an FET power current-mirror circuit. The FET power current-mirror circuit 1300 is configured so that a control terminal side of the FET power transistor 1310 is connected to a control terminal side of the FET transistor 1311 (directly or through some components), one terminal side of the current path terminal pair of the FET transistor 1311 is connected via the resistor 1312 to the conduction control terminal side of the power amplifying part 1310, the other terminal side of the current path terminal pair of the FET transistor 1311 is connected to one terminal side of the current path terminal pair of the FET power transistor 1310 (directly or through some components), and the control terminal side of the FET transistor 1311 is connected to the conduction control terminal side of the power amplifying part 1310 (directly or through some components). The FET power current-mirror circuit provides a predetermined current amplifying ratio when the input current to the conduction control terminal side is small, but the current amplifying ratio rapidly increases as the input current increases. Here, the PMOS power transistor 1210 and the PMOS power transistor 1310 can be constructed from double diffused P-channel MOS FET power transistors, and can be easily implemented in an integrated circuit.

Besides, the conversion control part and the voltage converting part are not limited to the previously described configuration, many modifications are possible according to the invention. Further, it is possible to omit the conversion control part and the voltage converting part by switching the first FET power transistors and/or the second FET power transistors of the first power amplifying parts and/or the second power amplifying parts at high frequency so as to perform the role of the FET switching transistor of the voltage converting part, which is in the scope of the invention.

In the embodiment, various advantages similar to those achieved in the foregoing embodiments can also be obtained.

Embodiment 5

Figure 20:
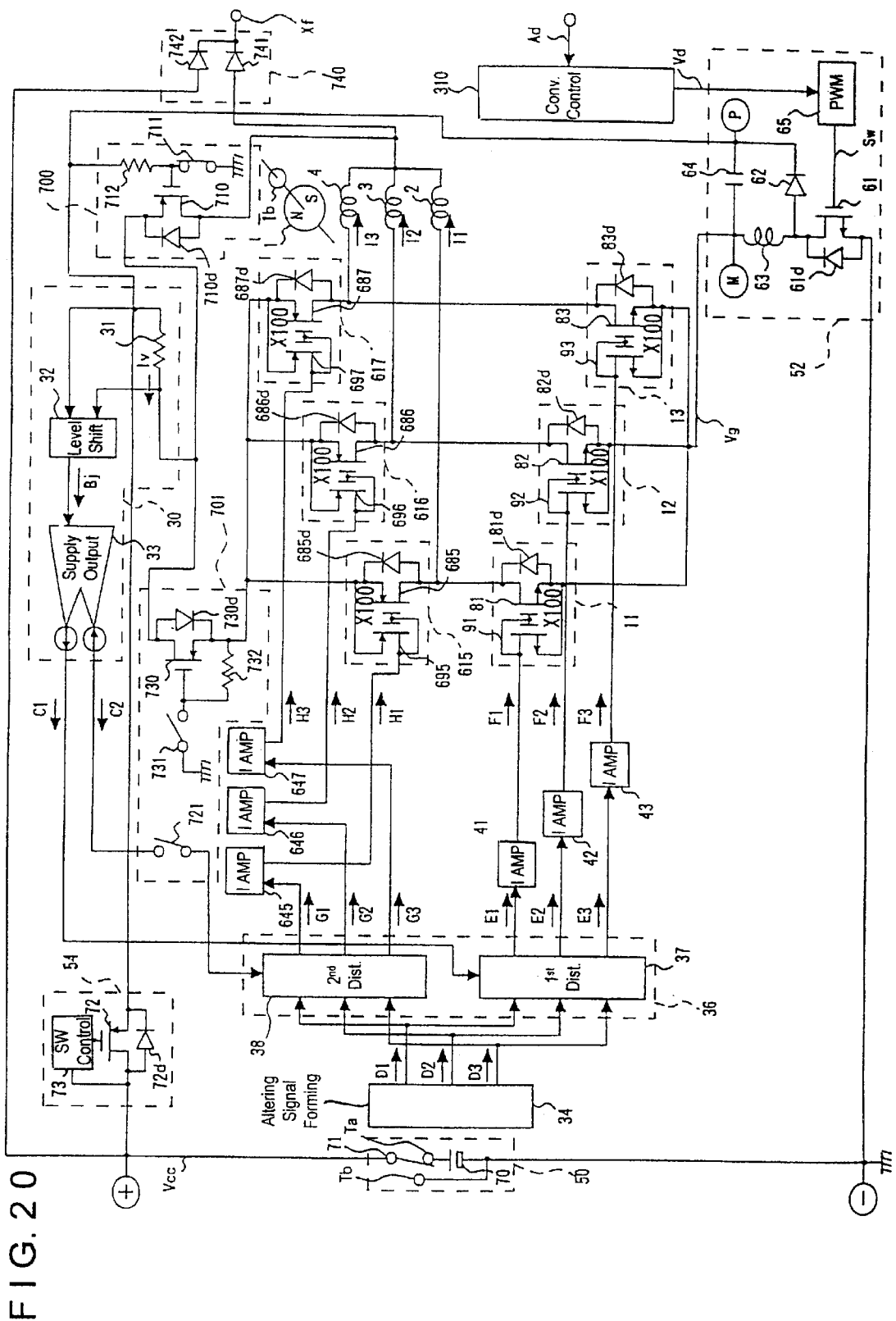
FIG. 20 is a diagram showing the configuration of a fifth embodiment of the present invention.

FIG. 20 shows a motor in accordance with a fifth embodiment of the present invention. The configuration is shown in FIG. 20. In the fifth embodiment, a bypass switch part 700 and a shut-off part 701 are provided so as to achieve selectably a first activating mode for supplying bidirectional drive currents to the windings and a second activating mode for supplying unidirectional drive currents to the windings. Further, the voltage output part 740 is modified so that the rectified DC voltage is taken from the common terminal side of the windings 2, 3, and 4. In the remaining portion of the configuration, components similar to those in the foregoing fourth embodiment, the third embodiment, the second embodiment, or the first embodiment are designated by like numerals, and detailed explanation thereof is omitted.

First, the first activating mode will be explained, in which the bypass switch part 700 is off and the shut-off part 701 is not shut off. In the first activating mode, a first switch element 711 in the bypass switch part 700 is off, and a second switch element 721 and a third switch element 731 in the shut-off part 701 are on. Since the first switch element 711 is off, a PMOS-FET bypass transistor 710 in the bypass switch part 700 is off. The PMOS-FET bypass transistor 710 is configured by an FET transistor with a double diffused P-channel MOS structure, and a diode 710d formed as the parasitic device is connected equivalently and reversely from the current output terminal side toward the current input terminal side. Since the second switch element 721 in the shut-off part 702 is on, the second supply current signal C2 of the supply signal forming part 30 is supplied to the second distributor 38. Since the third switch element 731 in the shut-off part 702 is on, a PMOS-FET shut-off transistor 730 is on, thereby performing the current supply to the second power amplifying parts 615, 616, and 617. The PMOS-FET shut-off transistor 730 is reversely connected, with the current input terminal side connected to the positive terminal side of the DC power source part 50 via the resistor 31 and power switch part 54 and the current output terminal side connected to the common connection terminal side of the second power amplifying parts 615, 616, and 617. The PMOS-FET shut-off transistor 730 is configured by an FET transistor with a double diffused P-channel MOS structure; since the PMOS-FET shut-off transistor 730 is reversely connected, a diode 730d formed as the parasitic device is connected equivalently from the current input terminal side toward the current output terminal side.

Accordingly, the configuration in the first activating mode is substantially the same as that of the foregoing fourth embodiment. Therefore, the positive and negative bidirectional drive current signals I1, I2, and I3 are supplied to the windings 2, 3, and 4 by the first power amplifying parts 11, 12, and 13 and the second power amplifying parts 615, 616, and 617. The detailed configuration and operation are similar as those of the foregoing fourth embodiment, and detailed explanation will be omitted.

Next, the second activating mode will be explained, where the bypass switch part 700 is on and the shut-off part 701 is shut off. In the second activating mode, the first switch element 711 in the bypass switch part 700 is on, and the second switch element 721 and third switch element 731 in the shut-off part 701 are off. Since the first switch element 711 is on, the PMOS-FET bypass transistor 710 in the bypass switch part 700 is on. Accordingly, a current path is formed from the positive output terminal side of the voltage converting part 52 to the common terminal side of the windings 2, 3, and 4 via the current detecting resistor 31 and PMOS-FET bypass transistor 710.

On the other hand, since the second switch element 721 in the shut-off part 701 is off, the second supply current signal C2 of the supply signal forming part 30 is not supplied to the second distributor 38. Hence, the second distributed current signals G1, G2, and G3 and the second amplified current signals H1, H2, and H3 are zero. As a result, the second PMOS-FET power transistors 685, 686, and 687 in the second power amplifying parts 615, 616, and 617 are all off. Further, since the third switch element 731 is off, the shut-off transistor 730 is off, so as to prevent a reverse current flow through the second power diodes 685d, 686d, and 687d. At this time, the shut-off transistor 730 and the parasitic diode 730d shut off the current path of the back electromotive forces of the windings 2, 3, and 4 and thus prevent an undesirable current flow. Accordingly, the current paths to the windings 2, 3, and 4 are formed by the first NMOS-FET power transistors 81, 82, and 83 of the first power amplifying parts 11, 12, and 13 connected in parallel between the positive output terminal side and negative output terminal side of the voltage converting part 52. As a result of this, the unidirectional negative drive current signals I1, I2, and I3 are supplied to the windings 2, 3, and 4. A resistor 712 in the bypass switch part 700 and a resistor 732 in the shut-off part 701 are pull-up resistors, and are omitted if unnecessary.

The operation of the second activating mode will be described. The supply signal forming part 30 supplies the first supply current signal C1 and the second supply current signal C2 responding with the current detected signal Bj. The second supply current signal C2 is blocked by the second switch element 721 in the shut-off part 701, so as not to supply the current C2 to the second distributor 38. Therefore, the second power amplifying parts 615, 616, and 617 all stop conducting and do not supply currents to the windings 2, 3, and 4. On the other hand, the first supply current signal C1 is supplied to the first distributor 37. The first distributor 37 distributes the first supply current signal C1, responding with the three-phase altering current signals D1, D2, and D3 of the altering signal forming part 34, and outputs the smoothly varying three-phase first distributed current signals E1, E2, and E3. The first current amplifying parts 41, 42, and 43 output the first amplified current signals F1, F2, and F3 by amplifying the first distributed current signals E1, E2, and E3, respectively, and supply the first amplified current signals to the conduction control terminal sides of the first power amplifying parts 11, 12, and 13. The first power current-mirror circuits in the first power amplifying parts 11, 12, and 13 amplify the first amplified current signals F1, F2, and F3 so as to supply currents to the windings 2, 3, and 4, respectively. In this way, The first distribution control block (comprising of the supply signal forming part 30, the first distributor 37, and the first current amplifying parts 41, 42, and 43) causes at least one of the three first NMOS-FET power transistors 81, 82, and 83 to perform an ON operation with a resistive voltage drop.

The conversion control part 310 outputs the conversion control signal Vd responding with the command signal Ad. The voltage converting part 52 switches the NMOS-FET switching transistor 61 at high frequency responding with the conversion control signal Vd. As a result, the converted DC voltage (Vcc−Vg) of the voltage converting part 52 is controlled in a variable manner. The converted DC voltage (Vcc−Vg) from the voltage converting part 52 is supplied to the three first power amplifying parts 11, 12, and 13, the windings 2, 3, and 4, and the bypass switch part 700. The first NMOS-FET power transistors 81, 82, and 83 alter current paths to the windings 2, 3, and 4 so as to supply the three-phase unidirectional drive currents I1, I2, and I3.

The voltage output part 740 compares the potential of the positive terminal side of the DC power source part 50 with the potential at the common terminal side of the windings, and outputs the greater one of the two voltages. In this way, the rectified DC voltage of the three-phase back electromotive forces of the windings is output at the terminal Xf when the DC power source part 50 is off.

The remainder of the configuration and operation is similar as that in the foregoing fourth embodiment, and a detailed description thereof will be omitted.

In the embodiment, the motor can change the performance between the first activating mode for supplying the bidirectional drive currents to the windings and the second activating mode for supplying the unidirectional drive currents to the windings. In both the first activating mode and the second activating mode, power loss and temperature rise are small in the power devices such as the first power transistors, the second power transistors, the switching transistor, the bypass transistor, and the shut-off transistor. Accordingly, these power devices can be integrated, each isolated by junctions from the others, on a single silicon substrate, as needed.

The first activating mode for supplying the bidirectional drive currents to the windings has the advantage of being able to increase the generated force. The second mode for supplying the unidirectional drive currents to the windings offers the advantage that the motor can be rotated at high speed since the back electromotive forces of the windings can be increased. Accordingly, a motor having a large generated force and capable of high speed rotation can be realized.

The second power diodes 685d, 686d, and 687d as parasitic devices are reversely connected to the second power transistors 685, 686, and 687 fabricated as an integrated circuit. When the bypass transistor 710 is turned on to supply the unidirectional drive currents to the windings 2, 3, and 4, the potentials at the power supplying terminals of the windings rise in an alternating current manner so that the peak potentials become higher than the potential at the positive output terminal side of the voltage converting part 52. However, since the PMOS-FET shut-off transistor 730 is reversely connected, the shut-off transistor 730 can surely shut off or prevent a reverse current path of an undesirable current flow. The shut-off transistor 730 is not limited to the reversely connected PMOS-FET transistor, but can also be constructed from a reversely connected NMOS-FET transistor. In each of these reversely connected FET transistors, a parasitic diode is formed from the current input terminal side toward the current output terminal side, and when the shut-off transistor is off, the parasitic diode also acts to block the reverse current flow.

In the embodiment, various advantages similar to those achieved in the foregoing embodiments can also be obtained.

Further, in the embodiment, the drive circuit for supplying the drive currents to the three-phase loads (the windings 2, 3, and 4) is formed by the first power amplifying parts 11, 12, and 13, the second power amplifying parts 615, 616, and 617, the supply signal forming part 30, the altering signal forming part 34, the distributed signal forming part 36 (the first distributor 37 and the second distributor 38), the first current amplifying parts 41, 42, and 43, the second current amplifying parts 645, 646, and 647, the conversion control part 310, the voltage converting part 52, the bypass switch part 700, the shut-off part 701, and the voltage output part 740.

It is also possible to provide a high voltage outputting part, when NMOS-FET transistors are used as the second power transistors 685, 686, 687, the bypass transistor 710, and the shut-off transistor 730, and the conduction of these NMOS-FET devices is supplied currents from the high potential point of the high voltage outputting part.

Embodiment 6

Figure 21:
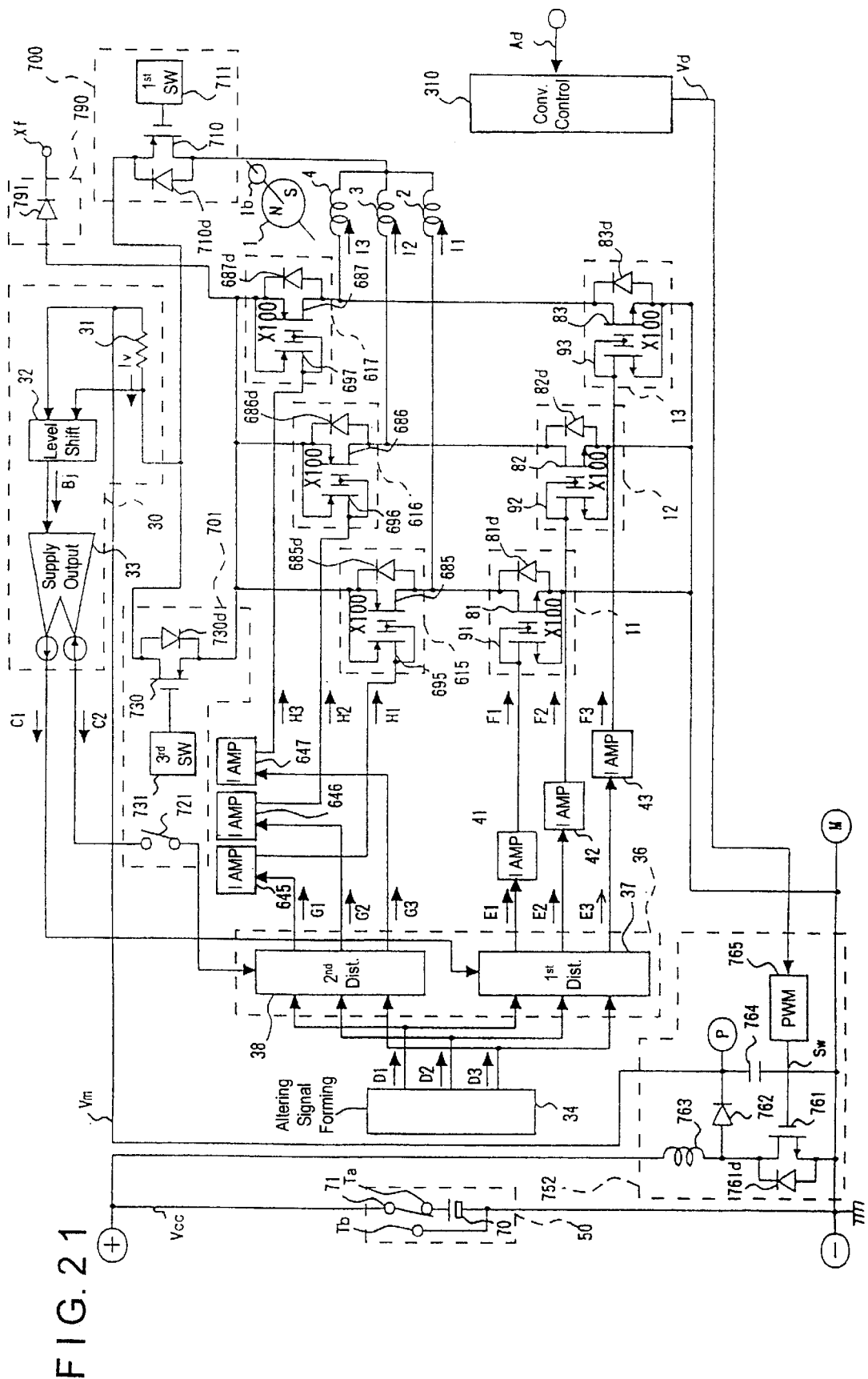
FIG. 21 is a diagram showing the configuration of a sixth embodiment of the present invention.
Figure 22:
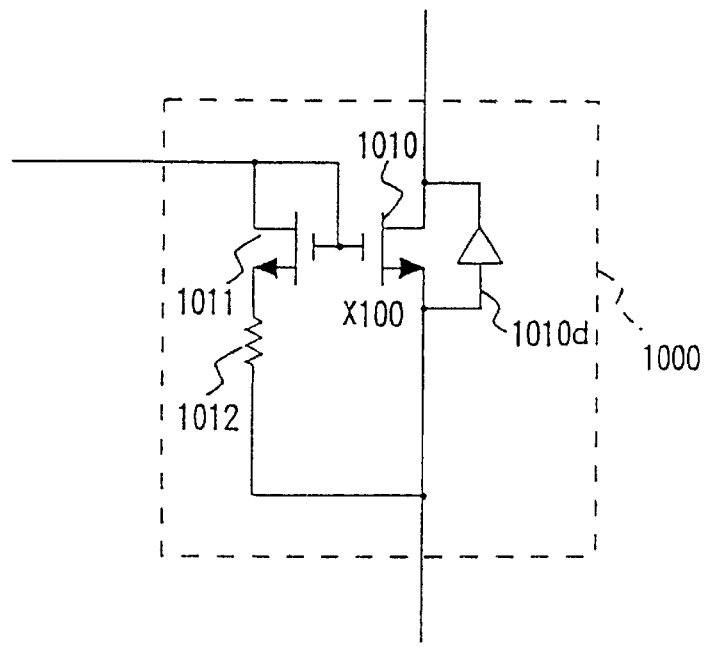
FIG. 22 is a diagram showing another configuration of a power amplifying part in the embodiment of the present invention.

FIG. 21 shows a motor in accordance with a sixth embodiment of the present invention. The configuration is shown in FIG. 21. In the sixth embodiment, the voltage converting part 752 is configured to perform the function of voltage conversion such as the high voltage outputting part 450 shown in FIG. 16. In the remaining portion of the configuration, components similar to those in the foregoing fifth embodiment, the fourth embodiment, the third embodiment, the second embodiment, or the first embodiment are designated by like numerals, and detailed explanation thereof is omitted.

The voltage converting part 752 in FIG. 21 includes an NMOS-FET switching transistor 761 which perform high-frequency switching on-off operations at about 200 kHz. The current output terminal side of the NMOS-FET switching transistor 761 is connected to the negative terminal side (−) of the DC power source part 50 and the current input terminal side of the NMOS-FET switching transistor 761 is connected to one end of a converting inductor 763. The NMOS-FET switching transistor 761 performs high-frequency switching of a power supply path, thereby replenishing a magnetic energy of the converting inductor 763 from the positive terminal side (+) of the DC power source part 50. A flywheel diode 762 as a current path forming circuit is connected to the one side of the converting inductor 763, performs off-on operations complementarily to the high-frequency switching on-off operations of the NMOS-FET switching transistor 761, and forms a current path from the converting inductor 763 to the circuit including a converting capacitor 764. In other words, when the NMOS-FET switching transistor 761 is on, the power supply path through the converting inductor 763 from the positive terminal side of the DC power source part 50 is formed so as to replenish the magnetic energy of the converting inductor 763. When the NMOS-FET switching transistor 761 is turned off, the terminal voltage of the converting inductor 763 increases rapidly, thereby causing the flywheel diode 762 to conduct so as to form the current path from the converting inductor 763 to the circuit including the converting capacitor 764. Thus, a converted DC voltage Vm of the voltage converting part 752 is output between one end of the converting capacitor 764 and one end of the DC power source part 50. The converting capacitor 764 is connected between the positive output terminal side (P) and the negative output terminal side (M) of the voltage converting part 752, and forms a filtering circuit for smoothing the current and the voltage supplied via the converting inductor 763. In this way, the potential Vm at the positive output terminal side of the voltage converting part 752 is controlled in a variable manner by switching the NMOS-FET switching transistor 761 in high frequency PWM mode (PWM: pulse width modulation). As a result, the converted DC voltage Vm is produced between the positive output terminal side and negative output terminal side of the voltage converting part 752, with the DC voltage Vcc supplied from the DC power supply part 50 as a power source. Here, the negative terminal of the DC power source part 50 is held at ground potential (0 V).

The NMOS-FET switching transistor 761 is configured by an FET transistor with a double diffused N-channel MOS structure, and a switching diode 761d formed as a parasitic device is connected equivalently and reversely from the current output terminal side toward the current input terminal side.

The conversion control part 310 outputs the conversion control signal Vd responding with the command signal Ad. In the voltage converting part 752, a PWM part 765 produces the high frequency PWM signal Sw of the pulse width responding with the conversion control signal Vd, and switches the NMOS-FET switching transistor 761 at high frequency. In other words, the PWM switching operation of the NMOS-FET switching transistor 761 in the voltage converting part 752 is controlled responding with the conversion control signal Vd from the conversion control part 310. With the DC voltage Vcc of the DC power supply part 50 as a power source, the voltage converting part 752 outputs the converted DC voltage Vm responding with the PWM switching operation of the NMOS-FET switching transistor 761. The detailed configuration of the PWM part 765 in the voltage converting part 752 is similar as that shown in FIG. 7, and the detailed explanation thereof is omitted.

The voltage output part 790 in FIG. 21 includes an output diode 791. The input terminal side of the output diode 791 is connected to the current input terminal sides of the second PMOS-FET power transistors 685, 686, and 687, and the output terminal side thereof is connected to the output terminal Xf of the voltage output part 790. With this configuration, when the DC power source part 50 is turned off, the voltage output part 790 outputs the rectified DC voltage, obtained by rectifying the back electromotive forces of the windings 2, 3, and 4, through the output diode 791. At this time, the flywheel diode 762 in the voltage converting part 752 blocks an undesirable current that flows from the three-phase windings 2, 3, and 4 toward the DC power source part 50 due to the back electromotive forces of the windings, when the DC power source part 50 is turned off. Accordingly, the flywheel diode 762 also performs the function of the power switch part 54 shown in FIGS. 15 and 20. Various protection operations can therefore be performed by using the rectified DC voltage from the voltage output part 790 when the DC power source part 50 is turned off.

The remainder of the configuration and operation is similar as that in the foregoing fifth embodiment, and a detailed description thereof will be omitted.

In the embodiment, the motor configuration is suitable for integrated circuit implementation. First, the power loss of the power devices such as the first power transistors, the second power transistors, and the switching transistor is much reduced, thereby reducing a temperature rise of the integrated circuit so as not to make a thermal breakdown. Further, the chip size was reduced by using double diffused MOS FET transistors as the first power transistors, second power transistors, and the switching transistor.

Further, the NMOS-FET switching transistor whose current output terminal side is connected to the negative terminal side of the DC power source part is operated in PWM mode, and the converted DC voltage is obtained by using the NMOS-FET switching transistor and the converting inductor. The configuration prevents the potentials at the current input terminal side and current output terminal side of the NMOS-FET switching transistor from dropping below the negative terminal potential (ground potential) of the DC power source part 50. As a result, the operation of the parasitic transistors formed with junction isolated portions as the base terminals can be prevented, thereby stabilizing the circuit operation of the motor.

Further, the second PMOS-FET power transistors, the PMOS-FET bypass transistor, and the PMOS-FET shut-off transistor are used in the second power amplifying parts, the bypass switch part, and the shut-off part, therefore not a high voltage outputting part is needed, which makes the configuration of the embodiment simple and low cost.

In the embodiment, the motor can change the performance between the first activating mode for supplying the bidirectional drive currents to the windings and the second activating mode for supplying the unidirectional drive currents to the windings. In both the first activating mode and the second activating mode, power loss and temperature rise are small in the power devices such as the first power transistors, the second power transistors, the switching transistor, the bypass transistor, and the shut-off transistor. Accordingly, these power devices can be integrated on a single silicon substrate.

In the embodiment, the DC power source part 50 and the voltage converting part 752 constitute the voltage supplying block for supplying the DC voltage Vm between the positive output terminal side and the negative output terminal side of the voltage converting part. This voltage supplying block can increase the converted DC voltage Vm above the output DC voltage Vcc of the DC power source part 50, thus increasing the supply voltage to the windings 2, 3, and 4. With this, high speed motor rotation can be easily achieved by supplying a high converted DC voltage Vm. Besides, during the motor starting period, etc., the switching transistor 761 remains in the off state, and the output DC voltage Vcc of the DC power source part 50 may be output as the converted DC voltage of the DC converting part 752 via the flywheel diode 762.

Further, in the embodiment, the flywheel diode 762 as the current path forming circuit in the voltage converting part 752 is only required to form the current path from the converting inductor 763 to the circuit including the converting capacitor 764 when the switching transistor 761 is off, and various modifications are possible. For example, the flywheel diode 762 may be replaced by the NMOS-FET synchronous rectifying transistor 1400 shown in FIG. 26. The synchronous rectifying transistor 1400 can be switched off and on in a complementary manner to the switching on-off operations of the switching transistor 761 by a signal from the PWM part 765. The synchronous rectifying transistor 1400 is configured by an FET transistor with a double diffused N-channel MOS structure; the parasitic diode 1400d of the synchronous rectifying transistor 1400 can perform the role of a flywheel diode because of the same connection as the flywheel diode.

Also, the flywheel diode may be replaced by the PMOS-FET synchronous rectifying transistor 1500 shown in FIG. 27. The PMOS-FET synchronous rectifying transistor 1500 can be switched off and on in a complementary manner to the switching on-off operations of the switching transistor 761 by a signal from the PWM part 765. The synchronous rectifying transistor 1500 is configured by an FET transistor with a double diffused P-channel MOS structure; the parasitic diode 1500d of the synchronous rectifying transistor 1500 can perform the role of a flywheel diode because of the same connection as the flywheel diode. Further, the synchronous rectifying transistor 1500 replacing the flywheel diode 762 can block an undesirable current in the reverse direction from the windings toward the DC power source part 50 due to the back electromotive forces of the windings when the DC power source part 50 is turned off. In this way, the synchronous rectifying transistor 1500 can perform the same function as that of the PMOS-FET power switch transistor 72 shown in FIG. 17. Further, the PMOS-FET synchronous rectifying transistor 1500 does not need a high voltage outputting part, and thus the motor configuration is simplified.

Further, in the embodiment, the first supply current signal C1 and the second supply current signal C2 responding with the composed supply current Iv are produced by the supply signal forming part 30. The first amplified current signals F1, F2, and F3 responding with the first supply current signal C1 are produced as the three-phase first amplified current signals, each varying smoothly at least in the rising and falling slope portions, and are supplied to the conduction control terminal sides of the first power amplifying parts 11, 12, and 13. The second amplified current signals H1, H2, and H3 responding with the second supply current signal C2 are produced as the three-phase second amplified current signals, each varying smoothly at least in the rising and falling slope portions, and are supplied to the conduction control terminal sides of the second power amplifying parts 615, 616, and 617. Therefore, the three first NMOS-FET power transistors 81, 82, 83 and the three second PMOS-FET power transistors 685, 686, 687 achieve smooth altering operation of the current paths to the windings 2, 3, and 4. Accordingly, the drive current signals I1, I2, and I3 to the windings 2, 3, and 4 vary smoothly, and thus, the pulsation of the generated force is greatly reduced. Such an effect can also be obtained in the second activating mode of unidirectional current supply when the bypass transistor is on. Further, the supply signal forming part 950 shown in FIG. 28 may be used instead of the supply signal forming part 30 so that the first supply current signal C1 and the second supply current signal C2 can be varied responding directly with the command signal Ad.

In the embodiment, various advantages similar to those achieved in the foregoing embodiments can also be obtained.

In the detailed configuration of each of the foregoing embodiments, various modifications are possible. For example, the winding of each phase can be configured by a plurality of partial windings connected in series or in parallel. The three-phase windings are not limited to a star connection configuration, but a delta connection configuration can be employed. Generally, a motor having single- or plural-phase windings can be realized. Further, the field part of the movable member is not limited to the illustrated one. Also, the number of magnetic poles is not limited to two; generally, a motor having a plurality of magnetic poles can be realized. Moreover, the field part is only required to supply the windings with the magnetic flux that varies in accordance with the movement of the movable member, and various known configurations are possible. Various motors, such as brushless motors, permanent magnet stepping motors, reluctance stepping motors, and hybrid stepping motors, and so on, can be configured according to the present invention, and therefore these motors are also in the scope of the present invention. Furthermore, the movement of the movable member is not limited to a rotational motion, but a motor of a linear motion can be realized. Further, the conversion control part and the voltage converting part are not limited to the illustrated configurations. Moreover, the function of the conversion control part and other necessary functions can be implemented in digital fashion by using a microprocessor and a peripheral circuit.

Further, a motor having a single-phase winding can be realized according to the invention, such a motor as a single-phase actuator used as a focus actuator or a tracking actuator of a disk drive apparatus, for example. A configuration of a single-phase motor according to the invention can be that without the first amplifying part 13, the second amplifying part 17, and the winding 4 of the embodiment shown in FIG. 1. In this case, the winding 3 is replaced by a zero ohm connection simply, the first amplified current signals F1 and F2 are altered complementarily, and the second amplified current signals H1 and H2 are also altered complementarily. So a single-phase altering signal of the altering signal forming part is sufficient to alter current paths to the single-phase winding.

Further, for the implementation of the integrated circuit, various one-chip integrated-circuit technologies using known semiconductor processes can be utilized. For example, there are various one-chip integrated-circuit technologies that can use a single kind or multiple kinds of MOS-FET transistors, CMOS-FET transistors, and bipolar transistors. In any of these technologies, the integrated circuit substrate is—135 connected to the ground potential of the negative terminal side of the DC power supply, thereby integrating transistors, resistors, and some other components in a high density. The specific transistor layout within the chip is a design matter, so detailed explanation is omitted.

Further, each of the first power amplifying parts and the second power amplifying parts can be made forcibly off in each off period by supplying an off signal which causes to connect the conduction control terminal side of each of the power amplifying parts electrically to either positive or negative terminal side of the DC power source through a resistor.

Figure 30:
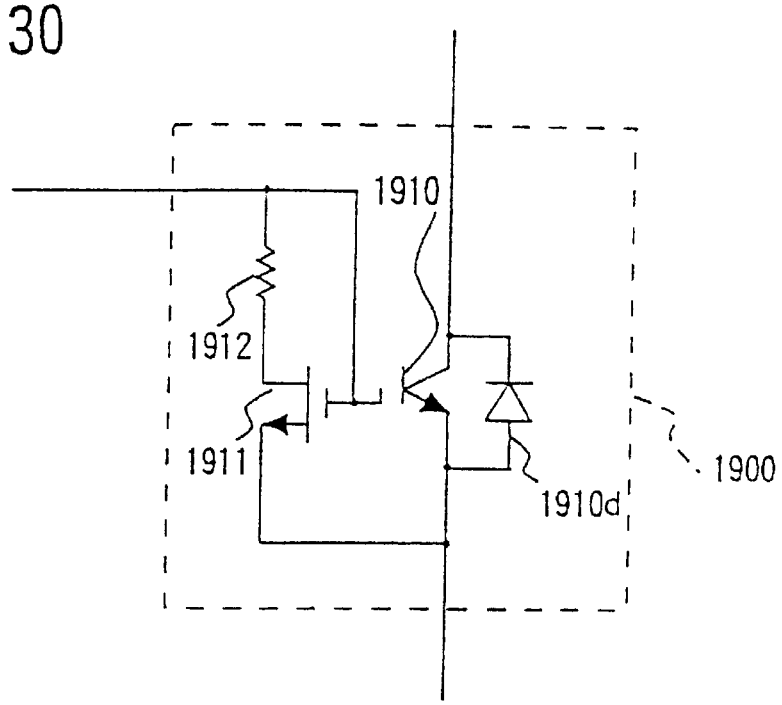
FIG. 30 is a diagram showing another configuration of a power amplifying part in the embodiment of the present invention.
Figure 31:
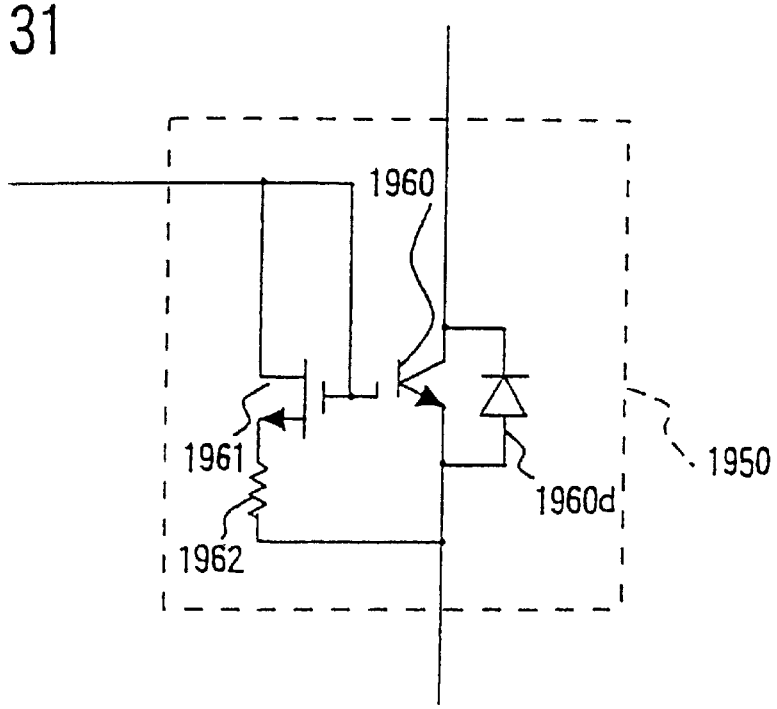
FIG. 31 is a diagram showing another configuration of a power amplifying part in the embodiment of the present invention.
Figure 32:
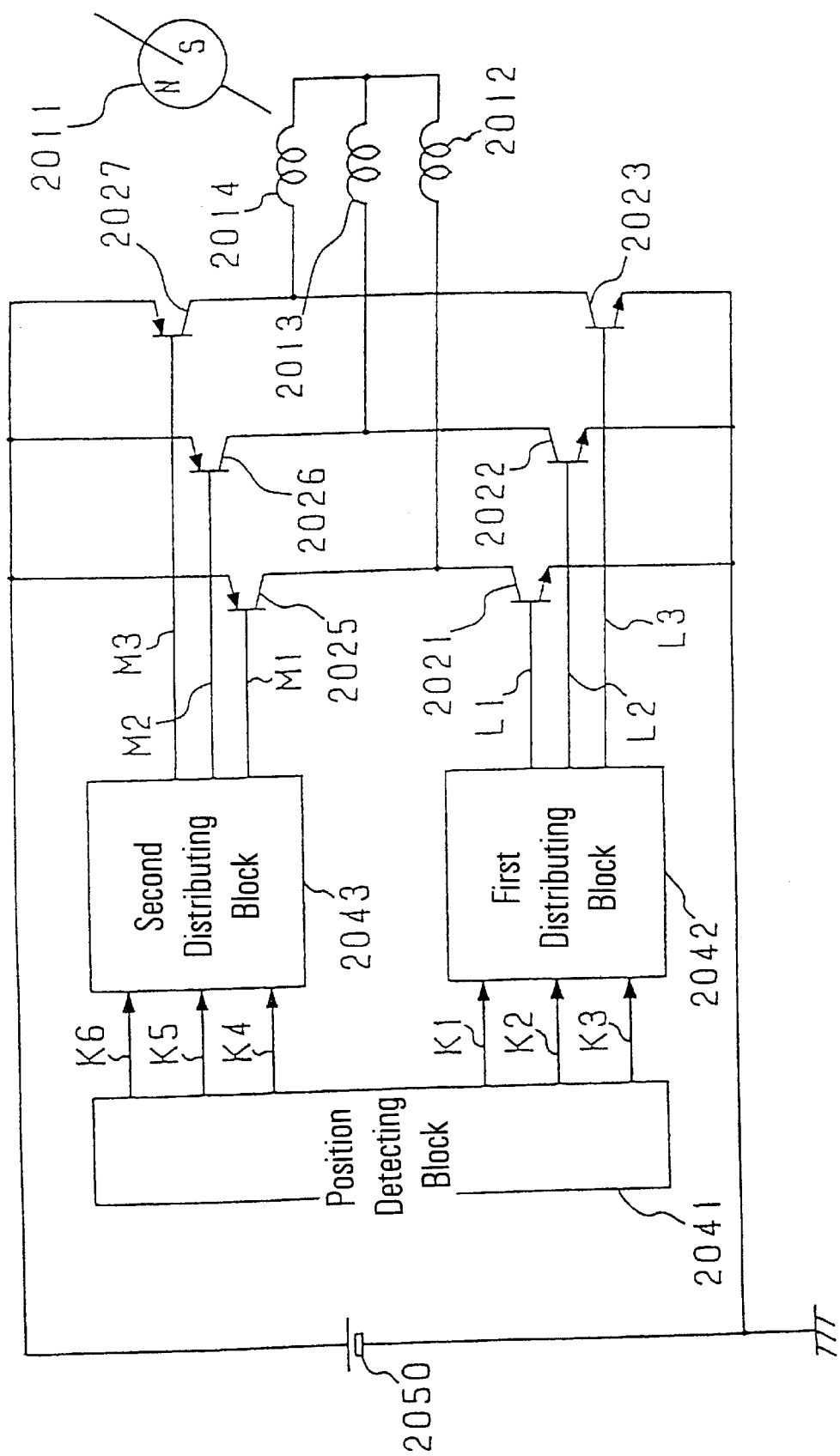
FIG. 32 is a diagram showing a prior art motor configuration.

The first power amplifying parts and second power amplifying parts are not limited to the illustrated configuration, but various modifications are possible. In the foregoing embodiments, a power amplifying part having a power current-mirror circuit of field-effect power transistors is shown as a preferred example, but the invention is not limited to such a configuration. For example, an IGBT transistor (Insulated Gate Bipolar Transistor) or COMFET transistor (Conductivity Modulated Field Effect Transistor) is a composite power transistor having a nonlinear voltage amplification characteristic and is used as an on-off switching device, because of a large variation of the amplification characteristic. However, since the IGBT transistor is a composite FET transistor having an FET transistor at the input side, an FET power current-mirror circuit can be configured by using the IGBT transistor, thereby configuring a power amplifying part which includes a IGBT power transistor and has an electric current amplifying characteristic. By supplying a current signal, varying smoothly at least in the rising and falling slope portions, to the conduction control terminal side of such a power amplifying part, it becomes possible to alter the current path smoothly. Though the composite FET transistor has many shortcomings (large ON voltage, large variation in amplification gain, etc.), the various effects shown in the present invention can be obtained. Accordingly, the FET transistors in the present invention include the IGBT transistor or composite FET transistor having an FET transistor at the input side. FIG. 30 shows an example of a power amplifying part 1900 having a composite FET power transistor 1910 such as the IGBT transistor. With the connection of the composite FET transistor 1910 and FET transistor 1911, an FET power current-mirror circuit is formed equivalently. With this configuration, the input current to the conduction control terminal side of the power amplifying part 1900 is amplified, and the drive current is output through the current path terminal pair of the composite FET transistor 1910. A power diode 1910*d* is a parasitic diode connected equivalently and reversely in parallel to the current path terminal pair of the composite FET transistor 1910. The composite FET transistor 1910 performs an ON operation with a resistive voltage drop including a bias value of a voltage. FIG. 31 shows another example of a power amplifying part 1950 having a composite FET power transistor 1960 such as the IGBT transistor. Further, the FET switching transistors in the present invention include the IGBT transistor or composite FET transistor having an FET transistor at the input side.

For the DC power source part 50 shown in the foregoing embodiments, various modifications are possible as long as a DC voltage and a DC current can be supplied. For example, a battery power supply, a diode rectified power supply of an AC line, etc. can be used.

Further, an excellent disk apparatus with much reduced pulsation of a generated torque and reduced vibration can be realized according to the invention.

It will also be appreciated that various other modifications are possible without departing from the scope of the present invention and such modifications are also included in the invention.

What is claimed is:

1. A motor comprising:

a rotatable member;

plural-phase windings;

a voltage supplying means including an FET switching transistor for performing high-frequency switching of a power supplying path of a DC power source to provide a converted DC voltage;

Q (Q is an integer of 2 or more) first power amplifying means each one including a first FET power transistor for forming a current path from a negative output terminal of said voltage supplying means to one of said plural-phase windings;

Q second power amplifying means each one including a second FET power transistor for forming a current path from a positive output terminal of said voltage supplying means to one of said plural-phase windings;

altering signal forming means for producing plural-phase altering signals;

first distribution control means for controlling said Q first power amplifying means in response to at least one of the altering signals of said altering signal forming means to cause at least one of Q of said first FET power transistors to conduct;

second distribution control means for controlling said Q second power amplifying means in response to at least one of the altering signals of said altering signal forming means to cause at least one of Q of said second FET power transistors to conduct; and conversion control means for changing said converted DC voltage across said positive output terminal and said negative output terminal of said voltage supplying means synchronously with respect to the rotation of said rotatable member.

2. The motor in accordance with claim 1, wherein said conversion control means includes a modulation control means for providing a modulation control signal which is synchronously actuated with respect to said rotation of said rotating member to synchronously change said converted DC voltage;

wherein said modulation control means is configured to a modulation input of said voltage supplying means.

3. The motor in accordance with claim 1, wherein said conversion control includes modulation control means for providing a modulation control signal which is synchronously actuated with respect to the rotation of said rotating member to synchronously change said converted DC voltage;

wherein said modulation control means is configured to synchronously actuate a modulation input with the modulation control signal to power said plural-phase windings.

4. The motor in accordance with claim 1, wherein
said first distribution control means includes means for supplying first Q-phase current signals, each to a conduction control terminal of each of said Q first power amplifying means.

5. The motor in accordance with claim 4, wherein
said first distribution control means has means for varying said first Q-phase current signals in response to a command signal which provides power to said plural-phase windings.

6. The motor in accordance with claim 1, wherein
said second distribution control means includes means for supplying second Q-phase current signals, each to a conduction control terminal of each of said Q second power amplifying means.

7. The motor in accordance with claim 6, wherein
said second distribution control means has means for varying said second Q-phase current signals in response to a command signal which provides power to said plural-phase windings.

8. The motor in accordance with claim 1, wherein
said voltage supplying means includes inductive means for storing magnetic energy,
capacitive means for storing electric energy,
switching means including said FET switching transistor whose current output terminal is connected to the negative terminal of said DC power source and whose current input terminal is connected to one end of said inductive means, for performing high-frequency switching of a power supply path for replenishing the magnetic energy of said inductive means from said DC power source, and
current path forming means for forming a current path from said inductive means toward a circuit including said capacitive means by discharging electric energy corresponding to a period of non-conduction of said FET switching transistor to output said converted DC voltage across one end of said capacitive means and one end of said DC power source and supply said converted DC voltage to said Q first power amplifying means and said Q second power amplifying means.

9. The motor in accordance with claim 1, wherein
said voltage supplying means supplies said converted DC voltage to said Q first power amplifying means and said Q second power amplifying means and is configured to output said converted DC voltage at a level which is greater than the DC voltage of said DC power source.

10. The motor in accordance with claim 1, wherein
each of said Q first power amplifying means has a reverse biased first power diode connected across the current input terminal and the current output terminal of said first FET power transistor, and
each of said Q second power amplifying means has a reverse biased second power diode connected across the current input terminal and the current output terminal of said second FET power transistor,
said motor further comprising:
power switch means for interrupting a power supplying path between the positive terminal of said DC power source and the current input terminals of said Q second power amplifying means when said DC power source is turned off, and
voltage output means for outputting a rectified DC voltage obtained by rectifying plural-phase back electromotive forces of said plural-phase windings when said DC power source is turned off.

11. The motor in accordance with claim 1, further comprising:
bypass switch means for interrupting or connecting a current path between the positive output terminal of said voltage supplying means and a common terminal of said plural-phase windings, and
shut-off means for performing or stopping a supply of current to said plural-phase windings from said Q second power amplifying means.

12. The motor in accordance with claim 1, wherein
each of said first power amplifying means includes a first FET power current-mirror circuit including said first FET power transistor and each of said second power amplifying means includes a second FET power current-mirror circuit including said second FET power transistor.

13. A motor comprising:
a rotatable member;
single- or plural-phase windings;
a voltage supplying means for supplying a DC voltage;
Q (Q is an integer of 2 or more) first power amplifying means, each one including a first FET power transistor for forming a current path from a negative output terminal of said voltage supplying means to one of said single- or plural-phase windings;
Q second power amplifying means, each one including a second FET power transistor for forming a current path from a positive output terminal of said voltage supplying means to one of said single- or plural-phase windings;
altering signal forming means for producing an altering signal;
first distribution control means for controlling said Q first power amplifying means in response to at least one of the altering signals of said altering signal forming means to cause at least one of Q of said first FET power transistors to conduct; and
second distribution control means for controlling said Q second power amplifying means in response to at least one of the altering signals of said altering signal forming means, to cause at least one of Q of said second FET power transistors to conduct;
said voltage supplying means including: inductive means for storing magnetic energy; capacitive means for storing electric energy; switching means including an FET switching transistor whose current output terminal is connected to a negative terminal of a DC power source and whose current input terminal is connected to one end of said inductive means, for performing high-frequency switching of a power supply path for replenishing the magnetic energy of said inductive means from said DC power source; and current path forming means for forming a current path from said inductive means toward a circuit including said capacitive means by discharging electric energy corresponding to a period of non-conduction of said FET switching transistor to output a converted DC voltage between one end of said capacitive means and one end of said DC power source and supply said converted DC voltage to said Q first power amplifying means and said Q second power amplifying means,
wherein said FET switching transistor, said first FET power transistors, and said second FET power transistors comprise a single integrated circuit package.

14. The motor in accordance with claim 13, further comprising conversion control means for changing said converted DC voltage of said voltage supplying means synchronously with respect to the rotation of said rotatable member.

15. The motor in accordance with claim 13, wherein said first distribution control means and said second distribution control means include means for supplying a current signal to a conduction control terminal of one of said Q first power amplifying means and said Q second power amplifying means.

16. The motor in accordance with claim 13, wherein each of said first power amplifying means has a reverse biased first power diode connected across the current input terminal and the current output terminal of said first FET power transistor; and each of said second power amplifying means has a reverse biased second power diode connected across the current input terminal and the current output terminal of said second FET power transistor, said motor further comprising:

power switch means for interrupting a power supply path between the positive terminal of said DC power source and the current input terminals of said Q second power amplifying means when said DC power source is turned off, and voltage output means for outputting a rectified DC voltage obtained by rectifying back electromotive force of said single- or plural-phase windings when said DC power source is turned off.

17. The motor in accordance with claim 13, wherein said voltage supplying means is configured to be able to output said converted DC voltage across one end of said capacitive means and one end of said DC power source, said converted DC voltage being at a level which is greater than the DC voltage of said DC power source.

18. The motor in accordance with claim 13, wherein each of said Q first power amplifying means includes a first FET power current mirror circuit including said first FET power transistor and each of said Q second power amplifying means includes a second FET power current mirror circuit including said second FET power transistor.

19. A motor comprising:

a rotatable member;

plural-phase windings;

a voltage supplying means for supplying a DC voltage;

Q (Q is an integer of 2 or more) first power amplifying means, each one including a first FET power transistor for forming a current path from a negative output terminal of said voltage supplying means to one of said plural-phase windings;

Q second power amplifying means, each one including a second FET power transistor for forming a current path from a positive output terminal of said voltage supplying means to one of said plural-phase windings;

altering signal forming means for producing plural-phase altering signals;

first distribution control means for controlling said Q first power amplifying means in response to at least one of the altering signals of said altering signal forming means to cause at least one of Q of said first FET power transistors to conduct;

second distribution means for controlling said Q second power amplifying means in response to at least one of the altering signals of said altering signal forming means to cause at least one of Q of said second FET power transistors to conduct;

bypass switch means having a bypass transistor for interrupting or connecting a current path between the positive output terminal of said voltage supplying means and a common terminal of said plural-phase windings;

shut-off means having a shut-off transistor for performing or stopping current flow to said plural-phase windings from said Q second power amplifying means; and valve means permitting unidirectional conduction from a current output terminal toward a current input terminal of at least one of said second FET power transistors.

20. The motor in accordance with claim 19, wherein said shut-off transistor is an FET shut-off transistor having a diode which permits unidirectional conduction from a current input terminal to a current output terminal of said FET shut-off transistor.

21. The motor in accordance with claim 19, further comprising conversion control means for changing the DC voltage across said positive output terminal and said negative output terminal of said voltage supplying means synchronously with respect to the rotation of said rotatable member.

22. The motor in accordance with claim 19, wherein said first distribution control means includes means for supplying first Q-phase current signals, each to a conduction control terminal of each of said Q first power amplifying means, and said second distribution control means includes means for supplying second Q-phase current signals, each to a conduction control terminal of each of said Q second power amplifying means.

23. The motor in accordance with claim 19, wherein said voltage supplying means includes an FET switching transistor for performing high-frequency switching of a power supply path of a DC power source, supplies a converted DC voltage obtained by converting a DC voltage of said DC power source to said Q first power amplifying means and said Q second power amplifying means, and is configured to output said DC voltaic at a level which is greater than the DC voltage of said DC power source.

24. A motor comprising:

a rotatable member;

plural-phase windings;

a voltage supplying means for supplying a DC voltage;

Q (Q is an integer of 2 or more) first power amplifying means, each one including a first NMOS-FET power transistor for forming a current path from a negative output terminal of said voltage supplying means to one of said plural-phase windings;

Q second power amplifying means, each one including a second PMOS-FET power transistor for forming a current path from a positive output terminal of said voltage supplying means to one of said plural-phase windings;

altering signal forming means for producing plural-phase altering signals;

first distribution control means for controlling said Q first power amplifying means in response to at least one of the altering signals of said altering signal forming means to cause at least one of Q of said first NMOS-FET power transistors to conduct;

second distribution control means for controlling said Q said second power amplifying means in response to at least one of the altering signals of said altering signal forming means to cause at least one of Q of said second PMOS-FET power transistors to conduct;

power switch means having a PMOS-FET power switch transistor for connecting a power supplying path from a positive terminal of a DC power source of said voltage supplying means to the current input terminals of said Q second power amplifying means when said DC power source is on, and for interrupting the power supplying path between the positive terminal of said DC power source and the current input terminals of said Q second power amplifying means when said DC power source is turned off; and voltage output means for outputting a rectified DC voltage obtained by rectifying plural-phase back electromotive forces of said plural-phase windings when said DC power source is turned off.

25. The motor in accordance with claim 24, further comprising conversion control means for changing a DC voltage across said positive output terminal and said negative output terminal of said voltage supplying means synchronously with respect to the rotation of the rotatable member.

26. The motor in accordance with claim 24, wherein said first distribution control means includes means for supplying first Q-phase current signals, each to a conduction control terminal of each of said Q first power amplifying means, and said second distribution control means includes means for supplying second Q-phase current signals, each to a conduction control terminal of each of said Q second power amplifying means.

27. The motor in accordance with claim 24, wherein said voltage supplying means includes an FET switching transistor for performing high-frequency switching of a power supply path of a DC power source, supplies a converted DC voltage obtained by converting a DC voltage of said DC power source to said Q first power amplifying means and said Q second power amplifying means, and is configured to output said converted DC voltage at a level which is greater than the DC voltage of said DC power source.

28. The motor in accordance with claim 24, wherein said power switch means have said PMOS-FET power switch transistor having a diode which permits unidirectional conduction from a current input terminal to a current output terminal of said PMOS-FET power switch transistor.

29. A motor comprising:

a rotatable member;

plural-phase windings;

a voltage supplying means for supplying a DC voltage;

Q (Q is an integer of 2 or more) first power amplifying means, each one including a first FET power transistor for forming a current path from a negative output terminal of said voltage supplying means to one of said plural-phase windings, each of said first power amplifying means including a first FET power current-mirror circuit including said first FET power transistor;

Q second power amplifying means, each one including a second FET power transistor for forming a current path from a positive output terminal of said voltage supplying means to one of said plural-phase windings, each of said second power amplifying means including a second FET power current-mirror circuit including said second FET power transistor;

altering signal forming means for producing plural-phase altering signals;

first distribution control means for supplying first Q-phase current signals to conduction control terminals of said Q first power amplifying means in response to at least one of the altering signals of said altering signal forming means to cause at least one of Q of said first FET power transistors to conduct: and second distribution control means for supplying second Q-phase current signals to conduction control terminals of said Q second power amplifying means in response to at least one of the altering signals of said altering signal forming means to cause at least one of Q of said second FET power transistors to conduct.

30. The motor in accordance with claim 29, wherein said voltage supplying means includes an FET switching transistor for performing high-frequency switching of a power supply path of a DC power source, supplies a DC voltage obtained by converting a DC voltage of said power source to said Q first power amplifying means and said Q second power amplifying means, and is configured to output said DC voltage larger at a level which is greater than the DC voltage of said DC power source.

31. The motor in accordance with claim 29, further comprising:

conversion control means for changing the DC voltage across said positive output terminal and said negative output terminal of said voltage supplying means synchronously with respect to the rotation of said rotatable member.

32. The motor in accordance with claim 29, wherein each of said Q first power amplifying means has a reverse biased first power diode connected across the current input terminal and the current output terminal of said first FET power transistor, and each of said Q second power amplifying means has a reverse biased second power diode connected across the current input terminal and the current output terminal of said second FET power transistors, said motor further comprising:

power switch means for interrupting a power supplying path between the positive terminal of said DC power source and the current input terminal of said Q second power amplifying means when said DC power source is turned off, and voltage output means for outputting a rectified DC voltage obtained by rectifying plural-phase back electromotive forces of said plural-phase windings when said DC power source is turned off.

33. A motor comprising:

a rotatable member;

single- or plural-phase windings;

a voltage supplying means for supplying a DC voltage;

Q (Q is an integer of 2 or more) first power amplifying means, each one including a first FET power transistor for forming a current path from one output terminal of said voltage supplying means to one of said single- or plural-phase windings;

Q second power amplifying means, each one including a second FET power transistor for forming a current path from the other output terminal of said voltage supplying means to one of said single- or plural-phase windings;

altering signal forming means for producing an altering signal;

first distribution control means for controlling said Q first power amplifying means in response to at least one of the altering signals of said altering signal forming means; and second distribution control means for controlling said Q second power amplifying means in response to at least one of the altering signals of said altering signal forming means, said first distribution control means including means for supplying first Q-phase current signals to conduction control terminals of said Q first power amplifying means, thereby to cause at least one of Q of said first FET power transistors to perform an ON operation in a full ON state.

34. The motor in accordance with claim 33, wherein said first distribution control means changes a part of said first Q-phase current signals in proportion to a command signal.

35. The motor in accordance with claim 33, wherein said second distribution control means includes means for supplying second Q-phase current signals to conduction control terminals of said Q second power amplifying means, thereby to cause at least one of Q of said second FET power transistors to perform an ON operation in a full ON state.

36. The motor in accordance with claim 33, wherein said second distribution control means changes a part of second Q-phase current signals, to conduction control terminals of said Q second power amplifying means, in proportion to a command signal.

37. The motor in accordance with claim 33, wherein said voltage supplying means includes an FET switching transistor for performing high-frequency switching of a power supply path of a DC power source, supplies a DC voltage obtained by converting a DC voltage of said DC power source to said Q first power amplifying means and said Q second power amplifying means, and is configured to output said DC voltage at a level which is greater than the DC voltage of said DC power source.

38. The motor in accordance with claim 33, further comprising:

conversion control means for changing DC voltage across said positive output terminal and said negative output terminal of said voltage supplying means synchronously with respect to the rotation of the rotatable member.

39. The motor in accordance with claim 33, wherein each of said Q first power amplifying means has a reverse biased first power diode connected across the current input terminal and the current output terminal of said first FET power transistor, and each of said Q second power amplifying means has a reverse biased second power diode connected across the current input terminal and the current output terminal of said second FET power transistor, said motor further comprising:

power switch means for interrupting a power supplying path between the positive terminal of said DC power source and the current input terminal of said Q second power amplifying means when said DC power source is turned off, and voltage output means for outputting a rectified DC voltage obtained by rectifying a back electromotive force of said single- or plural-phase windings when said DC power source is turned off.

40. The motor in accordance with claim 33, further comprising:

bypass switch means for interrupting or connecting a current path between the positive output terminal of said voltage supplying means and a common terminal of said single- or plural-phase windings, and shut-off means for performing or stopping current supply to said single- or plural-phase windings from said Q second power amplifying means.

41. A motor comprising:

a rotatable member;

single- or plural-phase windings;

a voltage supplying means for supplying a DC voltage;

Q (Q is an integer of 2 or more) first power amplifying means, each one including a first FET power transistor for forming a current path from one output terminal of said voltage supplying means to one of said single- or plural-phase windings;

Q second power amplifying means, each one including a second FET power transistor for forming a current path from the other output terminal of said voltage supplying means to one of said single- or plural-phase windings;

altering signal forming means for producing an altering signal;

first distribution control means for controlling said Q first power amplifying means in response to at least one of the altering signals of said altering signal forming means; and second distribution control means for controlling said Q second power amplifying means in response to at least one of the altering signals of said altering signal forming means;

wherein at least one of Q first power amplifying means and Q second power amplifying means includes an FET power current-mirror circuit formed of said FET power transistor, an FET transistor and a resistor, and said FET power current-mirror circuit is configured so that a control terminal of said FET power transistor is connected to a control terminal of said FET transistor, one terminal of the current path terminal pair of said FET transistor is connected via said resistor to one terminal of the current path terminal pair of said FET power transistor, the other terminal of the current path terminal pair of said FET transistor is connected to a conduction control terminal of said at least one power amplifying means, and the control terminal of said FET transistor is connected to the conduction control terminal of said at least one power amplifying means.

42. The motor in accordance with claim 41, wherein said first distribution control means and said second distribution control means include means for supplying a current signal to the conduction control terminal of said FET power current-mirror circuit.

43. A motor comprising:

a rotatable member;

single- or plural-phase windings;

a voltage supplying means for supplying a DC voltage;

Q (Q is an integer of 2 or more) first power amplifying means, each one including a first FET power transistor for forming a current path from one output terminal of said voltage supplying means to one of said single- or plural-phase windings;

Q second power amplifying means, each one including a second FET power transistor for forming a current path from the other output terminal of said voltage supplying means to one of said single-or plural-phase windings;

altering signal forming means for producing an altering signal;

first distribution control means for controlling said Q first power amplifying means in response to at least one of the altering signals of said altering signal forming means; and second distribution control means for controlling said Q second power amplifying means in response to at least one of the altering signals of said altering signal forming means;

wherein at least one of Q of first power amplifying means and Q second power amplifying means includes an FET power current-mirror circuit formed of said FET power transistor, an FET transistor and a resistor, and said FET power current-mirror circuit is configured so that a control terminal of said FET power transistor is connected to a control terminal of said FET transistor, one terminal of the current path terminal pair of said FET transistor is connected via said resistor to a conduction control terminal of said at least one power amplifying means, the other terminal of the current path terminal pair of said FET transistor is connected to one terminal of the current path terminal pair of said FET power transistor, and the control terminal of said FET transistor is connected to the conduction control terminal of said at least one power amplifying means.

44. The motor in accordance with claim 43, wherein said first distribution control means and said second distribution control means include means for supplying a current signal to the conduction control terminal of said FET power current-mirror circuit.

\* \* \* \* \*